(12) United States Patent
Long et al.

(10) Patent No.: US 12,438,194 B2
(45) Date of Patent: Oct. 7, 2025

(54) ELECTROLYTE SYSTEMS INCLUDING CHALCOGENIDES AND COMPOUND CONTAINING ELECTRON WITHDRAWING GROUP, AND ELECTROCHEMICAL CELL INCLUDING THE SAME

(71) Applicant: Lyten, Inc., San Jose, CA (US)

(72) Inventors: Jared Long, Sunnyvale, CA (US);
Babu Ganguli, Santa Clara, CA (US);
Alexander Klevay, San Jose, CA (US);
Amruth Bhargav, Mountain View, CA (US)

(73) Assignee: LYTEN, INC., San Jose, CA (US)

( * ) Notice: Subject to any disclaimer, the term of this patent is extended or adjusted under 35 U.S.C. 154(b) by 0 days.

(21) Appl. No.: 18/764,920

(22) Filed: Jul. 5, 2024

(65) Prior Publication Data
US 2025/0286126 A1    Sep. 11, 2025

Related U.S. Application Data

(60) Provisional application No. 63/562,167, filed on Mar. 6, 2024.

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0568* (2013.01);
(Continued)

(58) Field of Classification Search
CPC ......... H01M 10/0567; H01M 10/0525; H01M 10/0568; H01M 10/0569; H01M 10/4235
(Continued)

(56) References Cited

U.S. PATENT DOCUMENTS 4,009,052 A    2/1977    Whittingham
5,516,598 A    5/1996    Visco et al.
(Continued)

FOREIGN PATENT DOCUMENTS

CN    111816922 A  *  10/2020
CN    112382792 A      2/2021
(Continued)

OTHER PUBLICATIONS

Zhang et al., Reforming the Uniformity of Solid Electrolyte Interphase by Nanoscale Structure Regulation for Stable Lithium Metal Batteries, Jul. 13, 2023, Angewandte Chemie InternationalEdition, 62, e202306889 (Year: 2023).*
(Continued)

*Primary Examiner* — Sean P Cullen
(74) *Attorney, Agent, or Firm* — Zilka-Kotab, P.C.

(57) ABSTRACT

Myriad problems with state of the art lithium based batteries, particularly electrolyte systems thereof, including but not limited to polysulfide shuttling, formation of lithium dendrites and dead lithium during stripping and plating, thermal runaway, volumetric expansion, and strict requirements for electrolyte composition, are well documented in the art and remain major obstacles to realizing the unsurpassed potential for lithium-based batteries as ideal energy storage solutions. The inventive concepts presented herein address said challenges from a multi-pronged approach, revolutionizing the electrolyte system from different approaches to produce synergistic benefits, both within the individual approaches and particularly in combination. The inventive concepts improve electrolyte systems with respect to solvents, electron withdrawing compounds, lithium ion-transporting compounds, performance enhancing additives and chalcogenides. These developments provide benefits including: improved charge/discharge capacity, Coulombic efficiency,
(Continued)

cycle life, sulfur optimization, oxidative stability, etc. while reducing polysulfide shuttling and lithium dendrite formation, among other benefits.

20 Claims, 14 Drawing Sheets

(51) Int. Cl.
  *H01M 10/0568* (2010.01)
  *H01M 10/0569* (2010.01)
  *H01M 10/42* (2006.01)
(52) U.S. Cl.
  CPC ... *H01M 10/0569* (2013.01); *H01M 10/4235* (2013.01); *H01M 2300/0028* (2013.01); *H01M 2300/0037* (2013.01)
(58) Field of Classification Search
  USPC .......................................... 429/323, 324, 335
  See application file for complete search history.

(56) References Cited

U.S. PATENT DOCUMENTS

| | | | |
|---|---|---|---|
| 6,210,836 | B1 | 4/2001 | Takada et al. |
| 7,354,680 | B2 | 4/2008 | Mikhaylik |
| 10,522,827 | B2 | 12/2019 | Young et al. |
| 10,734,683 | B2 | 8/2020 | Jilek et al. |
| 11,081,722 | B2 | 8/2021 | Zhang et al. |
| 11,258,097 | B2 | 2/2022 | Wang |
| 2002/0192557 | A1 | 12/2002 | Choi et al. |
| 2005/0014072 | A1 | 1/2005 | Yamaguchi et al. |
| 2013/0230770 | A1 | 9/2013 | Oya et al. |
| 2018/0048017 | A1 | 2/2018 | Jilek et al. |
| 2019/0051940 | A1 | 2/2019 | Park et al. |
| 2019/0157701 | A1 | 5/2019 | Lu et al. |
| 2019/0198865 | A1* | 6/2019 | Kim ...................... H01M 4/485 |
| 2019/0198933 | A1 | 6/2019 | Newhouse et al. |
| 2020/0028165 | A1 | 1/2020 | Chiang et al. |
| 2020/0176767 | A1 | 6/2020 | Fraga Trillo et al. |
| 2020/0194786 | A1 | 6/2020 | Wang et al. |
| 2020/0220216 | A1* | 7/2020 | Kim ...................... H01M 4/505 |
| 2020/0223702 | A1 | 7/2020 | Zhang et al. |
| 2021/0296700 | A1 | 9/2021 | Shibata |
| 2022/0231323 | A1* | 7/2022 | Chung .............. H01M 10/0568 |
| 2022/0359861 | A1* | 11/2022 | Kim .................... H01M 4/0471 |
| 2023/0101833 | A1 | 3/2023 | Best et al. |
| 2023/0216039 | A1 | 7/2023 | Manthiram et al. |
| 2023/0271833 | A1 | 8/2023 | Xu et al. |
| 2024/0194955 | A1 | 6/2024 | Laicer et al. |

FOREIGN PATENT DOCUMENTS

| | | | |
|---|---|---|---|
| CN | 113540567 | A * | 10/2021 |
| CN | 114678591 | A * | 6/2022 |
| EP | 3979385 | A1 | 4/2022 |
| WO | 2002044084 | A2 | 6/2002 |
| WO | 2011051275 | A1 | 5/2011 |
| WO | 2017019163 | A1 | 2/2017 |
| WO | 2020135694 | A1 | 7/2020 |
| WO | 2021213743 | A1 | 10/2021 |
| WO | 2022128233 | A1 | 6/2022 |
| WO | 2022174011 | A1 | 8/2022 |

OTHER PUBLICATIONS

Bhargav et al., U.S. Appl. No. 18/764,907, filed Jul. 5, 2024.
Klevay et al., U.S. Appl. No. 18/765,011, filed Jul. 5, 2024.
Aurbach et al., "On the Surface Chemical Aspects of Very High Energy Density, Rechargeable Li-Sulfur Batteries," Journal of The Electrochemical Society, vol. 156, 2009, pp. A694-A702.
Bl et al., "Protecting lithium metal anodes in lithium-sulfur batteries: A review," Energy Material Advances, 2023, pp. 1-23.
Buyuker et al., "Voltage and Temperature Limits of Advanced Electrolytes for Lithium-Metal Batteries," ACS Energy Letters, vol. 8, 2023, pp. 1735-1743.
Cheng et al., "Constructing a 700 Wh kg1-level rechargeable lithium-sulfur pouch cell," Journal of Energy Chemistry, vol. 76, 2023, pp. 181-186.
Du et al., "A comprehensive study on the electrolyte, anode and cathode for developing commercial type nonflammable sodium-ion battery," Energy Storage Materials, vol. 29, Aug. 2020, pp. 287-299.
Elabd et al., "Dual Functional High Donor Electrolytes for Lithium? Sulfur Batteries under Lithium Nitrate Free and Lean Electrolyte Conditions," ACS Energy Letters, vol. 7, 2022, pp. 2459-2468.
Li et al., "Synthesis, modification strategies and applications of coal-based carbon materials," Fuel Processing Technology, vol. 230, Jun. 1, 2022, pp. 1-18.
He et al., "Unraveling the Correlation between Solvent Properties and Sulfur Redox Behavior in Lithium-Sulfur Batteries," Journal of The Electrochemical Society, vol. 165, 2018, pp. A4027-A4033.
Wang et al., "Highly soluble organic nitrate additives for practical lithium metal batteries," Carbon Energy, 2022, pp. 1-9.
Hou et al., "Modification of Nitrate Ion Enables Stable Solid Electrolyte Interphase in Lithium Metal Batteries," Angewandte Chemie, Mar. 1, 2022, pp. 1-6.
Gupta et al., "Influence of Lithium Polysulfide Clustering on the Kinetics of Electrochemical Conversion in Lithium-Sulfur Batteries," ACS Chemistry of Materials Journal, Mar. 10, 2020, vol. 32, pp. 2070-2077.
Ji et al., "A highly ordered nanostructured carbon-sulphur cathode for lithium-sulphur batteries," Nature Materials, vol. 8, Jun. 2009, pp. 500-506.
Lee et al., "Directing the Lithium?Sulfur Reaction Pathway via Sparingly Solvating Electrolytes for High Energy Density Batteries," ACS Central Science, vol. 3, 2017, pp. 605-613.
Han et al., "Nitrogen-doped carbon nets with micro/mesoporous structures as electrodes for high-performance supercapacitors," Journal of Materials Chemistry A, 2016, pp. 16698-16705.
Liu et al., "An Organodiselenide Comediator to Facilitate Sulfur Redox Kinetics in Lithium-Sulfur Batteries with Encapsulating Lithium Polysulfide Electrolyte," Angewandte Chemie International Edition, vol. 62, 2023, pp. 1-9.
Liu et al., "An Organodiselenide Comediator to Facilitate Sulfur Redox Kinetics in Lithium-Sulfur Batteries with Encapsulating Lithium Polysulfide Electrolyte," Supporting Information, Angewandte Chemie International Edition, 2023, 38 pages.
Liu et al., "Electrolyte solutions design for lithium-sulfur batteries," Joule, vol. 5, Sep. 15, 2021, pp. 2323-2364.
Luo et al., "Electrolyte Design for Lithium Metal Anode-Based Batteries Toward Extreme Temperature Application," Advanced Science News, vol. 8, 2021, pp. 1-20.
Ma et al., "Effect of Building Block Connectivity and Ion Solvation on Electrochemical Stability and Ionic Conductivity in Novel Fluoroether Electrolytes," ACS Central Science, vol. 7, 2017, pp. 1232-1244.
Manavalan et al., "Electrochemically Modified Poly(dicyandiamide) Electrodes for Detecting Hydrazine in Neutral pH," Industrial & Engineering Chemistry Research, vol. 62, 2023, pp. 18271-18279.
Moon et al, "Non-fluorinated non-solvating cosolvent enabling superior performance of lithium metal negative electrode battery," Nature Communications, 2022, pp. 1-11.
Narayan et al., "Fluorinated solvents for better batteries," Nature Reviews, vol. 6, Jul. 2022, pp. 449-450.
Nie et al., "Development of Pyridine-Boron Trifluoride Electrolyte Additives for Lithium-Ion Batteries," Journal of The Electrochemical Society, vol. 162, 2015, pp. A1186-A1195.
Singaraj et al., "A Detailed Discourse on the Epistemology of Lithium-Sulfur Batteries," Chemical Engineering & Technology, Oct. 30, 2023, Chemical Engineering & Technology, vol. 46, 2023, pp. 1-23.
Su et al., "Establishment of Selection Rule for Hydrofluoroether as Electrolyte Co-solvent through Linear Free-Energy Relationship in Lithium-Sulfur Batteries," Author Manuscript, published in Angewandte Chemie International Edition, May 13, 2019, 15 pages.

(56) References Cited

OTHER PUBLICATIONS

Su et al., "A Selection Rule for Hydrofluoroether Electrolyte Cosolvent: Establishing a Linear Free-Energy Relationship in Lithium-Sulfur Batteries," Supporting Information, Angewandte Chemie International Edition, 2019, 13 pages, retrieved from anie_201904240_sm_miscellaneous_information.pdf.
Su et al., "Terminally fluorinated glycol ether electrolyte for lithium metal batteries," Nano Energy, vol. 110, 2023, pp. 1-8.
Su et al., "Terminally fluorinated glycol ether electrolyte for lithium metal batteries," Supplementary Information, Nano Energy, vol. 110, 2023, 29 pages, retrieved from https://www.osti.gov/servlets/purl/2361042.
Wang et al., "Towards durable practical lithium-metal batteries: advancing the feasibility of poly-DOL-based quasi-solid-state electrolytes via a novel nitrate based additive" Energy & Environmental Science, 2023, 2023, 9 pages.
Wang et al., "Development of High Energy Density Li-Sulfur Cells," presentation, Penn State, 17 pages, retrieved on Aug. 2, 2024, from https://www.energy.gov/eere/vehicles/articles/development-high-energy-density-lithium-sulfur-cells.
Watanabe et al., "Discharge Behavior within Lithium?Sulfur Batteries Using Li?Glyme Solvate Ionic Liquids," The Journal of Physical Chemistry C, vol. 127, 2023, pp. 6645-6654.
Wu et al., "An Environmentally Friendly Class of Fluoropolyether: ?, ?-Dialkoxyfluoropolyethers," Applied Sciences, vol. 2, 2012, pp. 351-367.
Xie et al., "Fluoropyridine family: Bifunction as electrolyte solvent and additive to achieve dendrites-free lithium metal batteries," Journal of Materials Science & Technology, vol. 74, 2021. pp. 119-127.
Ma et al., "Ionic liquid/poly(ionic liquid)-based electrolytes for lithium batteries," Industrial Chemistry & Materials, vol. 1, 2023, pp. 39-59.
Liang et al., "Porous 2D Carbon Nanosheets synthesized via Organic Groups Triggered Polymer Particles Exfoliation: An effective Cathode Catalyst for Polymer Electrolyte Membrane Fuel Cells," Electrochimica Acta, Feb. 2020, 47 pages, retrieved from https://www.semanticscholar.org/paper/Porous-2D-carbon-nanosheets-synthesized-via-organic-Liang-Zhang/028219609da7132c39ae2110aa517d0ff1047821.
Yu et al., "Molecular design for electrolyte solvents enabling energy-dense and long-cycling lithium metal batteries," Nature Energy, vol. 5, 2020, pp. 526-533, retrieved from https://www.nature.com/articles/s41560-020-0634-5.
Zhang et al., "A monofluoride ether-based electrolyte solution for fast-charging and low-temperature non-aqueous lithium metal batteries," Nature Communications, Feb. 25, 2023, pp. 1-13.
Zhang et al., "A monofluoride ether-based electrolyte solution for fast-charging and low-temperature non-aqueous lithium metal batteries," Supplementary Information, Nature Communications, 2023, 38 pages, retrieved from https://www.nature.com/articles/s41467-023-40318-6.
Meisner et al., "Lithium-sulfur battery with partially fluorinated ether electrolytes: Interplay between capacity, coulombic efficiency and Li anode protection," Journal of Power Sources, vol. 438, 2019, pp. 1-9.
Zhang et al., "Reforming the Uniformity of Solid Electrolyte Interphase by Nanoscale Structure Regulation for Stable Lithium Metal Batteries," Angewandte Chemie, Jul. 13, 2023, pp. 1-7.
Zhao et al., "Fluorinated ether electrolyte with controlled solvation structure for high voltage lithium metal batteries," Nature Communications, vol. 113, pp. 1-9.
Zhao et al., "Electrolyte engineering via ether solvent fluorination for developing stable non-aqueous lithium metal batteries," Nature Communications, vol. 14, 2023, pp. 1-10.
Zhao et al., "Targeted Functionalization of Cyclic Ether Solvents for Controlled Reactivity in High-Voltage Lithium Metal Batteries," ACS Energy Letters, vol. 8, 2023, pp. 3180-3187.
Zheng et al., "High-Fluorinated Electrolytes for Li—S Batteries," Advanced Energy Materials, vol. 9, 2019, pp. 1-9.
Zhao et al., "An Organodiselenide Comediator to Facilitate Sulfur Redox Kinetics in Lithium-Sulfur Batteries," Advanced Materials, 2021, pp. 1-9.
Zhao et al., "An Organodiselenide Comediator to Facilitate Sulfur Redox Kinetics in Lithium-Sulfur Batteries," Supplementary Information, Advanced Materials, 2021, 27 pages.
Zhao et al., "Promoting the sulfur redox kinetics by mixed organodiselenides in high-energy-density lithium-sulfur batteries," with supporting figures, eScience, vol. 1, 2021, pp. 44-52.
Cuisinier et al., "Unique Behaviour of Nonsolvents for Polysulphides in Lithium-Sulphur Batteries," Energy & Environmental Science, 2014, 10 pages.
Restriction Requirement from U.S. Appl. No. 18/765,011, dated Sep. 29, 2024.
Non-Final Office Action from U.S. Appl. No. 18/764,907, dated Oct. 1, 2024.
International Search Report and Written Opinion from PCT Application No. PCT/US 24/36938, dated Oct. 30, 2024, 14 pages.
Non-Final Office Action from U.S. Appl. No. 18/765,011, dated Dec. 19, 2024.
Final Office Action from U.S. Appl. No. 18/764,907, dated Feb. 6, 2025.
Final Office Action from U.S. Appl. No. 18/765,011, dated Apr. 25, 2025.
Long et al., U.S. Appl. No. 19/205,858, filed May 12, 2025.
Advisory Action from U.S. Appl. No. 18/764,907, May 8, 2025.

* cited by examiner

Dicyandiamide (DCDA)

Guanine

Guanidine Nitrate

Lithium Dicyanamide

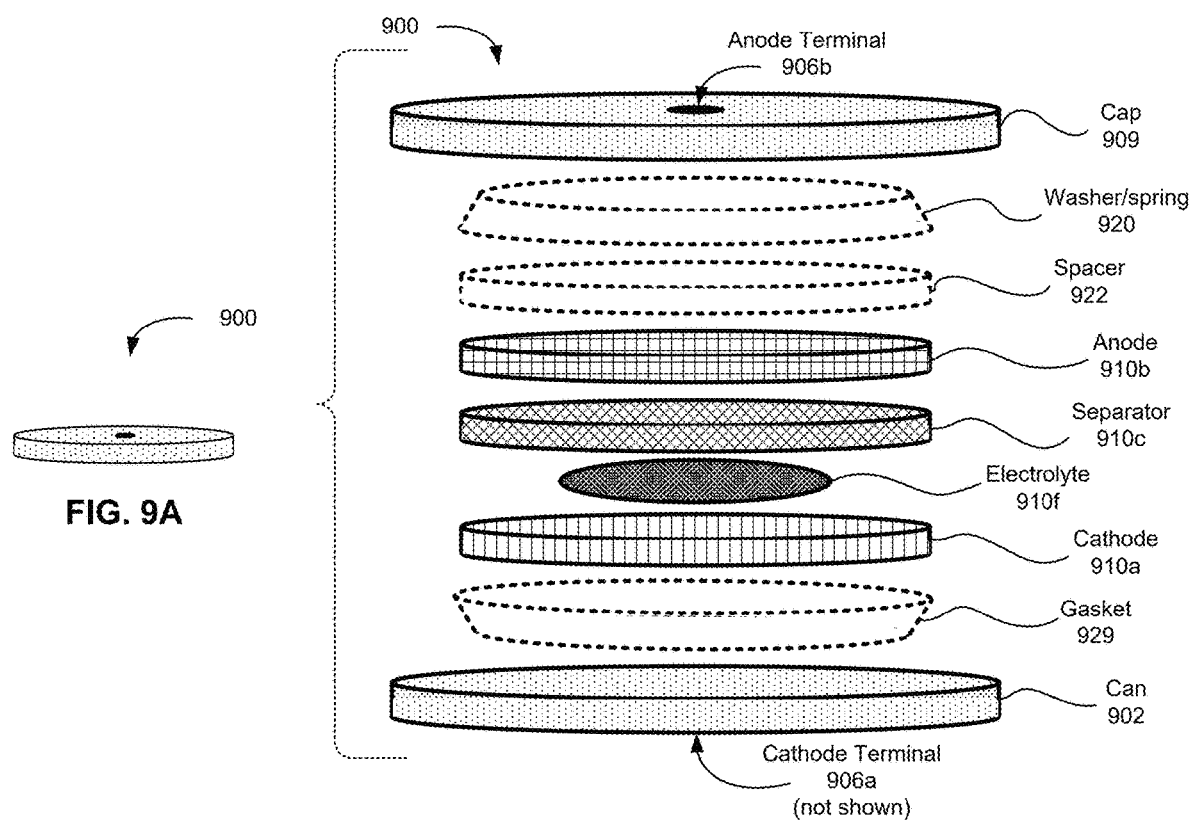

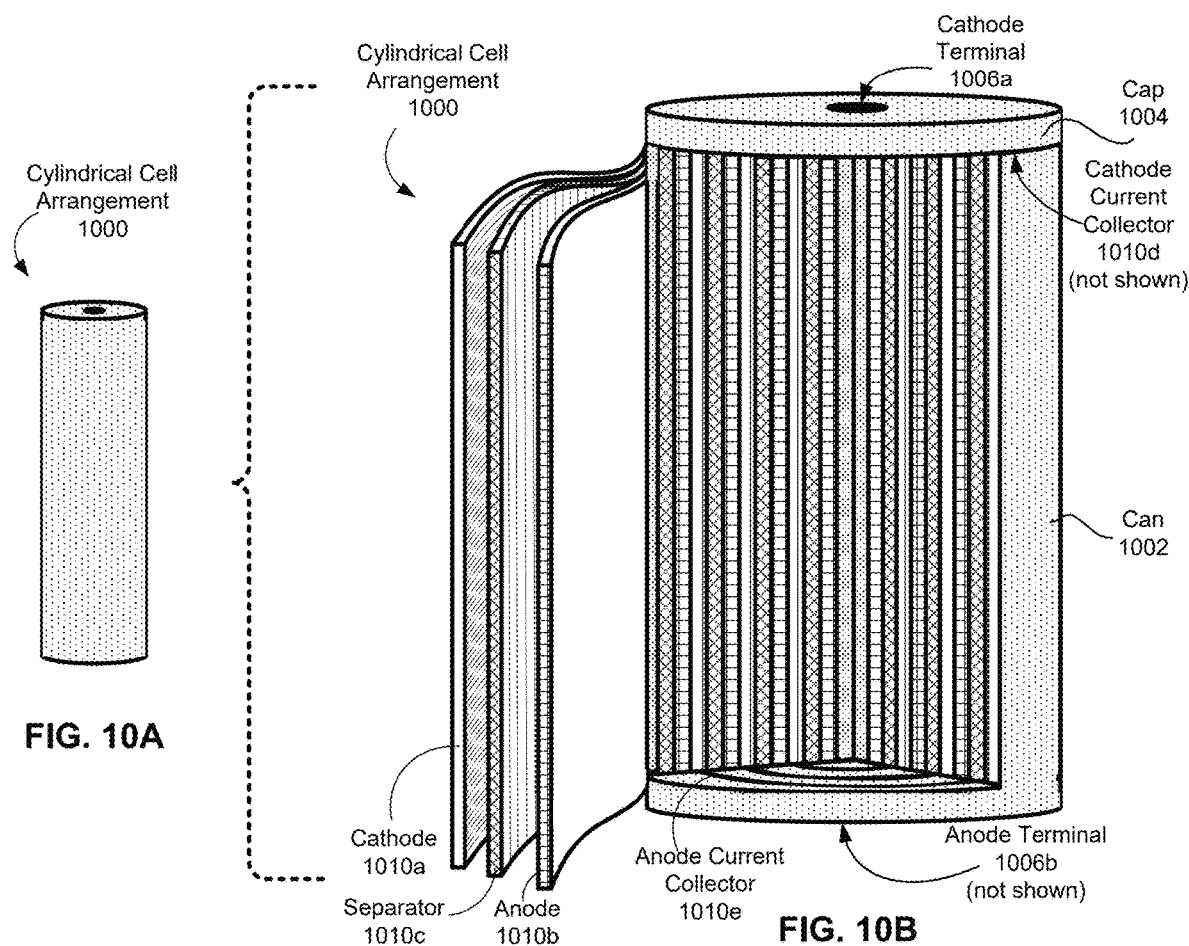

ELECTROLYTE SYSTEMS INCLUDING CHALCOGENIDES AND COMPOUND CONTAINING ELECTRON WITHDRAWING GROUP, AND ELECTROCHEMICAL CELL INCLUDING THE SAME

RELATED APPLICATIONS

The present application is related, and claims priority to, U.S. Provisional Patent Application No. 63/562,167, filed Mar. 6, 2024 and entitled "ELECTROLYTE ADDITIVE FOR IMPROVING PERFORMANCE AND CYCLE LIFE OF LITHIUM-BASED SECONDARY BATTERIES", the contents of which are herein incorporated by reference in entirety.

FIELD OF THE INVENTION

The present invention relates to battery technology, and more particularly to novel electrolyte compositions including various components such as solvents, electron withdrawing compounds, and/or additives that, singly or in any combination thereof, reduce cost and complexity of fabrication, as well as having lower mass, higher energy density, and longer cycle life of lithium-based electrochemical cells. Exemplary components include, but are not limited to, chalcogenides, alpha-hydrogenated, selectively beta-functionalized compounds, and/or additive(s).

BACKGROUND

Batteries, particularly lithium-based batteries, remain of focused interest due to the high theoretical specific energy, low mass, low cost, and other advantages that are well documented in the art. However, issues such as polysulfide shuttling, formation of lithium dendrites and dead lithium during stripping and plating, thermal runaway, volumetric expansion, and strict requirements for electrolyte composition remain challenges for wide scale implementation of lithium-based batteries in diverse applications.

For reasons that are well-known to those having ordinary skill in the art, solvents in lithium-based, particularly lithium-sulfur-based, batteries have more stringent requirements than other battery chemistries, including but not limited to having (1) reductive stability with respect to lithium metal and lithium alloys, which limits suitable solvents to those having a high lowest unoccupied molecular orbital (LUMO) and a low donor number, typically about 1.8V or less; (2) robust oxidative stability against the cathode material (typically a sulfur-based or carbon-based material), which excludes compounds that have a high (about 2.45V or more) highest occupied molecular orbital (HOMO) and is generally accomplished by highly fluorinating solvent components; (3) robust capability to form a solvent/electrolyte interface (SEI), e.g., by forming LiF, $Li_3N$, and/or $Li_2O$ on surfaces of the anode; (4) a finely-tuned balance between solvation power of the electrolyte toward lithium polysulfides generally versus solvation power of the electrolyte toward the particular species of lithium polysulfide that is/are formed in the electrolyte, which is conventionally achieved by encouraging formation of long chain (e.g., $Li_2S_8$) over short chain (e.g., $Li_2S_2$, $Li_2S_4$, $Li_2S_3$, etc.) lithium polysulfides in order to case the pathway to elemental sulfur; (5) high capability to solvate lithium salts (especially lithium nitrate, an important additive for marrying reducing lithium metal with oxidizing polysulfides); (6) low density to minimize the percentage of the battery's weight conferred by the electrolyte; (7) high boiling point (for safety and case of manufacturing as discussed briefly above); and (8) avoidance of electrophiles (for example carbonates as commonly used in Li-ion batteries) to avoid strong nucleophilic reaction with polysulfides.

As a result of these stringent requirements, typical solvent systems used in lithium-based batteries include at least two solvents (one of which acts as a solvating agent, while the other acts as a diluent), and possibly additional components such as lithium salts, redox mediators, etc., which in turn increases the solvent's contribution to overall battery weight. This exacerbates concerns with fabrication as well as detriments overall efficiency of the battery in use. Moreover, the low boiling point of solvents typically used in lithium-based batteries raises safety concerns due to propensity for flammability or explosiveness, which may be caused by short circuits formed in the battery during use.

In addition, and as is well-known in the art, lithium-based, and particularly lithium-sulfur-based battery chemistry involves the formation of parasitic reactions between the lithium active material of the anode with the sulfur due to the formation of lithium polysulfides. These reactions effectively reduce the amount of active electrode material for the electrochemical cell to perform electrical work, and detrimentally impacts the overall performance (especially energy efficiency) of batteries based on such lithium chemistries. In particular, the practical limits observed for lithium-based, and particularly lithium-sulfur-based batteries are attributed to kinetic limitations of reduction-oxidation (redox) reactions that convert lithium (poly) sulfides from liquid to solid phase and eventually back into elemental lithium. The principal mechanisms for conversion of lithium polysulfides into elemental lithium are presented below in Equations 0 and 1(a)-(d). Moreover, as known in the art, kinetics of solid-solid phase reactions tend to be slower than liquid-solid phase reactions, which tend to be slower than liquid-liquid phase interactions. Accordingly, the rate limiting processes for converting lithium polysulfides tend to be those shown in Equations 1(c) and 1(d).

$$S_{8(s)} \rightarrow Li_2S_{8(s)} \qquad \text{Eqn. 0}$$

$$Li_2S_{8(s)} + Li \rightarrow Li_2S_{6(l)} \qquad \text{Eqn. 1(a)}$$

$$Li_2S_{6(l)} + Li \rightarrow Li_2S_{4(l)} \qquad \text{Eqn. 1(b)}$$

$$Li_2S_{4(l)} + Li \rightarrow Li_2S_{2(s)} \qquad \text{Eqn. 1(c)}$$

$$Li_2S_{4(l)} + Li \rightarrow Li_2S_{(s)} \qquad \text{Eqn. 1(d)}$$

Mitigating the negative impacts of such parasitic reactions lithium polysulfide conversion of polysulfides into pure lithium is therefore an important obstacle to achieving the ideal performance capabilities presented by lithium-based battery technology.

Conventional approaches to improving specific energy and/or energy density of lithium-based batteries, especially lithium-sulfur batteries, have focused on optimization of the structure and composition of the sulfur-based cathode, adjusting amount of electrolyte used in the electrochemical cell, using well-structured carbon frameworks to improve volumetric energy density, optimizing pore framework geometry to improve sulfur loading within the electrochemical cell, and including additives in the electrolyte to mitigate polysulfide dissolution within the electrochemical cell during cycling.

Focusing on electrolyte composition, Zhao, et al. recently investigated use of chalcogenides (compounds including a chalcogen component such as sulfur, selenium, tellurium, etc., and an electropositive component, as known in the art) as redox comediators to facilitate sulfur redox kinetics in lithium-sulfur batteries. In "An Organoselenide Comediator to Facilitate Sulfur Redox Kinetics in Lithium-Sulfur Batteries" *Adv. Mater.*, 2007798 (2021), Zhao reported including diphenyl diselenide (DPDSe) in an otherwise conventional electrolyte system including 1:1 (v:v) 1,2-dimethoxyethane (DME) and 1,3-dioxolane (DOL) as solvents, 1M lithium bis(trifluoromethane) sulfonimide (LiTFSI) and 2.0 wt % lithium nitrate ($LiNO_3$) as lithium ion sources, 100 mM DPDSe as a redox comediator. The resulting Li—S electrochemical cells exhibited a rate performance of 817 mAh/g at 2 C and an actual initial energy density of 301 Wh/kg, but were only stable for 30 cycles. Loss of stability is defined as the point (cycle number) at which the cell exhibits 60% or less of initial capacity.

In "Promoting the sulfur redox kinetics by mixed organo-diselenides in high-energy-density lithium-sulfur batteries" *eScience* 1:44-52 (2021), Zhao reported a similar electrolyte system, but included a mixture of dimethyl diselenide (DMDSe) and DPDSe as the redox comediator. The resulting Li—S pouch cells exhibited capacity retention of 81.6% after 200 cycles at 0.5 C and high initial capacity of 1002 mAh $g^{-1}$ at 0.1 C with sulfur-loading of about 1.2 mg/$cm^2$. At higher loadings, e.g. about 4.9 mg/$cm^2$ up to about 6.1 mg/$cm^2$, stability is retained for up to 50 cycles (Zhao did not report stability beyond this cycle for the higher loaded embodiments).

Liu, et al., in "An Organodiselenide Comediator to Facilitate Sulfur Redox Kinetics in Lithium-Sulfur Batteries with Encapsulating Lithium Polysulfide Electrolyte" *Angewandte Chemi Inter.* 62:30 (2023) built on Zhao's work by implementing an electrolyte system that includes 20 mM DMDSe as a redox comediator and a solvent mixture of DME/DOL/ 1,1,2,2-tetrafluoroethyl 2,2,3,3-tetrafluoropropyl ether (TTE) in volumetric amounts (v/v/v) of 2:2:1, as well as 1M LiTFSi and 2 wt % LiNO3 as lithium ion sources. The cells were characterized by a sulfur loading of 4.0 g/$cm^2$. The DME/DOL/TTE solvent system formed an encapsulating lithium polysulfide electrolyte (EPSE) structure, which alleviated parasitic reactions between lithium polysulfides and the lithium metal anode, but as is known in the art, inevitably also sacrificed cathode sulfur redox kinetics due to the barrier of the outer solvation shell formed by hydrofluoroethers and other outer shell solvents. In addition, the discharge capacity of Liu's cell was sacrificed about 65 mAh/g for the first cycle, and was maintained for 40 cycles (at which point the test was ceased due to failure of the control cell). Liu's cells also were only capable of being charged at up to 0.2 C, above which average discharge capacity was inferior (less than half) to that of the control. Thus, the discharge capacity and the rate performance are sacrificed in Liu's electrolyte, despite improved cycling stability. Overall, Liu reported similar results as Zhao's initial publication, i.e., a Li—S pouch cell with an actual energy density of 359 Wh/kg and stable lifetime of only 37 cycles.

Accordingly, prior art attempts to improve sulfur utilization within lithium-based electrochemical cells by including chalcogenide in the electrolyte formulation suffer from low cycle life (e.g., about 20-50 cycles or less, particularly at sulfur loading of 4.0 g/$cm^2$ or more) and low charge rate (e.g. about 0.5 C, typically lower than 0.3 C, and as low as 0.025° C.), discharge rate and rate performance (especially when including hydrofluoroether or other similar electron withdrawing compound(s) as described herein or as would be appreciated by a person having ordinary skill in the art upon reading the present disclosure in the solvent component of the electrolyte system).

As such, there is thus a long-felt and ongoing need for improved electrolyte compositions to address the above, and/or other issues associated with the prior art.

SUMMARY

Compositions of matter, suitable systems implementing said compositions of matter, methods of fabricating such compositions of matter and corresponding systems, as well as various applications for improving, among other characteristics, Coulombic efficiency and cycle life of lithium-based, particularly lithium-sulfur, secondary batteries are disclosed according to various aspects, implementations, and embodiments of the inventive concepts presented herein.

Generally, according to select embodiments, the inventive concepts include electrolyte systems, as well as techniques for making and using electrolyte systems, which include: (1) a solvent system, (2) at least one electron withdrawing compound, (3) one or more lithium ion-transporting compounds, (4) at least one chalcogenide, and/or (5) one or more performance-enhancing additives configured to improve Coulombic efficiency and cycle life of batteries in which the electrolyte system are implemented. Moreover, the electrolyte system generally satisfies the stringent requirements set forth above to optimize operational characteristics while minimizing weight and environmental impact of fabrication and use.

The solvent system may include multiple components serving distinct but related functions, such as solvation capability, dilution (for improved wettability), or to facilitate certain chemical reactions within the electrolyte system, especially redox reactions converting polysulfides into lower redox states and/or elemental lithium.

These components may be selected from the exemplary species described herein, and may be present in any amount suitable to enable a working electrochemical cell, e.g., up to about 100 vol % of the electrolyte system composition, with other components such as lithium ion-transporting compounds and/or performance-enhancing additives being partially or completely solvated therein. Preferably, the components are present in an amount suitable to enable a working electrochemical cell having an anode comprising lithium or a lithium-based material as the active material.

In various approaches, the solvent(s) and electron withdrawing compound(s) may respectively be cumulatively present in amounts ranging from a nonzero amount of up to about 75 vol %. By "cumulatively present", it is meant that multiple species of a given type of component are present in the cumulative amount stated. For instance, a combination of three different species of solvent may be present in respective amounts of about 5 vol %, about 5 vol %, and about 15 vol % for a cumulative amount of 25 vol % of solvent.

The lithium ion-transporting compound(s) may be cumulatively present in an amount ranging from about 0.1 M to about 10 M, or any value therebetween, according to various embodiments.

The performance-enhancing additive(s), in different implementations, may be cumulatively present in a nonzero amount ranging up to about 0.2 M The solvent system may include a single solvent or a combination of solvents, which may be independently characterized by different solvating capabilities, according to select approaches. For example, illustrative solvent systems may include a first solvent that has a high solvating capability for salts, such as lithium ion-transporting compounds described herein, while a second solvent may have low solvating activity for lithium ion-transporting compounds, but a high solvating activity for other compounds, such as polar, nonpolar, aqueous, organic, etc. compounds.

Furthermore, combinations of solvents may include multiple solvents with similar solvating capabilities and/or activities, especially where such solvents may act cooperatively or synergistically to solvate appropriate solutes, as would be understood by those having ordinary skill in the art upon reading the present disclosure.

Further still, particular solvent(s) included in a given solvent system may be chosen based on the particular application for the intended electrochemical cell, based on the composition of other components of the electrolyte system, based on the composition of other components of the electrochemical cell (such as the anode, cathode, and/or separator), or other factors as would be understood by those having ordinary skill in the art upon reading the present disclosure.

According to various implementations, suitable solvents may be selected from exemplars such as: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), triethylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H, 1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis (2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluoroethane (DMETF), 2-methyl-1 (1,1, 2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons such as toluene, benzene, hexane(s), or any combination or equivalent(s) thereof that would be appreciated by skilled artisans upon reading the present disclosure.

According to various exemplary embodiments, the solvent(s) may be cumulatively present in an amount of about 1 vol %, about 2.5 vol %, about 3.33 vol %, about 5 vol %, about 6.66 vol %, about 7.5 vol %, about 10 vol %, about 12.5 vol %, about 15 vol %, about 17.5 vol %, about 20 vol %, about 25 vol %, about 30 vol %, about 33 vol %, about 35 vol %, about 40 vol %, about 50 vol %, about 60 vol %, about 66.6 vol %, about 70 vol %, or about 75 vol %.

The electrolyte system may include a single electron withdrawing compound, or a combination thereof, according to different implementations. Similar to the solvent system, the particular electron withdrawing compound(s) included in a given electrolyte system may be chosen based on the particular application for the electrochemical cell with which the performance enhancing additive(s) are to be utilized, based on chemical activity of the electron withdrawing compound (particularly based on how the electron withdrawing compound(s) may break down during operation of the resulting electrochemical cell in which they are to be implemented, and how such derivatives or the electron withdrawing compound(s) per se may interact with electrodes and form solid-electrolyte interphases (SEIs) therewith), based on the composition of other components of the electrolyte system, based on the composition of other components of the electrochemical cell (such as the anode, cathode, and/or separator), or other factors as would be understood by those having ordinary skill in the art upon reading the present disclosure.

The electron withdrawing compound(s) preferably comprise at least one alpha-hydrogenated, selectively beta-functionalized motif, and more preferably, the at least one alpha-hydrogenated, selectively beta-functionalized motif excludes fluorine. For instance, in various embodiments, the electron withdrawing compound may include 2,2-dimethoxy-4-trifluoromethyl-1,3-dioxolane ether (DTDL), 1,1,1-trifluoro-2-(2-(2-(2,2,2-trifluoroethoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis(2,2,3,3-tetrafluoropropyl) ether) (BTFPE), 2,2,2-trifluoroethyl 1,1,2,2-tetrafluoroethyl ether (TFTFE), tris(2,2,2-trifluoroethyl) phosphate, bis(2,2,2-trifluoroethyl)methylphosphonate, isosorbide dinitrate (ISDN), bis(2-fluoroethyl) ether (BFE), or other suitable equivalents that would be understood by a person having ordinary skill in the art upon reading the present descriptions, as well as any permutation or combination of the foregoing.

Moreover, derivative(s) of the electron withdrawing compound preferably comprise lithiated fluoroalkoxides, such as trifluoroethanol and/or Lithium trifluoroacetate.

The electron withdrawing compound(s) may be cumulatively present in an amount of about 1 vol %, about 2.5 vol %, about 3.33 vol %, about 5 vol %, about 6.66 vol %, about 7.5 vol %, about 10 vol %, about 12.5 vol %, about 15 vol %, about 17.5 vol %, about 20 vol %, about 25 vol %, about 30 vol %, about 33 vol %, about 35 vol %, about 40 vol %, about 50 vol %, about 60 vol %, about 66.6 vol %, about 70 vol %, or about 75 vol %, according to various embodiments.

According to select approaches, the solvent(s) and electron withdrawing compound(s) may be present in a particular volumetric ratio with respect to one another. Exemplary ratios may include a ratio of approximately 1:1, a ratio of approximately 1:2, a ratio of approximately 1:3, a ratio of approximately 1:5, a ratio of approximately 1:10, a ratio of approximately 2:1, a ratio of approximately 3:1, a ratio of approximately 5:1, a ratio of approximately 10:1, a ratio of approximately 2:3, a ratio of approximately 3:4, a ratio of approximately 2:5, etc. (vol % solvent:vol % electron withdrawing compound). In implementations where multiple solvent(s) and/or electron withdrawing compound(s) are present, these components may also be present in a particular volumetric ratio with respect to one another, such as the exemplary ratios set forth above regarding solvent:electron withdrawing compound.

Of course, it shall be understood that in the context of the presently described inventive concepts, the relative amounts of the solvent(s), and electron withdrawing compound(s) may be any value within the broad range set forth above. Different amounts of the solvent(s) and electron withdrawing compound(s) may be selected based on the particular application and/or composition of other components of the electrochemical cell with which the electrolyte system is to be utilized, based on the composition of other components of the electrochemical cell (such as anode, cathode, and/or separator), and/or based on the composition and/or amount of other components of the electrolyte system, such as composition and/or amount of performance enhancing additive(s), lithium ion-transporting compound(s), etc. as will be understood by those having ordinary skill in the art upon reading the present disclosure.

Various implementations of suitable solvent system compositions are presented by way of example below in Table 2, according to select illustrative embodiments.

Moreover, the electrolyte system, according to different implementations, may (and preferably does) include additional components such as lithium ion-transporting compounds and/or performance-enhancing additives.

The lithium ion-transporting compounds, in various approaches, may include any one or more compounds known in the art to facilitate lithium ion transport under conditions present in lithium-based batteries as disclosed herein. More preferably, the lithium ion-transporting compounds do not conduct polysulfides.

As noted above with regard to solvent(s) and electron withdrawing compound(s), the particular lithium ion-transporting compound(s) included in a given electrolyte system may be chosen based on degree of lithium ion-transporting capability, based on particular species of lithium ion the compound(s) are capable of transporting, based on the particular application for the intended electrochemical cell, based on the composition of other components of the electrolyte system, based on the composition of other components of the electrochemical cell (such as the anode, cathode, and/or separator), or other factors as would be understood by those having ordinary skill in the art upon reading the present disclosure.

For example, suitable lithium ion-transporting compounds may include lithium, and may be salts of lithium. Exemplary species of lithium ion-transporting compounds suitable for use in the context of the presently disclosed inventive concepts include, without limitation, lithium bis (trifluoromethanesulfonyl)imide (LiTFSI), lithium nitrate (LiNO$_3$), lithium Perchlorate (LiClO$_4$), lithium difluoro (oxalato) borate (LiDFOB), lithium bis(oxalato) borate (LiBOB), lithium trif late (LiTf), lithium bis(pentafluoroethanesulfonyl)imide (LiBETi), lithium bis(fluorosulfonyl) imide (LiFSI), Lithium trifluoroacetate (LiTFAc), or any suitable combination(s) and/or equivalent(s) thereof that would be appreciated by a person having ordinary skill in the art upon reading the present disclosure.

Preferably, the lithium ion-transporting compounds are present in an amount ranging from about 0.1 M to about 10 M, or any value therebetween, such as about 0.2 M, about 0.25 M, about 0.33 M, about 0.4 M, about 0.5 M, about 0.66 M, about 0.75 M, about 0.85 M, about 0.9 M, about 0.95 M, about 0.99 M, about 1.0 M, about 1.25 M, about 1.33 M, about 1.5 M, about 1.66 M, about 1.75 M, about 2.0 M, about 2.25 M, about 2.33 M, about 2.5 M, about 2.66 M, about 2.75 M, about 3.0 M, about 3.25 M, about 3.33 M, about 3.5 M, about 3.66 M, about 3.75 M, about 4.0 M, about 4.25 M, about 4.33 M, about 4.5 M, about 4.66 M, about 4.75 M, about 5.0 M, about 5.25 M, about 5.33 M, about 5.5 M, about 5.66 M, about 5.75 M, about 6.0 M, about 6.25 M, about 6.33 M, about 6.5 M, about 6.66 M, about 6.75 M, about 7.0 M, about 7.25 M, about 7.33 M, about 7.5 M, about 7.66 M, about 7.75 M, about 8.0 M, about 8.25 M, about 8.33 M, about 8.5 M, about 8.66 M, about 8.75 M, about 9.0 M, about 9.25 M, about 9.33 M, about 9.5 M, about 9.66 M, about 9.75 M, or about 10 M, or any amount therebetween, according to various approaches.

Performance-enhancing additives, according to various aspects of the presently disclosed inventive concepts, include, in any permutation or combination, acetonitrile, azobisisobutyronitrile (AIBN), cyanamide, lithium dicyanamide, dicyandiamide (DCDA), guanine, guanidine nitrate, guanidine thiocyante, guanidine p-tolunesulfonate, guanidine trifluoromethanolate, 2-guanidinobenzimidazole, guanidine hydrochloride, guanidine carbonate, guanidine bromide, guanidine iodide, guanidine acetate, guanidine sulfate, guanidine phosphate, succionitrile, or any suitable equivalent(s) thereof that would be appreciated by those having ordinary skill in the art upon reading the present disclosures.

The performance-enhancing additive(s), in different implementations, may be present in a nonzero amount up to about 0.2 M, e.g., an amount ranging from about 0.01 M to about 0.2 M, and preferably in an amount ranging from about 0.1 M to about 0.15 M. Of course, skilled artisans will appreciate that the performance-enhancing additive may be present in any amount within the broad range set forth above, e.g., an amount of about 0.001 M, about 0.005 M, about 0.01 M, about 0.02 M, about 0.05 M, about 0.066 M, about 0.075 M, about 0.09 M, about 0.1 M, about 0.125 M, about 0.133 M, about 0.15 M, about 0.166 M, about 0.175 M, about 0.19 M, about 0.195 M, about 0.199 M, about 0.2 M, or any value or range of values from greater than zero to about 0.2 M, without limitation unless expressly stated otherwise herein. Notably, when the performance-enhancing additive was DCDA, resistance within the electrochemical cell increased dramatically at amounts of about 0.2 M or more, to the extent that the electrochemical cell would not function properly.

As noted above with regard to solvent(s) and electron withdrawing compound(s), the particular performance enhancing additive(s) included in a given electrolyte system may be chosen based on the particular application for the electrochemical cell with which the performance enhancing additive(s) are to be utilized, based on the composition of other components of the electrolyte system, based on the composition of other components of the electrochemical cell (such as the anode, cathode, and/or separator), or other factors as would be understood by those having ordinary skill in the art upon reading the present disclosure.

Suitable species and amounts of lithium ion-transporting compounds and performance-enhancing additives of exemplary electrolyte system compositions are detailed below in Table 3, according to various illustrative embodiments.

Accordingly, in preferred approaches the electrolyte system as a whole includes at least one solvent, at least one electron withdrawing compound, at least one performance-enhancing additive, and at least one lithium ion-transporting compound, in accordance with the parameters set forth hereinabove. The particular combination of species making up the foregoing components, or the particular combination of components, may be chosen based on various factors such as desired performance characteristics of electrochemical cells with which they are to be implemented (such as specific energy, cycle life, power, charge/discharge rate, etc., based on the particular application and/or composition of other components of the electrochemical cell with which the electrolyte system is to be utilized, based on the composition of other components of the electrochemical cell (such as anode, cathode, and/or separator), etc. as described hereinabove and as would be appreciated by skilled artisans informed of the contents of this disclosure.

According to further implementations, the electrolyte system may be implemented in an electrochemical cell including a lithium-based anode. The lithium-based anode preferably includes an interphase formed on surface(s) thereof, wherein the interphase is formed by interaction between an active material of the lithium-based anode, the performance enhancing additive(s), and/or derivative(s) of the solvent(s), the electron withdrawing compound(s), the performance-enhancing additive(s), or any permutation or combination thereof.

The active material of the lithium-based anode preferably comprises elemental lithium or a lithium alloy. For instance, the lithium alloy may include lithium-magnesium, lithium-sulfur, or a combination thereof.

According to still further implementations, the electrolyte system may be implemented in an electrochemical cell including a cathode having a sulfur composite composition. The cathode preferably includes an interphase formed on surface(s) thereof, wherein the interphase is formed by interaction between an active material of the cathode, the performance enhancing additive(s), and/or derivative(s) of the solvent(s), the electron withdrawing compound(s), the performance-enhancing additive(s), or any permutation or combination thereof.

According to more embodiments, electrochemical cells may comprise the aforementioned electrolyte system(s), anode(s), cathode(s), and a separator having a composition compatible therewith, as would be appreciated by a person having ordinary skill in the art upon reading the present disclosure. The electrochemical cell may be characterized by a coin configuration, a cylindrical configuration, a prismatic configuration, a pouch configuration, or any other suitable configuration or arrangement that would be appreciated by skilled artisans informed of the contents of these descriptions.

Additional features and advantages of the various inventive aspects will be appreciated upon a full review of the descriptions presented herein, along with the accompanying figures. It shall be understood that these inventive concepts may be combined in any suitable manner unless expressly stated otherwise in this disclosure. Accordingly, the inventive aspects are to be considered modular, and may be rearranged, combined, synthesized, or otherwise utilized in any manner that would be appreciated by those having ordinary skill in the art upon reading this disclosure. Moreover, suitable equivalent compounds, formulations, structural arrangements, etc. that would be appreciated as suitable by skilled artisans in the context of the invention as a whole upon completing a review of the full contents of this application are to be understood as part of the invention, without limitation, unless absent express disclaimer clearly indicating the contrary.

BRIEF DESCRIPTION OF THE DRAWINGS

FIG. 3 illustrates a simplified schematic of a reaction pathway for chalcogenide materials to form free radicals that facilitate conversion of lithium polysulfides, in accordance with one embodiment.

FIG. 4A is a plot showing discharge capacity versus cycle number for the inventive electrolyte system 401 and the control electrolyte system 402, according to one embodiment.

FIG. 4B is a plot showing columbic efficiency versus cycle number for the inventive electrolyte system 401 and the control electrolyte system 402, according to the same embodiment.

FIG. 4C is a plot showing rating capacity for the inventive electrolyte system 401 and the control electrolyte system 402, according to the same embodiment.

FIG. 4D is a plot showing discharge capacity versus charge rate for the inventive electrolyte system 401 and the control electrolyte system 402, according to the same embodiment.

FIG. 4E is a plot showing potential versus capacity for the inventive electrolyte system 401 and the control electrolyte system 402, according to the same embodiment.

FIG. 9A is a simplified schematic of an electrochemical cell characterized by a coin cell arrangement, according to one implementation of the presently disclosed inventive concepts.

FIG. 9B depicts various components of the coin cell arrangement shown in FIG. 9A, according to a simplified schematic exploded view.

FIG. 10A is a simplified schematic of an electrochemical cell characterized by a cylindrical cell arrangement, according to one aspect of the presently disclosed inventive concepts.

FIG. 10B is a simplified schematic cut-out view of exemplary components of the cylindrical cell arrangement shown in FIG. 10A, according to one implementation of the presently disclosed inventive concepts.

DETAILED DESCRIPTION

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

To address the problems highlighted hereinabove regarding safety and efficiency of electrolyte systems for lithium-based batteries with suitable performance, one principal aspect of the presently disclosed inventive concepts includes an electrolyte system including compounds that contain a motif referred-to herein as an "alpha-hydrogenated, selectively beta-functionalized" (or, equivalently, an "alpha-hydrogenated, selectively beta functionalized") structure. Preferably, the solvent system is capable of satisfying the multitude of stringent requirements for lithium-based batteries noted above.

The inventors propose the exemplary class of alpha-hydrogenated, selectively beta-functionalized compounds advantageously exhibit similar or superior performance because the beta position is not sterically hindered from participating in desired chemical reactions (e.g., facilitating lithium polysulfide conversion via redox reactions, preferential formation of short-chain lithium polysulfide species, robust formation of a SEI, high solvation capability with respect to lithium salts, etc.), while simultaneously preserving the electron density of the electron withdrawing group adjacent to the alpha carbon of the motif. As described in greater detail hereinbelow, without such selective beta modification, solvent compounds otherwise exhibiting a similar (e.g., alpha-hydrogenated but not beta modified) motif undesirably tend to break down into gases in a cascade of reductive decomposition reactions and ultimately evaporate away from the solvent system.

Similarly, the inventive concepts presented herein relate to the use of such electrolyte systems with a lithium-based anode material in an electrochemical cell. As utilized herein, the term "lithium-based" shall be understood as referring to pure lithium metal, as well as lithium alloys or composites (such as Li—Mg, Li—S, Li—C, Li—Al, Li—Fe, and any other suitable equivalent(s) thereof that would be appreciated by skilled artisans upon reading the present descriptions) or combination(s) thereof.

Figure 1A:
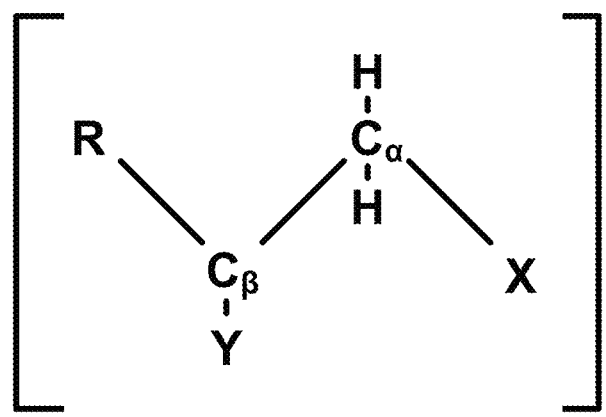
FIGS. 1A-1B are simplified schematics of the chemical structure of the inventive motif characteristic of compounds included in the inventive electrolyte systems described herein, according to various embodiments.
Figure 1B:
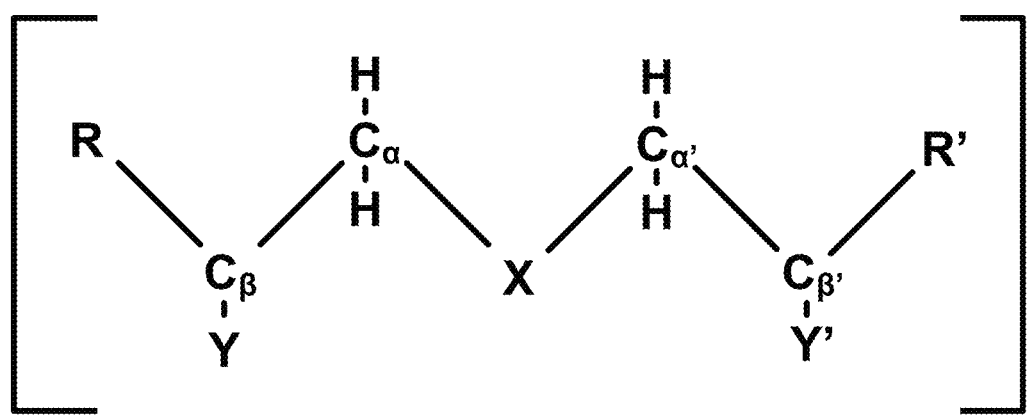

FIGS. 1A-1B are simplified schematics of chemical structures of the motif characteristic of compounds included in the inventive electrolyte systems described herein, according to various embodiments. As an option, the motifs shown in FIGS. 1A-1B may be implemented in the context of any one or more of the embodiments set forth in any previous and/or subsequent figure(s) and/or description thereof. Of course, however, the motifs may be implemented in the context of any desired environment. For instance, solvent systems including amides such as dimethylacetamide (DMA), dimethylformamide (DMF), or any other suitable equivalent(s) thereof that would be appreciated by those having ordinary skill in the art upon reading the present disclosure. Further, the aforementioned definitions may equally apply to the description below.

As shown in FIG. 1A, the motif generally includes an alpha carbon $C\alpha$ that is hydrogenated (i.e., has at least one hydrogen bonded thereto, preferably is saturated with hydrogen, and more preferably is not directly bonded to another electron withdrawing group other than X), and directly bonded to a beta carbon $C\beta$ and an electron withdrawing group X. According to various embodiments, the electron withdrawing group is characterized by an electronegativity greater than carbon, and preferably by an electronegativity characterized by an electronegativity greater than the alpha carbon to which X is bonded. Preferably, X is not a halogen. Accordingly, in preferred implementations X may be selected from a group consisting of nitrogen, oxygen, and sulfur.

With continuing reference to FIG. 1A, In embodiments where $C\alpha$ is not saturated with hydrogen, $C\alpha$ may be doubly bonded to X, such as for a terminal aldehyde in which $C\alpha$ is bonded to a single hydrogen and doubly bonded to X, and X is oxygen.

In addition to being bonded to the alpha carbon $C\alpha$, the beta carbon $C\beta$ is bonded to a modifying group Y and an aliphatic or aromatic side chain R. Whether R is aliphatic or aromatic, shorter chains, e.g. C1-C20, are preferred to minimize the overall mass of the molecule. Moreover, the backbone of R may, in various implementations, include elements other than carbon, including but not limited to phosphorus, sulfur, oxygen, nitrogen, etc., as would be understood by a person having ordinary skill in the art upon reading the present disclosures. In some approaches, R may be functionalized, such as with halogen(s), amine(s), amide(s), oxide(s), thiol(s), etc., as would be understood by a person having ordinary skill in the art upon reading the present disclosures.

Optionally, depending on the identity of Y and R, and bonding between the beta carbon $C\beta$, Y, and R, the beta carbon $C\beta$ may optionally be bonded to a hydrogen (not shown), or doubly bonded to either Y or R.

In accordance with the embodiment depicted in FIG. 1A, the electron withdrawing group X is a terminal functional group of the molecule containing the alpha-hydrogenated, selectively beta-functionalized motif.

Of course, in alternative embodiments, such as shown in FIG. 1B, the electron withdrawing group X may be part of the backbone of the molecule, such as for a secondary or tertiary amine (where X is nitrogen), an ether (where X is oxygen), or an organosulfur (where X is sulfur), etc., as will be appreciated by those having ordinary skill in the art upon reading the present descriptions.

With continuing reference to FIG. 1B, and except as noted immediately hereinabove, the same considerations with respect to bonding and identity of Cu, CB, Y, and R as described with respect to FIG. 1A apply to the motif as shown in FIG. 1B. In addition, similar considerations apply with respect to Ca', Cp', Y', and R', with the exception that in certain arrangements R and R' may be part of the same aromatic structure connecting the molecule into a ring (or multi-ring) structure. For instance, and as described in greater detail below with respect to FIGS. 2B-3, R and R' may form a connected double-ring structure. Of course, it shall be understood that Ca, CB, Y, R, Ca', CB', Y', and R' may each independently be defined according to any suitable combination of characteristics (identity, bonding, etc.) described hereinabove, according to various embodiments.

Figures 1, 2A:
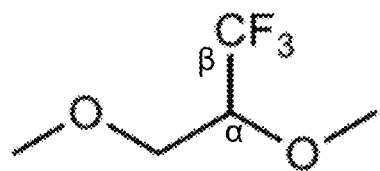
FIGS. 2A-1 through 2B-3 are simplified schematics of the chemical structures of several exemplary species of alpha-hydrogenated, selectively beta-functionalized compounds, according to different approaches.
Figures 1, 2B:
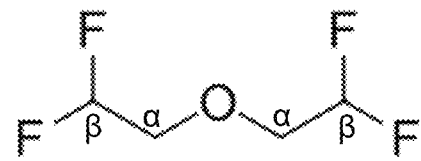
Figures 2, 2A:
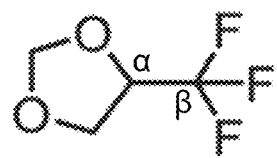
Figures 2, 2B:
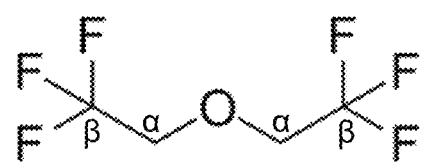
Figures 2, 2A, 3:
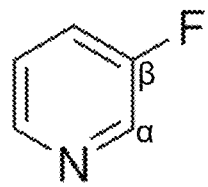
Figures 2, 2B, 3:
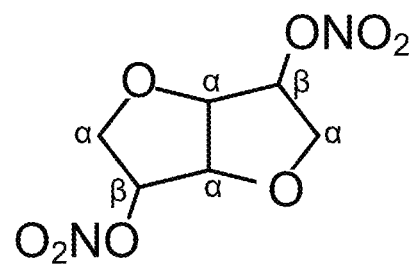
Figure 3:
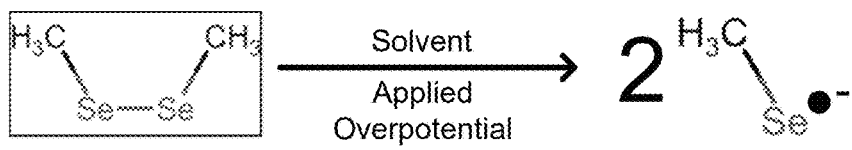

FIGS. 2A-1 through 2A-3 are simplified schematics of the chemical structures of several exemplary species of alpha-hydrogenated, selectively beta-functionalized compounds, where the beta modifications are fluorine (i.e., Y=F), while FIG. 2B-3 depicts an exemplary alpha-hydrogenated, selectively beta-functionalized compound where the beta modification is not fluorine (i.e., Y=ONO$_2$), according to different approaches. As an option, the exemplary compounds may be implemented in the context of any one or more of the embodiments set forth in any previous and/or subsequent figure(s) and/or description thereof. Of course, however, the compounds may be implemented in the context of any desired environment. Further, the aforementioned definitions may equally apply to the description below.

As shown in FIGS. 2A-1, 2A-2, and 2A-3, the exemplary electron-withdrawing compounds (1,1,1-trifluoro-2,3-dimethyoxypropane (TFDMP), 4-(trifluoromethyl)-1,3-dioxolane (TFDOL), and (3-fluoropyridine) (3F—P), respectively) fit the motif shown in FIG. 1A. In FIG. 2A-3, R forms an aromatic ring that connects back to Ca. For the structures shown in FIGS. 2A-1 and 2A-2, X is oxygen, meanwhile for the structure shown in FIG. 2A-3, X is nitrogen.

The exemplary electron withdrawing compounds shown in FIGS. 2B-1, 2B-2, and 2B-3 (monofluoride bis(2-fluorocthyl) ether (BFE), bis(2,2,2-trifluoroethyl) ether (BTFE), and isosorbide dinitrate (ISDN), respectively); fit the motif as shown in FIG. 1B. For the electron withdrawing compounds shown in FIGS. 2B-1, 2B-2, and 2B-3, X is oxygen. For the electron withdrawing compounds shown in FIGS. 2B-1 and 2B-2, Y is fluorine. For the electron withdrawing compound shown in FIG. 2B-3 only, Y is ONO$_2$.

Of course, the exemplary structures shown in FIGS. 2A-1 through 2B-3 are to be understood as illustrative of the scope of electron withdrawing compounds according to various embodiments of the inventive concepts presented herein. Other compounds including the motifs shown in FIGS. 1A and/or 1B may also be suitable electron withdrawing compounds, according to different implementations, such as detailed below with reference to Table 2. In particular, exemplary suitable electron withdrawing compounds such as 2,2-dimethoxy-4-trifluoromethyl-1,3-dioxolane ether (DTDL), 1,1,1-trifluoro-2-(2-(2-(2,2,2-trifluorocthoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), 2,2,2-trifluoroethyl 2-fluorocthyl ether (TFFE), 1,1-difluoroethyl-2-fluoroethyl ether (DFE), fluorinated 1,4-dimethoxylbutane (FDMB), 1,1,2,2-tetrafluorocthyl 2,2,3,3-tetrafluororopyl ether (TTE), bis(2,2,3,3-tetrafluoropropyl) ether) (BTFPE), 2,2,2-trifluoroethyl 1,1,2,2-tetrafluoroethyl ether (TFTFE), tris(2,2,2-trifluoroethyl)phosphate, bis(2,2,2-trifluoroethyl)methylphosphonate, or other suitable equivalents and combinations thereof as would be appreciated by those having ordinary skill in the art upon reading the present disclosures may be employed as electron-withdrawing compounds without departing from the scope of the inventive concepts set forth herein. Moreover, combinations of electron withdrawing groups may be employed without departing from the scope of the presently described inventive concepts.

Further still, those having ordinary skill in the art will appreciate that compounds such as shown in FIG. 2B-3, which excludes any fluorine or other halogen, are particularly preferred species of electron withdrawing compounds as they do not raise the environmental concerns associated with heavily halogenated, particularly heavily fluorinated, compounds. Indeed, according to certain approaches, the exemplary electron withdrawing groups discussed hereinabove, analogs thereof, and/or derivatives thereof, may be modified to substitute halide functional groups with —ONO$_2$ functional groups to form nitrate esters, and mitigate or eliminate environmental concerns associated with PFAS and other so-called "forever chemicals".

Similarly, in particularly preferred embodiments the inventive electrolyte solvent systems may include lithiated salts that do not include any halogen component, such as LiClO$_4$, or other suitable equivalents (and combinations) thereof that would be appreciated by a person having ordinary skill in the art upon reading the present disclosure.

Still yet even further, the R and/or R' groups of preferred electron withdrawing compounds in the context of the inventive concepts are characterized by minimal length, again to minimize the mass contribution of the electron withdrawing compound to the electrolyte system overall, and electrochemical cells including such electrolyte systems.

FIG. 3 illustrates a simplified schematic of a reaction pathway for chalcogenide materials to form free radicals that facilitate conversion of lithium polysulfides, in accordance with one embodiment.

FIGS. 4A-4E are simplified graphs showing performance characteristics of an electrolyte system 401 including an inventive electrolyte system as disclosed herein and in accordance with one embodiment with reference to a control electrolyte system 402 implementing an electrolyte system otherwise identical to the inventive electrolyte system, but omitting any chalcogenide.

Figure 4A:
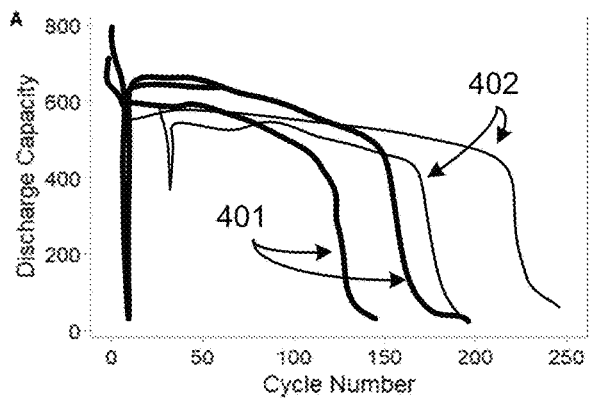
FIGS. 4A-4E are simplified graphs showing performance characteristics of an electrolyte system 401 including an inventive electrolyte system as disclosed herein and in accordance with one embodiment with reference to a control electrolyte system 402 implementing an electrolyte system otherwise identical to the inventive electrolyte system, but omitting any chalcogenide.

FIG. 4A is a plot showing discharge capacity versus cycle number for the inventive electrolyte system 401 and the control electrolyte system 402, according to one embodiment.

Figure 4B:
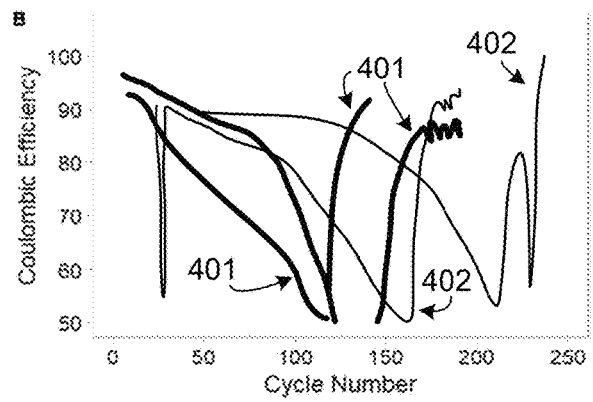

FIG. 4B is a plot showing columbic efficiency versus cycle number for the inventive electrolyte system 401 and the control electrolyte system 402, according to the same embodiment.

Figure 4C:
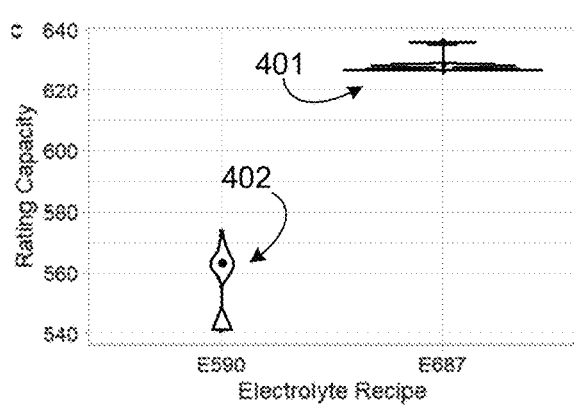

FIG. 4C is a plot showing rating capacity for the inventive electrolyte system 401 and the control electrolyte system 402, according to the same embodiment.

Figure 4D:
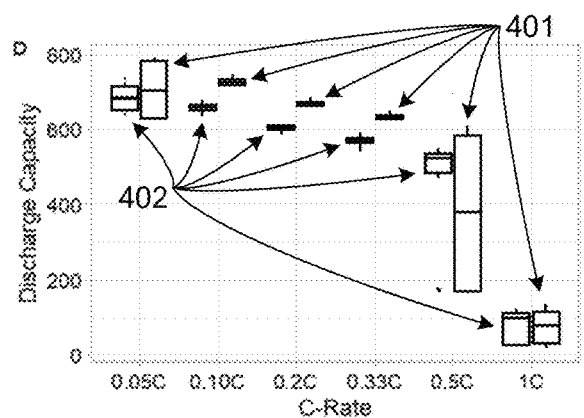

FIG. 4D is a plot showing discharge capacity versus charge/discharge rate for the inventive electrolyte system 401 and the control electrolyte system 402, according to the same embodiment.

Figure 4E:
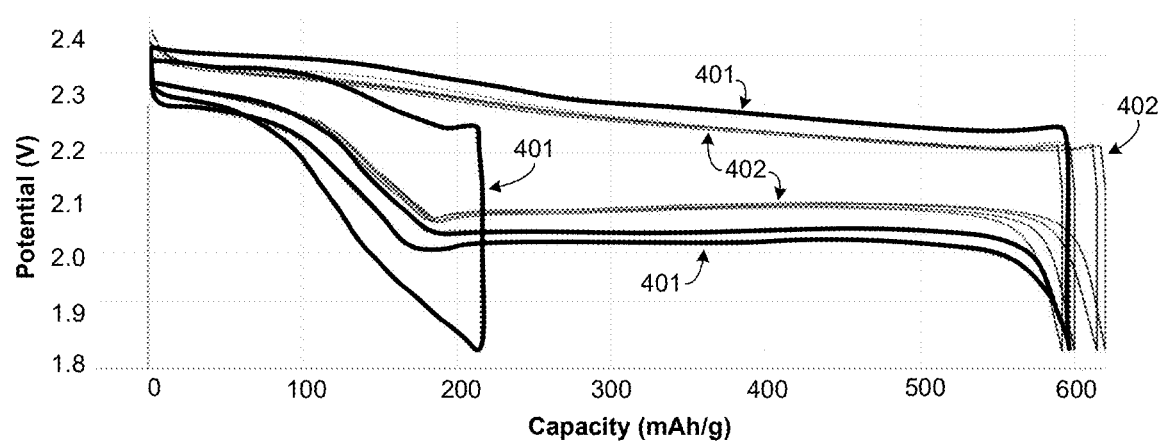

FIG. 4E is a plot showing potential versus capacity for the inventive electrolyte system 401 and the control electrolyte system 402, according to the same embodiment.

The inventive electrolyte system 401 and control electrolyte system 402 each respectively include two solvents, an electron withdrawing compound, and two lithium ion-transporting compounds, in the same amount. The inventive electrolyte system 401 further includes about 1 wt % of a chalcogenide DMDSe.

As can be seen from FIGS. 4A-4E, the inventive electrolyte system 401 exhibits a more pronounced feature corresponding to presence/creation of $Li_2S(s)$ relative to the control electrochemical cell 402. Moreover, capacity of the inventive electrochemical cell 401 is reversibly increased at every rate. Without wishing to be bound to any particular theory, the inventors propose the improved performance of the inventive electrochemical cell may, at least in part, be attributed to increased capacity through the second discharge plateau, owing to improved liquid-solid reaction kinetics of polysulfide conversion (Equation 1(c), above).

Similar experiments including a second inventive electrolyte system 403 which employs an identical formulation as inventive electrolyte system 401, but including DPDSe rather than DMDSe as the chalcogenide component, exhibited improved performance with respect to the control electrolyte system 402, but lesser performance on all metrics relative to inventive electrolyte system 401. Again without wishing to be bound to any particular theory, the inventors propose that DPDSe assists kinetics of liquid-liquid conversion reactions (Equations 1(a)-1(b)), which are not the rate limiting step until removal of the greater barrier presented by liquid-solid conversion (Equation 1(c)), and alleviated by inclusion of DMDSe.

In further experiments the inventors varied the amount of DMDSe in the inventive electrolyte system 401, testing embodiments including 0.5 wt % DMDSe, 1.0 wt % DMDSe, and 2.0 wt % DMDSe, but otherwise being identical to the formulation described hereinabove for inventive electrolyte system 401.

Despite expectations for further increased performance with increasing DMDSe concentration beyond 1 wt %, the opposite relationship was observed, with notable losses in discharge capacity, coulombic efficiency, and rating capacity in amounts greater than 1 wt %. Despite expecting increased improvement of lithium polysulfide conversion reaction kinetics with higher amount of available free radicals (i.e., higher concentration of DMDSe), the inventors postulate that increased DMDSe achieves optimal improvement of liquid-to-solid (and, to a lesser degree, solid-solid) reaction kinetics to the point of no longer being the rate limiting step in the overall pathway when included in an amount of about 1 wt %. Above this concentration, lithium polysulfide shuttling thus may increase without any corresponding benefit to discharge capacity. Put another way, including DMDSe as the chalcogenide improves kinetics of the lower plateau (liquid-to-solid reactions), while including DPDSe improves kinetics of the upper plateau (solid-liquid reaction). When the electrolyte system includes certain electron-withdrawing compounds (such as BTFE) which independently assist with reactions going into liquid state, addition of a chalcogenide that facilitates liquid-to-solid reactions provides a synergistic improvement to overall lithium polysulfide conversion and thus improves sulfur utilization in the resulting electrochemical cell.

The above is merely one example of the aforementioned observations that particular electrolyte system compositions may not necessarily follow conventional trends and expectations with respect to reaction kinetics and corresponding performance characteristics.

In still further experiments, the inventors tested formulations of an inventive electrolyte system similar to inventive electrolyte system 401, but including a combination of DMDSe and DPDSe in equal amounts of 0.5 wt % each, and 1.0 wt % each, since these concentration ranges produced the best results for similar inventive electrolyte systems as shown with reference to FIGS. 4A-4E, and described hereinabove.

In general, the mixed diselenide electrolyte formulation exhibited little difference with respect to cycle life, and a slight improvement to capacity and Coulombic efficiency at 1 wt % concentration, despite expectations for lower Coulombic efficiency due to presence of greater amount of selenide (i.e., a system including 1 wt % each DMDSe and DPDSe is comparable in terms of selenide concentration to a system including 2 wt % DMDSe, which was observed to exhibit poor Coulombic efficiency relative to 1 wt % DMDSe alone, but the combined 1 wt % each of DMDSe and DPDSe did not exhibit the same loss, indeed a slight increase was observed).

In addition to testing various species of chalcogenide, the inventors investigated different electron withdrawing compounds (particularly hydrofluoroethers TTE, BTFE, or FDMB) at different concentrations, in formulations otherwise similar to inventive electrolyte system 401 shown and described hereinabove regarding FIGS. 4A-4E.

Figure 5A:
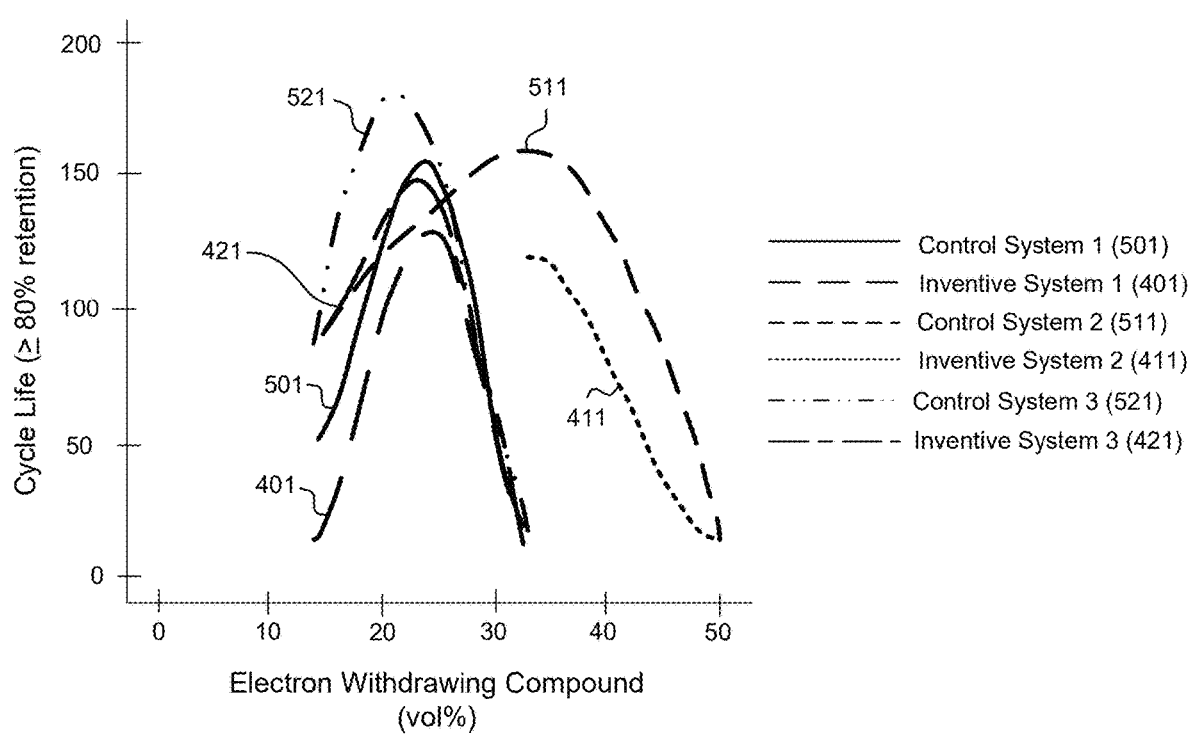
FIG. 5A is a plot showing cycle life versus fluoroether concentration for inventive electrolyte systems 401, 411, and 421 and corresponding control electrolyte systems 402, 412, and 422, according to several exemplary embodiments.
Figure 5B:
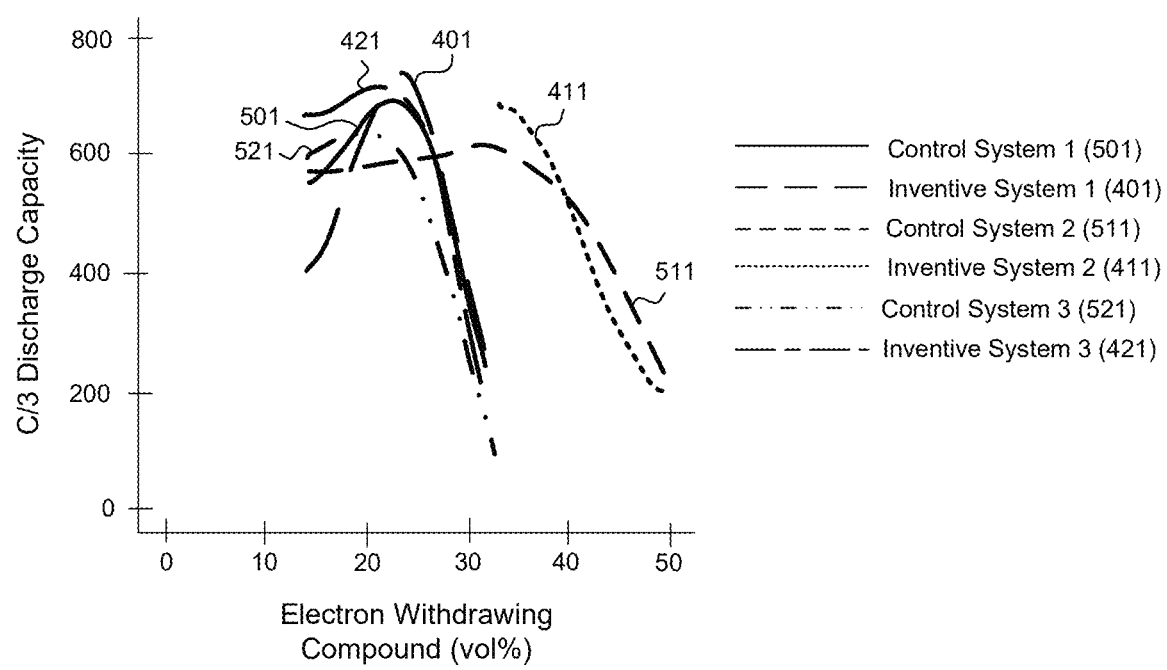
FIG. 5B is a plot showing cycle life versus fluoroether concentration for inventive electrolyte systems 401, 411, and 421 and corresponding control electrolyte systems 402, 412, and 422, according to several exemplary embodiments.

The results of these experiments are summarized in Table 1 and FIGS. 5A-5B.

TABLE 1

Lithium-based battery performance as a function of hydrofluoroether composition

| Electron Withdrawing Compound | Conc (vol %) | Control C/3 Capacity | DMDSe C/3 Capacity | Control Cycle Life | DMDSe Cycle Life |
|---|---|---|---|---|---|
| TTE | 14% | 600 | 660 | 110 | 90 |
| TTE | 25% | 620 | 660 | 170 | 140 |
| TTE | 33% | 150 | 140 | 14 | 0 |
| BTFE | 14% | 550 | 400 | 50 | 14 |
| BTFE | 25% | 660 | 710 | 150 | 125 |
| BTFE | 33% | 200 | 200 | 14 | 0 |
| FDMB | 14% | 565 | Not tested | 90 | Not tested |
| FDMB | 25% | 590 | Not tested | 140 | Not tested |
| FDMB | 33% | 610 | 680 | 160 | 120 |
| FDMB | 50% | 200 | 200 | 14 | 0 |

Note that the capacities shown in Table 1 are reported on an electrode basis rather than on a sulfur basis.

FIGS. 5A-5B depict exemplary curves for the inventive electrolyte systems 401, 411, and 421 and corresponding control electrolyte systems 501, 511, and 521. Per Table 1, the various electrolyte systems included two solvents, one electron withdrawing compound (respectively, BTFE for electrolyte systems 401 and 501, FDMB for electrolyte systems 411 and 511, and TTE for electrolyte systems 421 and 521), two lithium ion-transporting compounds (LITFSI and $LiNO_3$), and a chalcogenide component (DMDSe), in the same amounts, respectively, and within the ranges described herein.

FIG. 5A depicts performance of the cells with respect to cycle life (defined, in accordance with these experiments, by retention of at least 80% capacity following discharge) as a function of hydrofluoroether concentration, while FIG. 5B depicts performance with respect to capacity as a function of hydrofluoroether concentration.

As mentioned briefly above, testing the different hydrofluoroethers, and concentrations thereof, produced surprising results that do not follow the conventional wisdom regarding role of hydrofluoroether (and indeed, fluorine generally) in lithium-based batteries. In general, addition of fluorine in an electrolyte system of a lithium-based battery is correlated with increased life cycle of the resulting battery. This is because, conventionally, it has been understood that added fluorine corresponds to decreased solvation capability and wettability of (typically concentrated, and highly viscous) electrolyte toward electrode surfaces.

Moreover, hydrofluoroethers and similar electron withdrawing compounds are conventionally understood (and indeed designed) to be inert towards both electrodes of lithium-based batteries. Moreover still, for lithium-sulfur battery chemistries, strict limitations on the amount of salt that can be included due to limited solubility in the remaining components of the electrolyte system, and the battery as a whole.

The presently disclosed inventive concepts employ these electron withdrawing compounds in electrolytes with low salt concentration due to lower Lewis acid-base interaction with polysulfides (less solubility), and previous presumptions that these compounds, particularly hydrofluoroethers, were "known" to be inert towards the notoriously reactive, lithium-based anode material.

The presently disclosed inventive concepts employ these electron withdrawing compounds in electrolytes with low salt concentration due to lower Lewis acid-base interaction with polysulfides (less solubility), and previous presumptions that these compounds, particularly hydrofluoroethers, were "known" to be inert towards the notoriously reactive, lithium-based anode material.

Figure 6A:
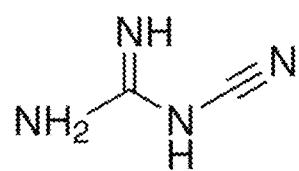
FIGS. 6A-6D are simplified schematics of the chemical structures of performance-enhancing additives, in accordance with several embodiments.
Figure 6B:
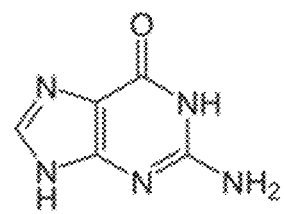
Figure 6C:
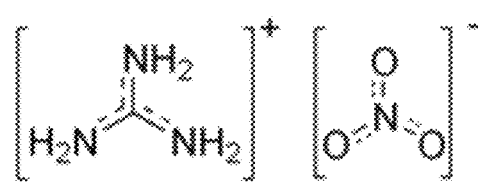
Figure 6D:
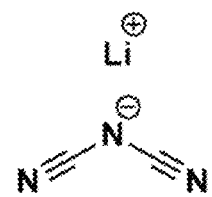

FIGS. 6A-6D are simplified schematics of the chemical structures of performance-enhancing additives, in accordance with several embodiments. FIG. 6A shows the structure of dicyandiamide, while FIG. 6B shows the structure of guanine, FIG. 6C shows the chemical structure of guanidine nitrate, and FIG. 6D depicts the chemical structure of lithium dicyanamide, according to illustrative embodiments.

Without wishing to be bound to any particular theory, the inventors propose that the inventive electrolyte systems described herein form a protective solid-electrolyte interphase (SEI) on surfaces of both the cathode and anode of the lithium-based electrochemical cells into which the electrolyte systems are introduced.

With respect to the contribution of the solvent(s) and electron withdrawing compound(s) to the SEI, refer to U.S. Provisional Patent Application No. 63/624,202 and its progeny for a detailed investigation and discussion of the mechanism and chemical structure of components of the SEI formed therewith.

With respect to the performance-enhancing additive, and again without wishing to be bound to any particular theory, the inventors propose suitable additives, such as acetonitrile, azobisisobutyronitrile (AIBN), cyanamide, lithium dicyanamide, dicyandiamide (DCDA), guanine, guanidine nitrate, guanidine thiocyante, guanidine p-tolunesulfonate, guanidine trifluoromethanolate, 2-guanidinobenzimidazole, guanidine hydrochloride, guanidine carbonate, guanidine bromide, guanidine iodide, guanidine acetate, guanidine sulfate, guanidine phosphate, succionitrile, or any combination thereof, form a protective thin film polymer on or around surface(s) of the electrodes, and this protective film both mitigates the well-known polysulfide shuttling effect and its detrimental effects as well as protects the anode in particular from delithiation (stripping) during cycling of the electrochemical cell.

Figure 7A:
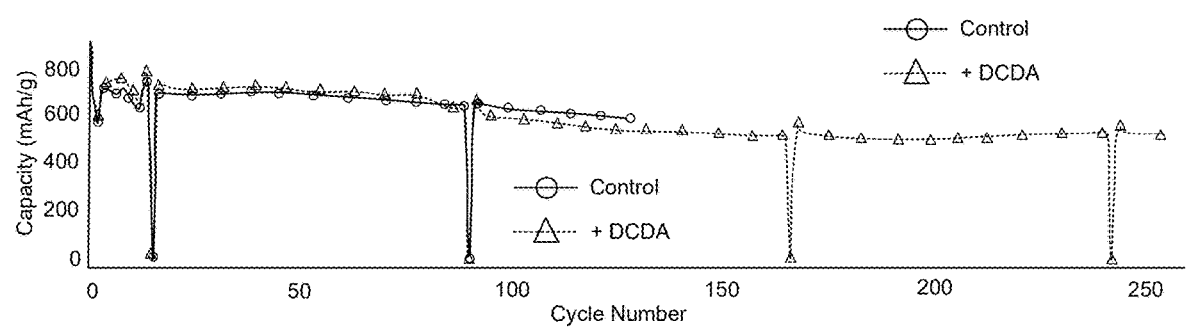
FIG. 7A is a plot comparing capacity retention over cycle life of a lithium-sulfur electrochemical cell having a baseline electrolyte composition (control) versus a lithium-sulfur electrochemical cell having a baseline electrolyte composition but also including DCDA additive (+DCDA), in accordance with one embodiment.
Figure 7B:
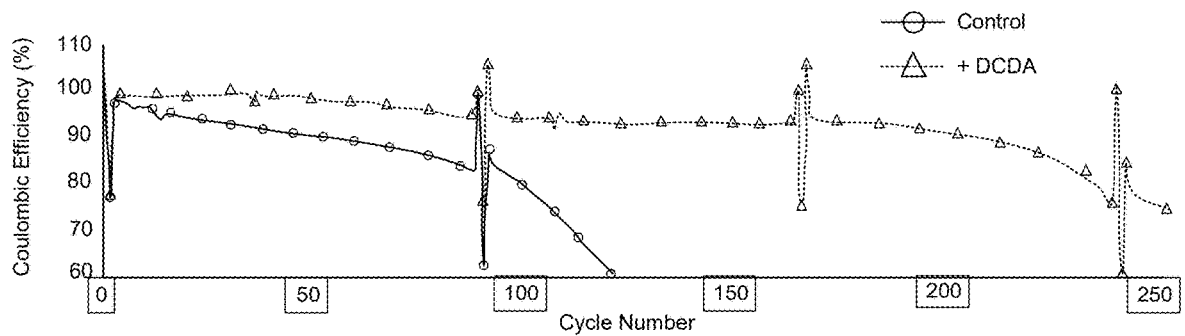
FIG. 7B is a plot comparing Coulombic efficiency of a lithium-sulfur electrochemical cell having a baseline electrolyte composition (control) versus a lithium-sulfur electrochemical cell having a baseline electrolyte composition but also including DCDA additive (+DCDA), in accordance with one embodiment.

As a result, and as reflected in the data shown in FIGS. 7A-7B, both cycle life (FIGS. 7A-7B) and Coulombic efficiency (FIG. 7B) of lithium-based electrochemical cells implementing the inventive electrolyte system are dramatically improved.

For instance, referring again to FIGS. 7A-7B, it is evident that the control electrochemical cell (control, circular data points), which included an electrolyte system without any performance-enhancing additive, experienced dramatic reduction in Coulombic efficiency at around 90 cycles, and failed after about 100 cycles.

By comparison, lithium-based electrochemical cells including the inventive electrolyte system exhibit substantially improved retention of Coulombic efficiency, remaining above 80% for over 225 cycles. Indeed, select embodiments of lithium-based electrochemical cells implementing the inventive electrolyte system presently disclosed remained active (above 80% CE) for over 300 cycles.

Notably, and as shown in FIG. 7A in particular, these benefits were not associated with loss of specific capacity, which remained similar to the control, and stable over the longer cycle life of the inventive electrochemical cells.

Moreover, the electrochemical cell embodiments used to produce the comparative data shown in FIGS. 7A-7B were charged and discharged at a rate of C/3, but additional embodiments showed similar performance characteristics when charged at rates up to about 1 C, indicating the inventive electrolyte system described herein also may facilitate higher charge/discharge rates than typically achievable (e.g., about C/3) using similar electrochemical cells without the inventive electrolyte system described herein.

Figure 7C:
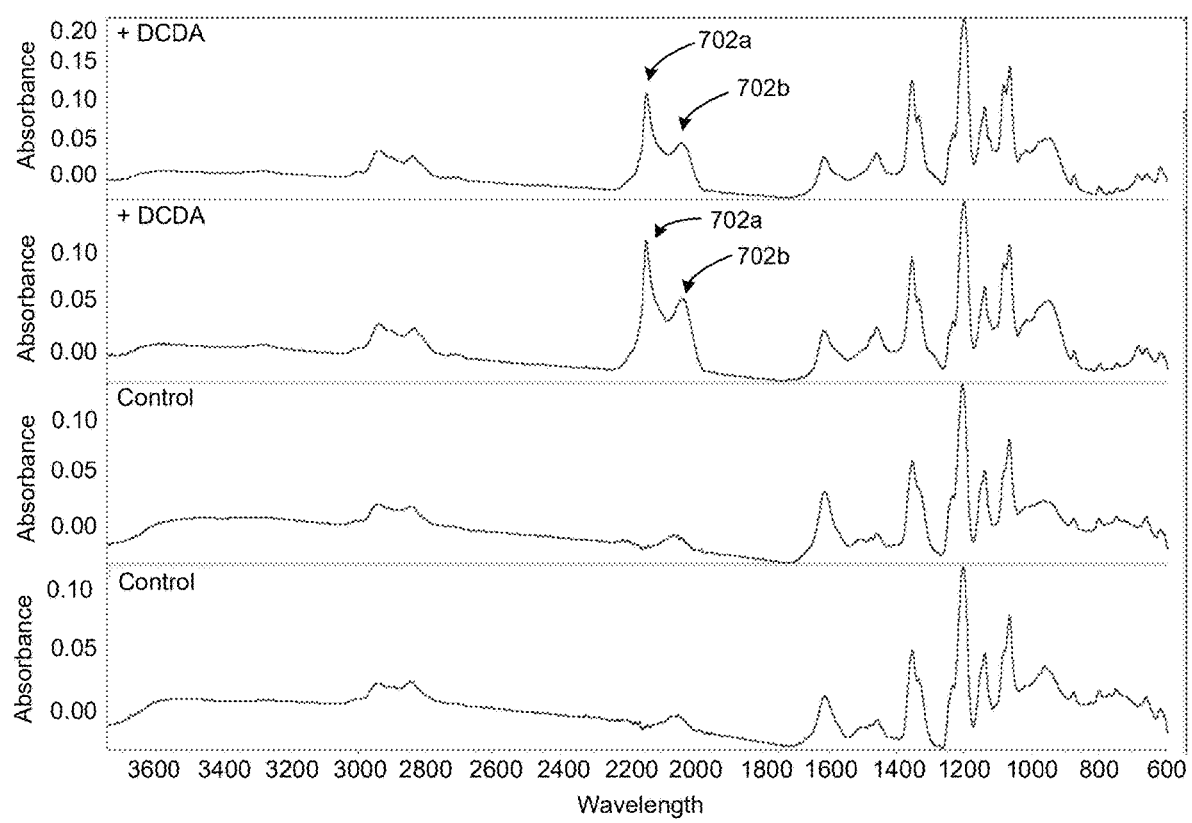
FIG. 7C is a plot showing Fourier-Transform Infrared (FTIR) spectra of the solid-electrolyte interphase (SEI) of two lithium-sulfur electrochemical cells having a baseline electrolyte composition (control) in comparison to the SEI of two lithium-sulfur electrochemical cells having a baseline electrolyte composition but also including DCDA additive (+DCDA), in accordance with one embodiment.

FIG. 7C is a plot showing Fourier-Transform Infrared (FTIR) spectra of the solid-electrolyte interphase (SEI) of two lithium-sulfur electrochemical cells having a baseline electrolyte composition (control) in comparison to the SEI of two inventive lithium-sulfur electrochemical cells having a baseline electrolyte composition but also including DCDA additive (+DCDA), in accordance with one embodiment.

As is apparent from the spectra, the inventive electrochemical cell SEIs exhibit two distinct peaks 702a, 702b in the vicinity of wavelength 2000-2200. Without wishing to be bound to any particular theory, the inventors postulate these peaks correspond to presence of lithium cyanate and lithium thiocyanate in or on the SEI. These compounds are proposed to form from decomposition of DCDA at the electron supplying anode in the presence of oxidative species such as polysulfides and nitrate in a synergistic manner.

Moreover, in view of the double-ended nature of the cyanate and thiocyanate anions, which each have both an 'anion' end with a Lewis basic negative charge and the other end has a Lewis basic nitrogen with a lone pair, the inventors propose these species are enhancing $Li^+$ transport, and/or increasing $Li^+$ concentration in the SEI, which advantageously enhances robustness against degradation of the interphase, and correspondingly extending cycle life of the electrochemical cell. Put another way, the cyanate and thiocyanate facilitate Li+ ion transport without (or at least with significantly less) degradation of the SEI, allowing Li+ present in the cell to be dedicated to normal cycling rather than rebuilding the SEI. This mechanism is particularly effective in later cycles, thus significantly extending the life of the electrochemical cell.

While FIGS. 6-7C and corresponding descriptions presented hereinabove feature an inventive electrolyte system including one or more compounds selected from acetonitrile, azobisisobutyronitrile (AIBN), cyanamide, lithium dicyanamide, dicyandiamide (DCDA), guanine, guanidine nitrate, guanidine thiocyante, guanidine p-tolunesulfonate, guanidine trifluoromethanolate, 2-guanidinobenzimidazole, guanidine hydrochloride, guanidine carbonate, guanidine bromide, guanidine iodide, guanidine acetate, guanidine sulfate, guanidine phosphate, succionitrile, or any combination thereof as the performance-enhancing additive, those having ordinary skill in the art will appreciate, upon reading the present descriptions, that other suitable equivalent(s) thereof may be implemented as performance-enhancing additive(s), in any suitable permutation, combination or amount, without departing from the scope of the inventive concepts disclosed herein.

For instance, derivatives of performance enhancing additive(s) that may form in the presence of other components of electrolyte systems described herein, isomers of performance enhancing additive(s), compounds with similar chemical motifs and/or structures, larger molecules including performance enhancing additive(s) or substantially similar structures as a portion of the larger molecular structure, etc. may be implemented as performance-enhancing additives while remaining within the scope of the inventive concepts presented herein.

Additionally or alternatively, compounds capable of forming a thin film protective polymer layer with a composition similar to the thin film formed by performance enhancing additive(s) or derivatives thereof (singly, or in combination with other components of the electrolyte system, in various approaches) may be utilized as performance-enhancing additives in the context of the presently disclosed inventive concepts.

Tables 2 and 3 below summarize various suitable compositions of the solvent system and aditional components of the inventive electrolyte systems described hereinabove, respectively and according to several exemplary embodiments. It shall be understood that the exemplary embodiments set forth in the tables are provided by way of illustration rather than limitation, and other compositions falling within the scope of the disclosure provided herein may be employed without departing from the scope of the inventive concepts presented herein.

Moreover, for brevity and organizational simplicity, the tables describe different components and suitable amounts individually, and in select combinations, but it shall be understood that any combination of different species may be employed in suitable amounts as informed by the broad ranges presented above may be employed without departing from the scope of the presently described inventive concepts.

For instance, any number of different species of solvent(s) electron withdrawing compound(s) lithium ion-transporting compound(s), and/or performance-enhancing additive(s), may be included in an electrolyte system composition with the only limitation being that the total amount of solvent(s), electron withdrawing compound(s), lithium ion-transporting compound(s), and performance-enhancing additive(s), respectively, fall within the broad ranges set forth hereinabove for the respective component.

TABLE 2

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| dimethoxyethane (DME) | 25.00 | none | 0 | bis(2-fluoroethyl) ether (BFE) | 75.00 |
| DME | 25.00 | none | 0 | 3-fluoropyridine (3FP) | 75.00 |
| DME | 25.00 | none | 0 | bis(2,2,2, trifluoroethyl) ether (BTFE) | 75.00 |
| DME | 25.00 | none | 0 | fluorinated 1,4-dimethoxylbutane (FDMB) | 75.00 |
| DME | 25.00 | none | 0 | isosorbide dinitrate (ISDN) | 75.00 |
| DME | 25.00 | none | 0 | 1,1,2,2-tetrafluoroethyl 2,2,3,3-tetrafluororopyl ether (TTE) | 75.00 |
| DME | 33.00 | none | 0 | BFE | 67.00 |
| DME | 33.00 | none | 0 | 3FP | 67.00 |
| DME | 33.00 | none | 0 | BFTE | 67.00 |
| DME | 33.00 | none | 0 | FDMB | 67.00 |
| DME | 33.00 | none | 0 | ISDN | 67.00 |
| DME | 33.00 | none | 0 | TTE | 67.00 |
| DME | 50.00 | none | 0 | BFE | 50.00 |
| DME | 50.00 | none | 0 | 3FP | 50.00 |
| DME | 50.00 | none | 0 | BFTE | 50.00 |
| DME | 50.00 | none | 0 | FDMB | 50.00 |
| DME | 50.00 | none | 0 | ISDN | 50.00 |
| DME | 50.00 | none | 0 | TTE | 50.00 |
| DME | 75.00 | none | 0 | BFE | 25.00 |
| DME | 75.00 | none | 0 | 3FP | 25.00 |
| DME | 75.00 | none | 0 | BFTE | 25.00 |
| DME | 75.00 | none | 0 | FDMB | 25.00 |
| DME | 75.00 | none | 0 | ISDN | 25.00 |
| DME | 75.00 | none | 0 | TTE | 25.00 |
| DME | 10.00 | dioxolane (DOL) | 15.00 | BFE | 75.00 |
| DME | 10.00 | DOL | 25.00 | BFE | 65.00 |
| DME | 10.00 | DOL | 33.00 | BFE | 57.00 |
| DME | 10.00 | DOL | 50.00 | BFE | 40.00 |
| DME | 10.00 | DOL | 65.00 | BFE | 25.00 |
| DME | 10.00 | DOL | 15.00 | 3FP | 75.00 |
| DME | 10.00 | DOL | 25.00 | 3FP | 65.00 |
| DME | 10.00 | DOL | 33.00 | 3FP | 57.00 |
| DME | 10.00 | DOL | 50.00 | 3FP | 40.00 |
| DME | 10.00 | DOL | 65.00 | 3FP | 25.00 |
| DME | 10.00 | DOL | 15.00 | BFTE | 75.00 |
| DME | 10.00 | DOL | 25.00 | BFTE | 65.00 |
| DME | 10.00 | DOL | 33.00 | BFTE | 57.00 |
| DME | 10.00 | DOL | 50.00 | BFTE | 40.00 |
| DME | 10.00 | DOL | 65.00 | BFTE | 25.00 |
| DME | 10.00 | DOL | 15.00 | FDMB | 75.00 |
| DME | 10.00 | DOL | 25.00 | FDMB | 65.00 |
| DME | 10.00 | DOL | 33.00 | FDMB | 57.00 |
| DME | 10.00 | DOL | 50.00 | FDMB | 40.00 |
| DME | 10.00 | DOL | 65.00 | FDMB | 25.00 |
| DME | 10.00 | DOL | 15.00 | ISDN | 75.00 |
| DME | 10.00 | DOL | 25.00 | ISDN | 65.00 |
| DME | 10.00 | DOL | 33.00 | ISDN | 57.00 |
| DME | 10.00 | DOL | 50.00 | ISDN | 40.00 |
| DME | 10.00 | DOL | 65.00 | ISDN | 25.00 |
| DME | 10.00 | DOL | 15.00 | TTE | 75.00 |
| DME | 10.00 | DOL | 25.00 | TTE | 65.00 |
| DME | 10.00 | DOL | 33.00 | TTE | 57.00 |
| DME | 10.00 | DOL | 50.00 | TTE | 40.00 |
| DME | 10.00 | DOL | 65.00 | TTE | 25.00 |
| DME | 10.00 | toluene (TOL) | 15.00 | BFE | 75.00 |
| DME | 10.00 | TOL | 25.00 | BFE | 65.00 |
| DME | 10.00 | TOL | 33.00 | BFE | 57.00 |
| DME | 10.00 | TOL | 50.00 | BFE | 40.00 |
| DME | 10.00 | TOL | 65.00 | BFE | 25.00 |
| DME | 10.00 | TOL | 15.00 | 3FP | 75.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DME | 10.00 | TOL | 25.00 | 3FP | 65.00 |
| DME | 10.00 | TOL | 33.00 | 3FP | 57.00 |
| DME | 10.00 | TOL | 50.00 | 3FP | 40.00 |
| DME | 10.00 | TOL | 65.00 | 3FP | 25.00 |
| DME | 10.00 | TOL | 15.00 | BFTE | 75.00 |
| DME | 10.00 | TOL | 25.00 | BFTE | 65.00 |
| DME | 10.00 | TOL | 33.00 | BFTE | 57.00 |
| DME | 10.00 | TOL | 50.00 | BFTE | 40.00 |
| DME | 10.00 | TOL | 65.00 | BFTE | 25.00 |
| DME | 10.00 | TOL | 15.00 | FDMB | 75.00 |
| DME | 10.00 | TOL | 25.00 | FDMB | 65.00 |
| DME | 10.00 | TOL | 33.00 | FDMB | 57.00 |
| DME | 10.00 | TOL | 50.00 | FDMB | 40.00 |
| DME | 10.00 | TOL | 65.00 | FDMB | 25.00 |
| DME | 10.00 | TOL | 15.00 | ISDN | 75.00 |
| DME | 10.00 | TOL | 25.00 | ISDN | 65.00 |
| DME | 10.00 | TOL | 33.00 | ISDN | 57.00 |
| DME | 10.00 | TOL | 50.00 | ISDN | 40.00 |
| DME | 10.00 | TOL | 65.00 | ISDN | 25.00 |
| DME | 10.00 | TOL | 15.00 | TTE | 75.00 |
| DME | 10.00 | TOL | 25.00 | TTE | 65.00 |
| DME | 10.00 | TOL | 33.00 | TTE | 57.00 |
| DME | 10.00 | TOL | 50.00 | TTE | 40.00 |
| DME | 10.00 | TOL | 65.00 | TTE | 25.00 |
| DME | 10.00 | sulfolane (SUL) | 15.00 | BFE | 75.00 |
| DME | 10.00 | SUL | 25.00 | BFE | 65.00 |
| DME | 10.00 | SUL | 33.00 | BFE | 57.00 |
| DME | 10.00 | SUL | 50.00 | BFE | 40.00 |
| DME | 10.00 | SUL | 65.00 | BFE | 25.00 |
| DME | 10.00 | SUL | 15.00 | 3FP | 75.00 |
| DME | 10.00 | SUL | 25.00 | 3FP | 65.00 |
| DME | 10.00 | SUL | 33.00 | 3FP | 57.00 |
| DME | 10.00 | SUL | 50.00 | 3FP | 40.00 |
| DME | 10.00 | SUL | 65.00 | 3FP | 25.00 |
| DME | 10.00 | SUL | 15.00 | BFTE | 75.00 |
| DME | 10.00 | SUL | 25.00 | BFTE | 65.00 |
| DME | 10.00 | SUL | 33.00 | BFTE | 57.00 |
| DME | 10.00 | SUL | 50.00 | BFTE | 40.00 |
| DME | 10.00 | SUL | 65.00 | BFTE | 25.00 |
| DME | 10.00 | SUL | 15.00 | FDMB | 75.00 |
| DME | 10.00 | SUL | 25.00 | FDMB | 65.00 |
| DME | 10.00 | SUL | 33.00 | FDMB | 57.00 |
| DME | 10.00 | SUL | 50.00 | FDMB | 40.00 |
| DME | 10.00 | SUL | 65.00 | FDMB | 25.00 |
| DME | 10.00 | SUL | 15.00 | ISDN | 75.00 |
| DME | 10.00 | SUL | 25.00 | ISDN | 65.00 |
| DME | 10.00 | SUL | 33.00 | ISDN | 57.00 |
| DME | 10.00 | SUL | 50.00 | ISDN | 40.00 |
| DME | 10.00 | SUL | 65.00 | ISDN | 25.00 |
| DME | 10.00 | SUL | 15.00 | TTE | 75.00 |
| DME | 10.00 | SUL | 25.00 | TTE | 65.00 |
| DME | 10.00 | SUL | 33.00 | TTE | 57.00 |
| DME | 10.00 | SUL | 50.00 | TTE | 40.00 |
| DME | 10.00 | SUL | 65.00 | TTE | 25.00 |
| DME | 25.00 | DOL | 15.00 | BFE | 60.00 |
| DME | 25.00 | DOL | 25.00 | BFE | 50.00 |
| DME | 25.00 | DOL | 33.00 | BFE | 42.00 |
| DME | 25.00 | DOL | 50.00 | BFE | 25.00 |
| DME | 25.00 | DOL | 15.00 | 3FP | 60.00 |
| DME | 25.00 | DOL | 25.00 | 3FP | 50.00 |
| DME | 25.00 | DOL | 33.00 | 3FP | 42.00 |
| DME | 25.00 | DOL | 50.00 | 3FP | 25.00 |
| DME | 25.00 | DOL | 15.00 | BFTE | 60.00 |
| DME | 25.00 | DOL | 25.00 | BFTE | 50.00 |
| DME | 25.00 | DOL | 33.00 | BFTE | 42.00 |
| DME | 25.00 | DOL | 50.00 | BFTE | 25.00 |
| DME | 25.00 | DOL | 15.00 | FDMB | 60.00 |
| DME | 25.00 | DOL | 25.00 | FDMB | 50.00 |
| DME | 25.00 | DOL | 33.00 | FDMB | 42.00 |
| DME | 25.00 | DOL | 50.00 | FDMB | 25.00 |
| DME | 25.00 | DOL | 15.00 | ISDN | 60.00 |
| DME | 25.00 | DOL | 25.00 | ISDN | 50.00 |
| DME | 25.00 | DOL | 33.00 | ISDN | 42.00 |
| DME | 25.00 | DOL | 50.00 | ISDN | 25.00 |
| DME | 25.00 | DOL | 15.00 | TTE | 60.00 |
| DME | 25.00 | DOL | 25.00 | TTE | 50.00 |
| DME | 25.00 | DOL | 33.00 | TTE | 42.00 |
| DME | 25.00 | DOL | 50.00 | TTE | 25.00 |
| DME | 25.00 | TOL | 15.00 | BFE | 60.00 |
| DME | 25.00 | TOL | 25.00 | BFE | 50.00 |
| DME | 25.00 | TOL | 33.00 | BFE | 42.00 |
| DME | 25.00 | TOL | 50.00 | BFE | 25.00 |
| DME | 25.00 | TOL | 15.00 | 3FP | 60.00 |
| DME | 25.00 | TOL | 25.00 | 3FP | 50.00 |
| DME | 25.00 | TOL | 33.00 | 3FP | 42.00 |
| DME | 25.00 | TOL | 50.00 | 3FP | 25.00 |
| DME | 25.00 | TOL | 15.00 | BFTE | 60.00 |
| DME | 25.00 | TOL | 25.00 | BFTE | 50.00 |
| DME | 25.00 | TOL | 33.00 | BFTE | 42.00 |
| DME | 25.00 | TOL | 50.00 | BFTE | 25.00 |
| DME | 25.00 | TOL | 15.00 | FDMB | 60.00 |
| DME | 25.00 | TOL | 25.00 | FDMB | 50.00 |
| DME | 25.00 | TOL | 33.00 | FDMB | 42.00 |
| DME | 25.00 | TOL | 50.00 | FDMB | 25.00 |
| DME | 25.00 | TOL | 15.00 | ISDN | 60.00 |
| DME | 25.00 | TOL | 25.00 | ISDN | 50.00 |
| DME | 25.00 | TOL | 33.00 | ISDN | 42.00 |
| DME | 25.00 | TOL | 50.00 | ISDN | 25.00 |
| DME | 25.00 | TOL | 15.00 | TTE | 60.00 |
| DME | 25.00 | TOL | 25.00 | TTE | 50.00 |
| DME | 25.00 | TOL | 33.00 | TTE | 42.00 |
| DME | 25.00 | TOL | 50.00 | TTE | 25.00 |
| DME | 25.00 | SUL | 15.00 | BFE | 60.00 |
| DME | 25.00 | SUL | 25.00 | BFE | 50.00 |
| DME | 25.00 | SUL | 33.00 | BFE | 42.00 |
| DME | 25.00 | SUL | 50.00 | BFE | 25.00 |
| DME | 25.00 | SUL | 15.00 | 3FP | 60.00 |
| DME | 25.00 | SUL | 25.00 | 3FP | 50.00 |
| DME | 25.00 | SUL | 33.00 | 3FP | 42.00 |
| DME | 25.00 | SUL | 50.00 | 3FP | 25.00 |
| DME | 25.00 | SUL | 15.00 | BFTE | 60.00 |
| DME | 25.00 | SUL | 25.00 | BFTE | 50.00 |
| DME | 25.00 | SUL | 33.00 | BFTE | 42.00 |
| DME | 25.00 | SUL | 50.00 | BFTE | 25.00 |
| DME | 25.00 | SUL | 15.00 | FDMB | 60.00 |
| DME | 25.00 | SUL | 25.00 | FDMB | 50.00 |
| DME | 25.00 | SUL | 33.00 | FDMB | 42.00 |
| DME | 25.00 | SUL | 50.00 | FDMB | 25.00 |
| DME | 25.00 | SUL | 15.00 | ISDN | 60.00 |
| DME | 25.00 | SUL | 25.00 | ISDN | 50.00 |
| DME | 25.00 | SUL | 33.00 | ISDN | 42.00 |
| DME | 25.00 | SUL | 50.00 | ISDN | 25.00 |
| DME | 25.00 | SUL | 15.00 | TTE | 60.00 |
| DME | 25.00 | SUL | 25.00 | TTE | 50.00 |
| DME | 25.00 | SUL | 33.00 | TTE | 42.00 |
| DME | 25.00 | SUL | 50.00 | TTE | 25.00 |
| DME | 33.00 | DOL | 15.00 | BFE | 52.00 |
| DME | 33.00 | DOL | 25.00 | BFE | 42.00 |
| DME | 33.00 | DOL | 33.00 | BFE | 34.00 |
| DME | 33.00 | DOL | 50.00 | BFE | 17.00 |
| DME | 33.00 | DOL | 15.00 | 3FP | 52.00 |
| DME | 33.00 | DOL | 25.00 | 3FP | 42.00 |
| DME | 33.00 | DOL | 33.00 | 3FP | 34.00 |
| DME | 33.00 | DOL | 50.00 | 3FP | 17.00 |
| DME | 33.00 | DOL | 15.00 | BFTE | 52.00 |
| DME | 33.00 | DOL | 25.00 | BFTE | 42.00 |
| DME | 33.00 | DOL | 33.00 | BFTE | 34.00 |
| DME | 33.00 | DOL | 50.00 | BFTE | 17.00 |
| DME | 33.00 | DOL | 15.00 | FDMB | 52.00 |
| DME | 33.00 | DOL | 25.00 | FDMB | 42.00 |
| DME | 33.00 | DOL | 33.00 | FDMB | 34.00 |
| DME | 33.00 | DOL | 50.00 | FDMB | 17.00 |
| DME | 33.00 | DOL | 15.00 | ISDN | 52.00 |
| DME | 33.00 | DOL | 25.00 | ISDN | 42.00 |
| DME | 33.00 | DOL | 33.00 | ISDN | 34.00 |
| DME | 33.00 | DOL | 50.00 | ISDN | 17.00 |
| DME | 33.00 | DOL | 15.00 | TTE | 52.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DME | 33.00 | DOL | 25.00 | TTE | 42.00 |
| DME | 33.00 | DOL | 33.00 | TTE | 34.00 |
| DME | 33.00 | DOL | 50.00 | TTE | 17.00 |
| DME | 33.00 | TOL | 15.00 | BFE | 52.00 |
| DME | 33.00 | TOL | 25.00 | BFE | 42.00 |
| DME | 33.00 | TOL | 33.00 | BFE | 34.00 |
| DME | 33.00 | TOL | 50.00 | BFE | 17.00 |
| DME | 33.00 | TOL | 15.00 | 3FP | 52.00 |
| DME | 33.00 | TOL | 25.00 | 3FP | 42.00 |
| DME | 33.00 | TOL | 33.00 | 3FP | 34.00 |
| DME | 33.00 | TOL | 50.00 | 3FP | 17.00 |
| DME | 33.00 | TOL | 15.00 | BFTE | 52.00 |
| DME | 33.00 | TOL | 25.00 | BFTE | 42.00 |
| DME | 33.00 | TOL | 33.00 | BFTE | 34.00 |
| DME | 33.00 | TOL | 50.00 | BFTE | 17.00 |
| DME | 33.00 | TOL | 15.00 | FDMB | 52.00 |
| DME | 33.00 | TOL | 25.00 | FDMB | 42.00 |
| DME | 33.00 | TOL | 33.00 | FDMB | 34.00 |
| DME | 33.00 | TOL | 50.00 | FDMB | 17.00 |
| DME | 33.00 | TOL | 15.00 | ISDN | 52.00 |
| DME | 33.00 | TOL | 25.00 | ISDN | 42.00 |
| DME | 33.00 | TOL | 33.00 | ISDN | 34.00 |
| DME | 33.00 | TOL | 50.00 | ISDN | 17.00 |
| DME | 33.00 | TOL | 15.00 | TTE | 52.00 |
| DME | 33.00 | TOL | 25.00 | TTE | 42.00 |
| DME | 33.00 | TOL | 33.00 | TTE | 34.00 |
| DME | 33.00 | TOL | 50.00 | TTE | 17.00 |
| DME | 33.00 | SUL | 15.00 | BFE | 52.00 |
| DME | 33.00 | SUL | 25.00 | BFE | 42.00 |
| DME | 33.00 | SUL | 33.00 | BFE | 34.00 |
| DME | 33.00 | SUL | 50.00 | BFE | 17.00 |
| DME | 33.00 | SUL | 15.00 | 3FP | 52.00 |
| DME | 33.00 | SUL | 25.00 | 3FP | 42.00 |
| DME | 33.00 | SUL | 33.00 | 3FP | 34.00 |
| DME | 33.00 | SUL | 50.00 | 3FP | 17.00 |
| DME | 33.00 | SUL | 15.00 | BFTE | 52.00 |
| DME | 33.00 | SUL | 25.00 | BFTE | 42.00 |
| DME | 33.00 | SUL | 33.00 | BFTE | 34.00 |
| DME | 33.00 | SUL | 50.00 | BFTE | 17.00 |
| DME | 33.00 | SUL | 15.00 | FDMB | 52.00 |
| DME | 33.00 | SUL | 25.00 | FDMB | 42.00 |
| DME | 33.00 | SUL | 33.00 | FDMB | 34.00 |
| DME | 33.00 | SUL | 50.00 | FDMB | 17.00 |
| DME | 33.00 | SUL | 15.00 | ISDN | 52.00 |
| DME | 33.00 | SUL | 25.00 | ISDN | 42.00 |
| DME | 33.00 | SUL | 33.00 | ISDN | 34.00 |
| DME | 33.00 | SUL | 50.00 | ISDN | 17.00 |
| DME | 33.00 | SUL | 15.00 | TTE | 52.00 |
| DME | 33.00 | SUL | 25.00 | TTE | 42.00 |
| DME | 33.00 | SUL | 33.00 | TTE | 34.00 |
| DME | 33.00 | SUL | 50.00 | TTE | 17.00 |
| DME | 50.00 | DOL | 10.00 | BFE | 40.00 |
| DME | 50.00 | DOL | 25.00 | BFE | 25.00 |
| DME | 50.00 | DOL | 33.00 | BFE | 17.00 |
| DME | 50.00 | DOL | 15.00 | 3FP | 35.00 |
| DME | 50.00 | DOL | 25.00 | 3FP | 25.00 |
| DME | 50.00 | DOL | 33.00 | 3FP | 17.00 |
| DME | 50.00 | DOL | 15.00 | BFTE | 35.00 |
| DME | 50.00 | DOL | 25.00 | BFTE | 25.00 |
| DME | 50.00 | DOL | 33.00 | BFTE | 17.00 |
| DME | 50.00 | DOL | 15.00 | FDMB | 35.00 |
| DME | 50.00 | DOL | 25.00 | FDMB | 25.00 |
| DME | 50.00 | DOL | 33.00 | FDMB | 17.00 |
| DME | 50.00 | DOL | 15.00 | ISDN | 35.00 |
| DME | 50.00 | DOL | 25.00 | ISDN | 25.00 |
| DME | 50.00 | DOL | 33.00 | ISDN | 17.00 |
| DME | 50.00 | DOL | 15.00 | TTE | 35.00 |
| DME | 50.00 | DOL | 25.00 | TTE | 25.00 |
| DME | 50.00 | DOL | 33.00 | TTE | 17.00 |
| DME | 50.00 | TOL | 15.00 | BFE | 35.00 |
| DME | 50.00 | TOL | 25.00 | BFE | 25.00 |
| DME | 50.00 | TOL | 33.00 | BFE | 17.00 |
| DME | 50.00 | TOL | 15.00 | 3FP | 35.00 |
| DME | 50.00 | TOL | 25.00 | 3FP | 25.00 |
| DME | 50.00 | TOL | 33.00 | 3FP | 17.00 |
| DME | 50.00 | TOL | 15.00 | BFTE | 35.00 |
| DME | 50.00 | TOL | 25.00 | BFTE | 25.00 |
| DME | 50.00 | TOL | 33.00 | BFTE | 17.00 |
| DME | 50.00 | TOL | 15.00 | FDMB | 35.00 |
| DME | 50.00 | TOL | 25.00 | FDMB | 25.00 |
| DME | 50.00 | TOL | 33.00 | FDMB | 17.00 |
| DME | 50.00 | TOL | 15.00 | ISDN | 35.00 |
| DME | 50.00 | TOL | 25.00 | ISDN | 25.00 |
| DME | 50.00 | TOL | 33.00 | ISDN | 17.00 |
| DME | 50.00 | TOL | 15.00 | TTE | 35.00 |
| DME | 50.00 | TOL | 25.00 | TTE | 25.00 |
| DME | 50.00 | TOL | 33.00 | TTE | 17.00 |
| DME | 50.00 | SUL | 15.00 | BFE | 35.00 |
| DME | 50.00 | SUL | 25.00 | BFE | 25.00 |
| DME | 50.00 | SUL | 33.00 | BFE | 17.00 |
| DME | 50.00 | SUL | 15.00 | 3FP | 35.00 |
| DME | 50.00 | SUL | 25.00 | 3FP | 25.00 |
| DME | 50.00 | SUL | 33.00 | 3FP | 17.00 |
| DME | 50.00 | SUL | 15.00 | BFTE | 35.00 |
| DME | 50.00 | SUL | 25.00 | BFTE | 25.00 |
| DME | 50.00 | SUL | 33.00 | BFTE | 17.00 |
| DME | 50.00 | SUL | 15.00 | FDMB | 35.00 |
| DME | 50.00 | SUL | 25.00 | FDMB | 25.00 |
| DME | 50.00 | SUL | 33.00 | FDMB | 17.00 |
| DME | 50.00 | SUL | 15.00 | ISDN | 35.00 |
| DME | 50.00 | SUL | 25.00 | ISDN | 25.00 |
| DME | 50.00 | SUL | 33.00 | ISDN | 17.00 |
| DME | 50.00 | SUL | 15.00 | TTE | 35.00 |
| DME | 50.00 | SUL | 25.00 | TTE | 25.00 |
| DME | 50.00 | SUL | 33.00 | TTE | 17.00 |
| DOL | 25.00 | none | 0 | BFE | 75.00 |
| DOL | 25.00 | none | 0 | 3FP | 75.00 |
| DOL | 25.00 | none | 0 | BFTE | 75.00 |
| DOL | 25.00 | none | 0 | FDMB | 75.00 |
| DOL | 25.00 | none | 0 | ISDN | 75.00 |
| DOL | 25.00 | none | 0 | TTE | 75.00 |
| DOL | 33.00 | none | 0 | BFE | 67.00 |
| DOL | 33.00 | none | 0 | 3FP | 67.00 |
| DOL | 33.00 | none | 0 | BFTE | 67.00 |
| DOL | 33.00 | none | 0 | FDMB | 67.00 |
| DOL | 33.00 | none | 0 | ISDN | 67.00 |
| DOL | 33.00 | none | 0 | TTE | 67.00 |
| DOL | 50.00 | none | 0 | BFE | 50.00 |
| DOL | 50.00 | none | 0 | 3FP | 50.00 |
| DOL | 50.00 | none | 0 | BFTE | 50.00 |
| DOL | 50.00 | none | 0 | FDMB | 50.00 |
| DOL | 50.00 | none | 0 | ISDN | 50.00 |
| DOL | 50.00 | none | 0 | TTE | 50.00 |
| DOL | 75.00 | none | 0 | BFE | 25.00 |
| DOL | 75.00 | none | 0 | 3FP | 25.00 |
| DOL | 75.00 | none | 0 | BFTE | 25.00 |
| DOL | 75.00 | none | 0 | FDMB | 25.00 |
| DOL | 75.00 | none | 0 | ISDN | 25.00 |
| DOL | 75.00 | none | 0 | TTE | 25.00 |
| DOL | 10.00 | DME | 15.00 | BFE | 75.00 |
| DOL | 10.00 | DME | 25.00 | BFE | 65.00 |
| DOL | 10.00 | DME | 33.00 | BFE | 57.00 |
| DOL | 10.00 | DME | 50.00 | BFE | 40.00 |
| DOL | 10.00 | DME | 65.00 | BFE | 25.00 |
| DOL | 10.00 | DME | 15.00 | 3FP | 75.00 |
| DOL | 10.00 | DME | 25.00 | 3FP | 65.00 |
| DOL | 10.00 | DME | 33.00 | 3FP | 57.00 |
| DOL | 10.00 | DME | 50.00 | 3FP | 40.00 |
| DOL | 10.00 | DME | 65.00 | 3FP | 25.00 |
| DOL | 10.00 | DME | 15.00 | BFTE | 75.00 |
| DOL | 10.00 | DME | 25.00 | BFTE | 65.00 |
| DOL | 10.00 | DME | 33.00 | BFTE | 57.00 |
| DOL | 10.00 | DME | 50.00 | BFTE | 40.00 |
| DOL | 10.00 | DME | 65.00 | BFTE | 25.00 |
| DOL | 10.00 | DME | 15.00 | FDMB | 75.00 |
| DOL | 10.00 | DME | 25.00 | FDMB | 65.00 |
| DOL | 10.00 | DME | 33.00 | FDMB | 57.00 |
| DOL | 10.00 | DME | 50.00 | FDMB | 40.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DOL | 10.00 | DME | 65.00 | FDMB | 25.00 |
| DOL | 10.00 | DME | 15.00 | ISDN | 75.00 |
| DOL | 10.00 | DME | 25.00 | ISDN | 65.00 |
| DOL | 10.00 | DME | 33.00 | ISDN | 57.00 |
| DOL | 10.00 | DME | 50.00 | ISDN | 40.00 |
| DOL | 10.00 | DME | 65.00 | ISDN | 25.00 |
| DOL | 10.00 | DME | 15.00 | TTE | 75.00 |
| DOL | 10.00 | DME | 25.00 | TTE | 65.00 |
| DOL | 10.00 | DME | 33.00 | TTE | 57.00 |
| DOL | 10.00 | DME | 50.00 | TTE | 40.00 |
| DOL | 10.00 | DME | 65.00 | TTE | 25.00 |
| DOL | 10.00 | TOL | 15.00 | BFE | 75.00 |
| DOL | 10.00 | TOL | 25.00 | BFE | 65.00 |
| DOL | 10.00 | TOL | 33.00 | BFE | 57.00 |
| DOL | 10.00 | TOL | 50.00 | BFE | 40.00 |
| DOL | 10.00 | TOL | 65.00 | BFE | 25.00 |
| DOL | 10.00 | TOL | 15.00 | 3FP | 75.00 |
| DOL | 10.00 | TOL | 25.00 | 3FP | 65.00 |
| DOL | 10.00 | TOL | 33.00 | 3FP | 57.00 |
| DOL | 10.00 | TOL | 50.00 | 3FP | 40.00 |
| DOL | 10.00 | TOL | 65.00 | 3FP | 25.00 |
| DOL | 10.00 | TOL | 15.00 | BFTE | 75.00 |
| DOL | 10.00 | TOL | 25.00 | BFTE | 65.00 |
| DOL | 10.00 | TOL | 33.00 | BFTE | 57.00 |
| DOL | 10.00 | TOL | 50.00 | BFTE | 40.00 |
| DOL | 10.00 | TOL | 65.00 | BFTE | 25.00 |
| DOL | 10.00 | TOL | 15.00 | FDMB | 75.00 |
| DOL | 10.00 | TOL | 25.00 | FDMB | 65.00 |
| DOL | 10.00 | TOL | 33.00 | FDMB | 57.00 |
| DOL | 10.00 | TOL | 50.00 | FDMB | 40.00 |
| DOL | 10.00 | TOL | 65.00 | FDMB | 25.00 |
| DOL | 10.00 | TOL | 15.00 | ISDN | 75.00 |
| DOL | 10.00 | TOL | 25.00 | ISDN | 65.00 |
| DOL | 10.00 | TOL | 33.00 | ISDN | 57.00 |
| DOL | 10.00 | TOL | 50.00 | ISDN | 40.00 |
| DOL | 10.00 | TOL | 65.00 | ISDN | 25.00 |
| DOL | 10.00 | TOL | 15.00 | TTE | 75.00 |
| DOL | 10.00 | TOL | 25.00 | TTE | 65.00 |
| DOL | 10.00 | TOL | 33.00 | TTE | 57.00 |
| DOL | 10.00 | TOL | 50.00 | TTE | 40.00 |
| DOL | 10.00 | TOL | 65.00 | TTE | 25.00 |
| DOL | 10.00 | SUL | 15.00 | BFE | 75.00 |
| DOL | 10.00 | SUL | 25.00 | BFE | 65.00 |
| DOL | 10.00 | SUL | 33.00 | BFE | 57.00 |
| DOL | 10.00 | SUL | 50.00 | BFE | 40.00 |
| DOL | 10.00 | SUL | 65.00 | BFE | 25.00 |
| DOL | 10.00 | SUL | 15.00 | 3FP | 75.00 |
| DOL | 10.00 | SUL | 25.00 | 3FP | 65.00 |
| DOL | 10.00 | SUL | 33.00 | 3FP | 57.00 |
| DOL | 10.00 | SUL | 50.00 | 3FP | 40.00 |
| DOL | 10.00 | SUL | 65.00 | 3FP | 25.00 |
| DOL | 10.00 | SUL | 15.00 | BFTE | 75.00 |
| DOL | 10.00 | SUL | 25.00 | BFTE | 65.00 |
| DOL | 10.00 | SUL | 33.00 | BFTE | 57.00 |
| DOL | 10.00 | SUL | 50.00 | BFTE | 40.00 |
| DOL | 10.00 | SUL | 65.00 | BFTE | 25.00 |
| DOL | 10.00 | SUL | 15.00 | FDMB | 75.00 |
| DOL | 10.00 | SUL | 25.00 | FDMB | 65.00 |
| DOL | 10.00 | SUL | 33.00 | FDMB | 57.00 |
| DOL | 10.00 | SUL | 50.00 | FDMB | 40.00 |
| DOL | 10.00 | SUL | 65.00 | FDMB | 25.00 |
| DOL | 10.00 | SUL | 15.00 | ISDN | 75.00 |
| DOL | 10.00 | SUL | 25.00 | ISDN | 65.00 |
| DOL | 10.00 | SUL | 33.00 | ISDN | 57.00 |
| DOL | 10.00 | SUL | 50.00 | ISDN | 40.00 |
| DOL | 10.00 | SUL | 65.00 | ISDN | 25.00 |
| DOL | 10.00 | SUL | 15.00 | TTE | 75.00 |
| DOL | 10.00 | SUL | 25.00 | TTE | 65.00 |
| DOL | 10.00 | SUL | 33.00 | TTE | 57.00 |
| DOL | 10.00 | SUL | 50.00 | TTE | 40.00 |
| DOL | 10.00 | SUL | 65.00 | TTE | 25.00 |
| DOL | 25.00 | DME | 15.00 | BFE | 60.00 |
| DOL | 25.00 | DME | 25.00 | BFE | 50.00 |
| DOL | 25.00 | DME | 33.00 | BFE | 42.00 |
| DOL | 25.00 | DME | 50.00 | BFE | 25.00 |
| DOL | 25.00 | DME | 15.00 | 3FP | 60.00 |
| DOL | 25.00 | DME | 25.00 | 3FP | 50.00 |
| DOL | 25.00 | DME | 33.00 | 3FP | 42.00 |
| DOL | 25.00 | DME | 50.00 | 3FP | 25.00 |
| DOL | 25.00 | DME | 15.00 | BFTE | 60.00 |
| DOL | 25.00 | DME | 25.00 | BFTE | 50.00 |
| DOL | 25.00 | DME | 33.00 | BFTE | 42.00 |
| DOL | 25.00 | DME | 50.00 | BFTE | 25.00 |
| DOL | 25.00 | DME | 15.00 | FDMB | 60.00 |
| DOL | 25.00 | DME | 25.00 | FDMB | 50.00 |
| DOL | 25.00 | DME | 33.00 | FDMB | 42.00 |
| DOL | 25.00 | DME | 50.00 | FDMB | 25.00 |
| DOL | 25.00 | DME | 15.00 | ISDN | 60.00 |
| DOL | 25.00 | DME | 25.00 | ISDN | 50.00 |
| DOL | 25.00 | DME | 33.00 | ISDN | 42.00 |
| DOL | 25.00 | DME | 50.00 | ISDN | 25.00 |
| DOL | 25.00 | DME | 15.00 | TTE | 60.00 |
| DOL | 25.00 | DME | 25.00 | TTE | 50.00 |
| DOL | 25.00 | DME | 33.00 | TTE | 42.00 |
| DOL | 25.00 | DME | 50.00 | TTE | 25.00 |
| DOL | 25.00 | TOL | 15.00 | BFE | 60.00 |
| DOL | 25.00 | TOL | 25.00 | BFE | 50.00 |
| DOL | 25.00 | TOL | 33.00 | BFE | 42.00 |
| DOL | 25.00 | TOL | 50.00 | BFE | 25.00 |
| DOL | 25.00 | TOL | 15.00 | 3FP | 60.00 |
| DOL | 25.00 | TOL | 25.00 | 3FP | 50.00 |
| DOL | 25.00 | TOL | 33.00 | 3FP | 42.00 |
| DOL | 25.00 | TOL | 50.00 | 3FP | 25.00 |
| DOL | 25.00 | TOL | 15.00 | BFTE | 60.00 |
| DOL | 25.00 | TOL | 25.00 | BFTE | 50.00 |
| DOL | 25.00 | TOL | 33.00 | BFTE | 42.00 |
| DOL | 25.00 | TOL | 50.00 | BFTE | 25.00 |
| DOL | 25.00 | TOL | 15.00 | FDMB | 60.00 |
| DOL | 25.00 | TOL | 25.00 | FDMB | 50.00 |
| DOL | 25.00 | TOL | 33.00 | FDMB | 42.00 |
| DOL | 25.00 | TOL | 50.00 | FDMB | 25.00 |
| DOL | 25.00 | TOL | 15.00 | ISDN | 60.00 |
| DOL | 25.00 | TOL | 25.00 | ISDN | 50.00 |
| DOL | 25.00 | TOL | 33.00 | ISDN | 42.00 |
| DOL | 25.00 | TOL | 50.00 | ISDN | 25.00 |
| DOL | 25.00 | TOL | 15.00 | TTE | 60.00 |
| DOL | 25.00 | TOL | 25.00 | TTE | 50.00 |
| DOL | 25.00 | TOL | 33.00 | TTE | 42.00 |
| DOL | 25.00 | TOL | 50.00 | TTE | 25.00 |
| DOL | 25.00 | SUL | 15.00 | BFE | 60.00 |
| DOL | 25.00 | SUL | 25.00 | BFE | 50.00 |
| DOL | 25.00 | SUL | 33.00 | BFE | 42.00 |
| DOL | 25.00 | SUL | 50.00 | BFE | 25.00 |
| DOL | 25.00 | SUL | 15.00 | 3FP | 60.00 |
| DOL | 25.00 | SUL | 25.00 | 3FP | 50.00 |
| DOL | 25.00 | SUL | 33.00 | 3FP | 42.00 |
| DOL | 25.00 | SUL | 50.00 | 3FP | 25.00 |
| DOL | 25.00 | SUL | 15.00 | BFTE | 60.00 |
| DOL | 25.00 | SUL | 25.00 | BFTE | 50.00 |
| DOL | 25.00 | SUL | 33.00 | BFTE | 42.00 |
| DOL | 25.00 | SUL | 50.00 | BFTE | 25.00 |
| DOL | 25.00 | SUL | 15.00 | FDMB | 60.00 |
| DOL | 25.00 | SUL | 25.00 | FDMB | 50.00 |
| DOL | 25.00 | SUL | 33.00 | FDMB | 42.00 |
| DOL | 25.00 | SUL | 50.00 | FDMB | 25.00 |
| DOL | 25.00 | SUL | 15.00 | ISDN | 60.00 |
| DOL | 25.00 | SUL | 25.00 | ISDN | 50.00 |
| DOL | 25.00 | SUL | 33.00 | ISDN | 42.00 |
| DOL | 25.00 | SUL | 50.00 | ISDN | 25.00 |
| DOL | 25.00 | SUL | 15.00 | TTE | 60.00 |
| DOL | 25.00 | SUL | 25.00 | TTE | 50.00 |
| DOL | 25.00 | SUL | 33.00 | TTE | 42.00 |
| DOL | 25.00 | SUL | 50.00 | TTE | 25.00 |
| DOL | 33.00 | DME | 15.00 | BFE | 52.00 |
| DOL | 33.00 | DME | 25.00 | BFE | 42.00 |
| DOL | 33.00 | DME | 33.00 | BFE | 34.00 |
| DOL | 33.00 | DME | 50.00 | BFE | 17.00 |
| DOL | 33.00 | DME | 15.00 | 3FP | 52.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| DOL | 33.00 | DME | 25.00 | 3FP | 42.00 |
| DOL | 33.00 | DME | 33.00 | 3FP | 34.00 |
| DOL | 33.00 | DME | 50.00 | 3FP | 17.00 |
| DOL | 33.00 | DME | 15.00 | BFTE | 52.00 |
| DOL | 33.00 | DME | 25.00 | BFTE | 42.00 |
| DOL | 33.00 | DME | 33.00 | BFTE | 34.00 |
| DOL | 33.00 | DME | 50.00 | BFTE | 17.00 |
| DOL | 33.00 | DME | 15.00 | FDMB | 52.00 |
| DOL | 33.00 | DME | 25.00 | FDMB | 42.00 |
| DOL | 33.00 | DME | 33.00 | FDMB | 34.00 |
| DOL | 33.00 | DME | 50.00 | FDMB | 17.00 |
| DOL | 33.00 | DME | 15.00 | ISDN | 52.00 |
| DOL | 33.00 | DME | 25.00 | ISDN | 42.00 |
| DOL | 33.00 | DME | 33.00 | ISDN | 34.00 |
| DOL | 33.00 | DME | 50.00 | ISDN | 17.00 |
| DOL | 33.00 | DME | 15.00 | TTE | 52.00 |
| DOL | 33.00 | DME | 25.00 | TTE | 42.00 |
| DOL | 33.00 | DME | 33.00 | TTE | 34.00 |
| DOL | 33.00 | DME | 50.00 | TTE | 17.00 |
| DOL | 33.00 | TOL | 15.00 | BFE | 52.00 |
| DOL | 33.00 | TOL | 25.00 | BFE | 42.00 |
| DOL | 33.00 | TOL | 33.00 | BFE | 34.00 |
| DOL | 33.00 | TOL | 50.00 | BFE | 17.00 |
| DOL | 33.00 | TOL | 15.00 | 3FP | 52.00 |
| DOL | 33.00 | TOL | 25.00 | 3FP | 42.00 |
| DOL | 33.00 | TOL | 33.00 | 3FP | 34.00 |
| DOL | 33.00 | TOL | 50.00 | 3FP | 17.00 |
| DOL | 33.00 | TOL | 15.00 | BFTE | 52.00 |
| DOL | 33.00 | TOL | 25.00 | BFTE | 42.00 |
| DOL | 33.00 | TOL | 33.00 | BFTE | 34.00 |
| DOL | 33.00 | TOL | 50.00 | BFTE | 17.00 |
| DOL | 33.00 | TOL | 15.00 | FDMB | 52.00 |
| DOL | 33.00 | TOL | 25.00 | FDMB | 42.00 |
| DOL | 33.00 | TOL | 33.00 | FDMB | 34.00 |
| DOL | 33.00 | TOL | 50.00 | FDMB | 17.00 |
| DOL | 33.00 | TOL | 15.00 | ISDN | 52.00 |
| DOL | 33.00 | TOL | 25.00 | ISDN | 42.00 |
| DOL | 33.00 | TOL | 33.00 | ISDN | 34.00 |
| DOL | 33.00 | TOL | 50.00 | ISDN | 17.00 |
| DOL | 33.00 | TOL | 15.00 | TTE | 52.00 |
| DOL | 33.00 | TOL | 25.00 | TTE | 42.00 |
| DOL | 33.00 | TOL | 33.00 | TTE | 34.00 |
| DOL | 33.00 | TOL | 50.00 | TTE | 17.00 |
| DOL | 33.00 | SUL | 15.00 | BFE | 52.00 |
| DOL | 33.00 | SUL | 25.00 | BFE | 42.00 |
| DOL | 33.00 | SUL | 33.00 | BFE | 34.00 |
| DOL | 33.00 | SUL | 50.00 | BFE | 17.00 |
| DOL | 33.00 | SUL | 15.00 | 3FP | 52.00 |
| DOL | 33.00 | SUL | 25.00 | 3FP | 42.00 |
| DOL | 33.00 | SUL | 33.00 | 3FP | 34.00 |
| DOL | 33.00 | SUL | 50.00 | 3FP | 17.00 |
| DOL | 33.00 | SUL | 15.00 | BFTE | 52.00 |
| DOL | 33.00 | SUL | 25.00 | BFTE | 42.00 |
| DOL | 33.00 | SUL | 33.00 | BFTE | 34.00 |
| DOL | 33.00 | SUL | 50.00 | BFTE | 17.00 |
| DOL | 33.00 | SUL | 15.00 | FDMB | 52.00 |
| DOL | 33.00 | SUL | 25.00 | FDMB | 42.00 |
| DOL | 33.00 | SUL | 33.00 | FDMB | 34.00 |
| DOL | 33.00 | SUL | 50.00 | FDMB | 17.00 |
| DOL | 33.00 | SUL | 15.00 | ISDN | 52.00 |
| DOL | 33.00 | SUL | 25.00 | ISDN | 42.00 |
| DOL | 33.00 | SUL | 33.00 | ISDN | 34.00 |
| DOL | 33.00 | SUL | 50.00 | ISDN | 17.00 |
| DOL | 33.00 | SUL | 15.00 | TTE | 52.00 |
| DOL | 33.00 | SUL | 25.00 | TTE | 42.00 |
| DOL | 33.00 | SUL | 33.00 | TTE | 34.00 |
| DOL | 33.00 | SUL | 50.00 | TTE | 17.00 |
| DOL | 50.00 | DME | 10.00 | BFE | 40.00 |
| DOL | 50.00 | DME | 25.00 | BFE | 25.00 |
| DOL | 50.00 | DME | 33.00 | BFE | 17.00 |
| DOL | 50.00 | DME | 15.00 | 3FP | 35.00 |
| DOL | 50.00 | DME | 25.00 | 3FP | 25.00 |
| DOL | 50.00 | DME | 33.00 | 3FP | 17.00 |
| DOL | 50.00 | DME | 15.00 | BFTE | 35.00 |
| DOL | 50.00 | DME | 25.00 | BFTE | 25.00 |
| DOL | 50.00 | DME | 33.00 | BFTE | 17.00 |
| DOL | 50.00 | DME | 15.00 | FDMB | 35.00 |
| DOL | 50.00 | DME | 25.00 | FDMB | 25.00 |
| DOL | 50.00 | DME | 33.00 | FDMB | 17.00 |
| DOL | 50.00 | DME | 15.00 | ISDN | 35.00 |
| DOL | 50.00 | DME | 25.00 | ISDN | 25.00 |
| DOL | 50.00 | DME | 33.00 | ISDN | 17.00 |
| DOL | 50.00 | DME | 15.00 | TTE | 35.00 |
| DOL | 50.00 | DME | 25.00 | TTE | 25.00 |
| DOL | 50.00 | DME | 33.00 | TTE | 17.00 |
| DOL | 50.00 | TOL | 15.00 | BFE | 35.00 |
| DOL | 50.00 | TOL | 25.00 | BFE | 25.00 |
| DOL | 50.00 | TOL | 33.00 | BFE | 17.00 |
| DOL | 50.00 | TOL | 15.00 | 3FP | 35.00 |
| DOL | 50.00 | TOL | 25.00 | 3FP | 25.00 |
| DOL | 50.00 | TOL | 33.00 | 3FP | 17.00 |
| DOL | 50.00 | TOL | 15.00 | BFTE | 35.00 |
| DOL | 50.00 | TOL | 25.00 | BFTE | 25.00 |
| DOL | 50.00 | TOL | 33.00 | BFTE | 17.00 |
| DOL | 50.00 | TOL | 15.00 | FDMB | 35.00 |
| DOL | 50.00 | TOL | 25.00 | FDMB | 25.00 |
| DOL | 50.00 | TOL | 33.00 | FDMB | 17.00 |
| DOL | 50.00 | TOL | 15.00 | ISDN | 35.00 |
| DOL | 50.00 | TOL | 25.00 | ISDN | 25.00 |
| DOL | 50.00 | TOL | 33.00 | ISDN | 17.00 |
| DOL | 50.00 | TOL | 15.00 | TTE | 35.00 |
| DOL | 50.00 | TOL | 25.00 | TTE | 25.00 |
| DOL | 50.00 | TOL | 33.00 | TTE | 17.00 |
| DOL | 50.00 | SUL | 15.00 | BFE | 35.00 |
| DOL | 50.00 | SUL | 25.00 | BFE | 25.00 |
| DOL | 50.00 | SUL | 33.00 | BFE | 17.00 |
| DOL | 50.00 | SUL | 15.00 | 3FP | 35.00 |
| DOL | 50.00 | SUL | 25.00 | 3FP | 25.00 |
| DOL | 50.00 | SUL | 33.00 | 3FP | 17.00 |
| DOL | 50.00 | SUL | 15.00 | BFTE | 35.00 |
| DOL | 50.00 | SUL | 25.00 | BFTE | 25.00 |
| DOL | 50.00 | SUL | 33.00 | BFTE | 17.00 |
| DOL | 50.00 | SUL | 15.00 | FDMB | 35.00 |
| DOL | 50.00 | SUL | 25.00 | FDMB | 25.00 |
| DOL | 50.00 | SUL | 33.00 | FDMB | 17.00 |
| DOL | 50.00 | SUL | 15.00 | ISDN | 35.00 |
| DOL | 50.00 | SUL | 25.00 | ISDN | 25.00 |
| DOL | 50.00 | SUL | 33.00 | ISDN | 17.00 |
| DOL | 50.00 | SUL | 15.00 | TTE | 35.00 |
| DOL | 50.00 | SUL | 25.00 | TTE | 25.00 |
| DOL | 50.00 | SUL | 33.00 | TTE | 17.00 |
| SUL | 10.00 | DOL | 15.00 | BFE | 75.00 |
| SUL | 10.00 | DOL | 25.00 | BFE | 65.00 |
| SUL | 10.00 | DOL | 33.00 | BFE | 57.00 |
| SUL | 10.00 | DOL | 50.00 | BFE | 40.00 |
| SUL | 10.00 | DOL | 65.00 | BFE | 25.00 |
| SUL | 10.00 | DOL | 15.00 | 3FP | 75.00 |
| SUL | 10.00 | DOL | 25.00 | 3FP | 65.00 |
| SUL | 10.00 | DOL | 33.00 | 3FP | 57.00 |
| SUL | 10.00 | DOL | 50.00 | 3FP | 40.00 |
| SUL | 10.00 | DOL | 65.00 | 3FP | 25.00 |
| SUL | 10.00 | DOL | 15.00 | BFTE | 75.00 |
| SUL | 10.00 | DOL | 25.00 | BFTE | 65.00 |
| SUL | 10.00 | DOL | 33.00 | BFTE | 57.00 |
| SUL | 10.00 | DOL | 50.00 | BFTE | 40.00 |
| SUL | 10.00 | DOL | 65.00 | BFTE | 25.00 |
| SUL | 10.00 | DOL | 15.00 | FDMB | 75.00 |
| SUL | 10.00 | DOL | 25.00 | FDMB | 65.00 |
| SUL | 10.00 | DOL | 33.00 | FDMB | 57.00 |
| SUL | 10.00 | DOL | 50.00 | FDMB | 40.00 |
| SUL | 10.00 | DOL | 65.00 | FDMB | 25.00 |
| SUL | 10.00 | DOL | 15.00 | ISDN | 75.00 |
| SUL | 10.00 | DOL | 25.00 | ISDN | 65.00 |
| SUL | 10.00 | DOL | 33.00 | ISDN | 57.00 |
| SUL | 10.00 | DOL | 50.00 | ISDN | 40.00 |
| SUL | 10.00 | DOL | 65.00 | ISDN | 25.00 |
| SUL | 10.00 | DOL | 15.00 | TTE | 75.00 |
| SUL | 10.00 | DOL | 25.00 | TTE | 65.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| SUL | 10.00 | DOL | 33.00 | TTE | 57.00 |
| SUL | 10.00 | DOL | 50.00 | TTE | 40.00 |
| SUL | 10.00 | DOL | 65.00 | TTE | 25.00 |
| SUL | 10.00 | TOL | 15.00 | BFE | 75.00 |
| SUL | 10.00 | TOL | 25.00 | BFE | 65.00 |
| SUL | 10.00 | TOL | 33.00 | BFE | 57.00 |
| SUL | 10.00 | TOL | 50.00 | BFE | 40.00 |
| SUL | 10.00 | TOL | 65.00 | BFE | 25.00 |
| SUL | 10.00 | TOL | 15.00 | 3FP | 75.00 |
| SUL | 10.00 | TOL | 25.00 | 3FP | 65.00 |
| SUL | 10.00 | TOL | 33.00 | 3FP | 57.00 |
| SUL | 10.00 | TOL | 50.00 | 3FP | 40.00 |
| SUL | 10.00 | TOL | 65.00 | 3FP | 25.00 |
| SUL | 10.00 | TOL | 15.00 | BFTE | 75.00 |
| SUL | 10.00 | TOL | 25.00 | BFTE | 65.00 |
| SUL | 10.00 | TOL | 33.00 | BFTE | 57.00 |
| SUL | 10.00 | TOL | 50.00 | BFTE | 40.00 |
| SUL | 10.00 | TOL | 65.00 | BFTE | 25.00 |
| SUL | 10.00 | TOL | 15.00 | FDMB | 75.00 |
| SUL | 10.00 | TOL | 25.00 | FDMB | 65.00 |
| SUL | 10.00 | TOL | 33.00 | FDMB | 57.00 |
| SUL | 10.00 | TOL | 50.00 | FDMB | 40.00 |
| SUL | 10.00 | TOL | 65.00 | FDMB | 25.00 |
| SUL | 10.00 | TOL | 15.00 | ISDN | 75.00 |
| SUL | 10.00 | TOL | 25.00 | ISDN | 65.00 |
| SUL | 10.00 | TOL | 33.00 | ISDN | 57.00 |
| SUL | 10.00 | TOL | 50.00 | ISDN | 40.00 |
| SUL | 10.00 | TOL | 65.00 | ISDN | 25.00 |
| SUL | 10.00 | TOL | 15.00 | TTE | 75.00 |
| SUL | 10.00 | TOL | 25.00 | TTE | 65.00 |
| SUL | 10.00 | TOL | 33.00 | TTE | 57.00 |
| SUL | 10.00 | TOL | 50.00 | TTE | 40.00 |
| SUL | 10.00 | TOL | 65.00 | TTE | 25.00 |
| SUL | 25.00 | DME | 15.00 | BFE | 60.00 |
| SUL | 25.00 | DME | 25.00 | BFE | 50.00 |
| SUL | 25.00 | DME | 33.00 | BFE | 42.00 |
| SUL | 25.00 | DME | 50.00 | BFE | 25.00 |
| SUL | 25.00 | DME | 15.00 | 3FP | 60.00 |
| SUL | 25.00 | DME | 25.00 | 3FP | 50.00 |
| SUL | 25.00 | DME | 33.00 | 3FP | 42.00 |
| SUL | 25.00 | DME | 50.00 | 3FP | 25.00 |
| SUL | 25.00 | DME | 15.00 | BFTE | 60.00 |
| SUL | 25.00 | DME | 25.00 | BFTE | 50.00 |
| SUL | 25.00 | DME | 33.00 | BFTE | 42.00 |
| SUL | 25.00 | DME | 50.00 | BFTE | 25.00 |
| SUL | 25.00 | DME | 15.00 | FDMB | 60.00 |
| SUL | 25.00 | DME | 25.00 | FDMB | 50.00 |
| SUL | 25.00 | DME | 33.00 | FDMB | 42.00 |
| SUL | 25.00 | DME | 50.00 | FDMB | 25.00 |
| SUL | 25.00 | DME | 15.00 | ISDN | 60.00 |
| SUL | 25.00 | DME | 25.00 | ISDN | 50.00 |
| SUL | 25.00 | DME | 33.00 | ISDN | 42.00 |
| SUL | 25.00 | DME | 50.00 | ISDN | 25.00 |
| SUL | 25.00 | DME | 15.00 | TTE | 60.00 |
| SUL | 25.00 | DME | 25.00 | TTE | 50.00 |
| SUL | 25.00 | DME | 33.00 | TTE | 42.00 |
| SUL | 25.00 | DME | 50.00 | TTE | 25.00 |
| SUL | 25.00 | DOL | 15.00 | BFE | 60.00 |
| SUL | 25.00 | DOL | 25.00 | BFE | 50.00 |
| SUL | 25.00 | DOL | 33.00 | BFE | 42.00 |
| SUL | 25.00 | DOL | 50.00 | BFE | 25.00 |
| SUL | 25.00 | DOL | 15.00 | 3FP | 60.00 |
| SUL | 25.00 | DOL | 25.00 | 3FP | 50.00 |
| SUL | 25.00 | DOL | 33.00 | 3FP | 42.00 |
| SUL | 25.00 | DOL | 50.00 | 3FP | 25.00 |
| SUL | 25.00 | DOL | 15.00 | BFTE | 60.00 |
| SUL | 25.00 | DOL | 25.00 | BFTE | 50.00 |
| SUL | 25.00 | DOL | 33.00 | BFTE | 42.00 |
| SUL | 25.00 | DOL | 50.00 | BFTE | 25.00 |
| SUL | 25.00 | DOL | 15.00 | FDMB | 60.00 |
| SUL | 25.00 | DOL | 25.00 | FDMB | 50.00 |
| SUL | 25.00 | DOL | 33.00 | FDMB | 42.00 |
| SUL | 25.00 | DOL | 50.00 | FDMB | 25.00 |
| SUL | 25.00 | DOL | 15.00 | ISDN | 60.00 |
| SUL | 25.00 | DOL | 25.00 | ISDN | 50.00 |
| SUL | 25.00 | DOL | 33.00 | ISDN | 42.00 |
| SUL | 25.00 | DOL | 50.00 | ISDN | 25.00 |
| SUL | 25.00 | DOL | 15.00 | TTE | 60.00 |
| SUL | 25.00 | DOL | 25.00 | TTE | 50.00 |
| SUL | 25.00 | DOL | 33.00 | TTE | 42.00 |
| SUL | 25.00 | DOL | 50.00 | TTE | 25.00 |
| SUL | 25.00 | TOL | 15.00 | BFE | 60.00 |
| SUL | 25.00 | TOL | 25.00 | BFE | 50.00 |
| SUL | 25.00 | TOL | 33.00 | BFE | 42.00 |
| SUL | 25.00 | TOL | 50.00 | BFE | 25.00 |
| SUL | 25.00 | TOL | 15.00 | 3FP | 60.00 |
| SUL | 25.00 | TOL | 25.00 | 3FP | 50.00 |
| SUL | 25.00 | TOL | 33.00 | 3FP | 42.00 |
| SUL | 25.00 | TOL | 50.00 | 3FP | 25.00 |
| SUL | 25.00 | TOL | 15.00 | BFTE | 60.00 |
| SUL | 25.00 | TOL | 25.00 | BFTE | 50.00 |
| SUL | 25.00 | TOL | 33.00 | BFTE | 42.00 |
| SUL | 25.00 | TOL | 50.00 | BFTE | 25.00 |
| SUL | 25.00 | TOL | 15.00 | FDMB | 60.00 |
| SUL | 25.00 | TOL | 25.00 | FDMB | 50.00 |
| SUL | 25.00 | TOL | 33.00 | FDMB | 42.00 |
| SUL | 25.00 | TOL | 50.00 | FDMB | 25.00 |
| SUL | 25.00 | TOL | 15.00 | ISDN | 60.00 |
| SUL | 25.00 | TOL | 25.00 | ISDN | 50.00 |
| SUL | 25.00 | TOL | 33.00 | ISDN | 42.00 |
| SUL | 25.00 | TOL | 50.00 | ISDN | 25.00 |
| SUL | 25.00 | TOL | 15.00 | TTE | 60.00 |
| SUL | 25.00 | TOL | 25.00 | TTE | 50.00 |
| SUL | 25.00 | TOL | 33.00 | TTE | 42.00 |
| SUL | 25.00 | TOL | 50.00 | TTE | 25.00 |
| SUL | 33.00 | DME | 15.00 | BFE | 52.00 |
| SUL | 33.00 | DME | 25.00 | BFE | 42.00 |
| SUL | 33.00 | DME | 33.00 | BFE | 34.00 |
| SUL | 33.00 | DME | 50.00 | BFE | 17.00 |
| SUL | 33.00 | DME | 15.00 | 3FP | 52.00 |
| SUL | 33.00 | DME | 25.00 | 3FP | 42.00 |
| SUL | 33.00 | DME | 33.00 | 3FP | 34.00 |
| SUL | 33.00 | DME | 50.00 | 3FP | 17.00 |
| SUL | 33.00 | DME | 15.00 | BFTE | 52.00 |
| SUL | 33.00 | DME | 25.00 | BFTE | 42.00 |
| SUL | 33.00 | DME | 33.00 | BFTE | 34.00 |
| SUL | 33.00 | DME | 50.00 | BFTE | 17.00 |
| SUL | 33.00 | DME | 15.00 | FDMB | 52.00 |
| SUL | 33.00 | DME | 25.00 | FDMB | 42.00 |
| SUL | 33.00 | DME | 33.00 | FDMB | 34.00 |
| SUL | 33.00 | DME | 50.00 | FDMB | 17.00 |
| SUL | 33.00 | DME | 15.00 | ISDN | 52.00 |
| SUL | 33.00 | DME | 25.00 | ISDN | 42.00 |
| SUL | 33.00 | DME | 33.00 | ISDN | 34.00 |
| SUL | 33.00 | DME | 50.00 | ISDN | 17.00 |
| SUL | 33.00 | DME | 15.00 | TTE | 52.00 |
| SUL | 33.00 | DME | 25.00 | TTE | 42.00 |
| SUL | 33.00 | DME | 33.00 | TTE | 34.00 |
| SUL | 33.00 | DME | 50.00 | TTE | 17.00 |
| SUL | 33.00 | DOL | 15.00 | BFE | 52.00 |
| SUL | 33.00 | DOL | 25.00 | BFE | 42.00 |
| SUL | 33.00 | DOL | 33.00 | BFE | 34.00 |
| SUL | 33.00 | DOL | 50.00 | BFE | 17.00 |
| SUL | 33.00 | DOL | 15.00 | 3FP | 52.00 |
| SUL | 33.00 | DOL | 25.00 | 3FP | 42.00 |
| SUL | 33.00 | DOL | 33.00 | 3FP | 34.00 |
| SUL | 33.00 | DOL | 50.00 | 3FP | 17.00 |
| SUL | 33.00 | DOL | 15.00 | BFTE | 52.00 |
| SUL | 33.00 | DOL | 25.00 | BFTE | 42.00 |
| SUL | 33.00 | DOL | 33.00 | BFTE | 34.00 |
| SUL | 33.00 | DOL | 50.00 | BFTE | 17.00 |
| SUL | 33.00 | DOL | 15.00 | FDMB | 52.00 |
| SUL | 33.00 | DOL | 25.00 | FDMB | 42.00 |
| SUL | 33.00 | DOL | 33.00 | FDMB | 34.00 |
| SUL | 33.00 | DOL | 50.00 | FDMB | 17.00 |
| SUL | 33.00 | DOL | 15.00 | ISDN | 52.00 |
| SUL | 33.00 | DOL | 25.00 | ISDN | 42.00 |
| SUL | 33.00 | DOL | 33.00 | ISDN | 34.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| SUL | 33.00 | DOL | 50.00 | ISDN | 17.00 |
| SUL | 33.00 | DOL | 15.00 | TTE | 52.00 |
| SUL | 33.00 | DOL | 25.00 | TTE | 42.00 |
| SUL | 33.00 | DOL | 33.00 | TTE | 34.00 |
| SUL | 33.00 | DOL | 50.00 | TTE | 17.00 |
| SUL | 33.00 | TOL | 15.00 | BFE | 52.00 |
| SUL | 33.00 | TOL | 25.00 | BFE | 42.00 |
| SUL | 33.00 | TOL | 33.00 | BFE | 34.00 |
| SUL | 33.00 | TOL | 50.00 | BFE | 17.00 |
| SUL | 33.00 | TOL | 15.00 | 3FP | 52.00 |
| SUL | 33.00 | TOL | 25.00 | 3FP | 42.00 |
| SUL | 33.00 | TOL | 33.00 | 3FP | 34.00 |
| SUL | 33.00 | TOL | 50.00 | 3FP | 17.00 |
| SUL | 33.00 | TOL | 15.00 | BFTE | 52.00 |
| SUL | 33.00 | TOL | 25.00 | BFTE | 42.00 |
| SUL | 33.00 | TOL | 33.00 | BFTE | 34.00 |
| SUL | 33.00 | TOL | 50.00 | BFTE | 17.00 |
| SUL | 33.00 | TOL | 15.00 | FDMB | 52.00 |
| SUL | 33.00 | TOL | 25.00 | FDMB | 42.00 |
| SUL | 33.00 | TOL | 33.00 | FDMB | 34.00 |
| SUL | 33.00 | TOL | 50.00 | FDMB | 17.00 |
| SUL | 33.00 | TOL | 15.00 | ISDN | 52.00 |
| SUL | 33.00 | TOL | 25.00 | ISDN | 42.00 |
| SUL | 33.00 | TOL | 33.00 | ISDN | 34.00 |
| SUL | 33.00 | TOL | 50.00 | ISDN | 17.00 |
| SUL | 33.00 | TOL | 15.00 | TTE | 52.00 |
| SUL | 33.00 | TOL | 25.00 | TTE | 42.00 |
| SUL | 33.00 | TOL | 33.00 | TTE | 34.00 |
| SUL | 33.00 | TOL | 50.00 | TTE | 17.00 |
| SUL | 50.00 | DME | 10.00 | BFE | 40.00 |
| SUL | 50.00 | DME | 25.00 | BFE | 25.00 |
| SUL | 50.00 | DME | 33.00 | BFE | 17.00 |
| SUL | 50.00 | DME | 15.00 | 3FP | 35.00 |
| SUL | 50.00 | DME | 25.00 | 3FP | 25.00 |
| SUL | 50.00 | DME | 33.00 | 3FP | 17.00 |
| SUL | 50.00 | DME | 15.00 | BFTE | 35.00 |
| SUL | 50.00 | DME | 25.00 | BFTE | 25.00 |
| SUL | 50.00 | DME | 33.00 | BFTE | 17.00 |
| SUL | 50.00 | DME | 15.00 | FDMB | 35.00 |
| SUL | 50.00 | DME | 25.00 | FDMB | 25.00 |
| SUL | 50.00 | DME | 33.00 | FDMB | 17.00 |
| SUL | 50.00 | DME | 15.00 | ISDN | 35.00 |
| SUL | 50.00 | DME | 25.00 | ISDN | 25.00 |
| SUL | 50.00 | DME | 33.00 | ISDN | 17.00 |
| SUL | 50.00 | DME | 15.00 | TTE | 35.00 |
| SUL | 50.00 | DME | 25.00 | TTE | 25.00 |
| SUL | 50.00 | DME | 33.00 | TTE | 17.00 |
| SUL | 50.00 | DOL | 15.00 | BFE | 35.00 |
| SUL | 50.00 | DOL | 25.00 | BFE | 25.00 |
| SUL | 50.00 | DOL | 33.00 | BFE | 17.00 |
| SUL | 50.00 | DOL | 15.00 | 3FP | 35.00 |
| SUL | 50.00 | DOL | 25.00 | 3FP | 25.00 |
| SUL | 50.00 | DOL | 33.00 | 3FP | 17.00 |
| SUL | 50.00 | DOL | 15.00 | BFTE | 35.00 |
| SUL | 50.00 | DOL | 25.00 | BFTE | 25.00 |
| SUL | 50.00 | DOL | 33.00 | BFTE | 17.00 |
| SUL | 50.00 | DOL | 15.00 | FDMB | 35.00 |
| SUL | 50.00 | DOL | 25.00 | FDMB | 25.00 |
| SUL | 50.00 | DOL | 33.00 | FDMB | 17.00 |
| SUL | 50.00 | DOL | 15.00 | ISDN | 35.00 |
| SUL | 50.00 | DOL | 25.00 | ISDN | 25.00 |
| SUL | 50.00 | DOL | 33.00 | ISDN | 17.00 |
| SUL | 50.00 | DOL | 15.00 | TTE | 35.00 |
| SUL | 50.00 | DOL | 25.00 | TTE | 25.00 |
| SUL | 50.00 | DOL | 33.00 | TTE | 17.00 |
| SUL | 50.00 | TOL | 15.00 | BFE | 35.00 |
| SUL | 50.00 | TOL | 25.00 | BFE | 25.00 |
| SUL | 50.00 | TOL | 33.00 | BFE | 17.00 |
| SUL | 50.00 | TOL | 15.00 | 3FP | 35.00 |
| SUL | 50.00 | TOL | 25.00 | 3FP | 25.00 |
| SUL | 50.00 | TOL | 33.00 | 3FP | 17.00 |
| SUL | 50.00 | TOL | 15.00 | BFTE | 35.00 |
| SUL | 50.00 | TOL | 25.00 | BFTE | 25.00 |
| SUL | 50.00 | TOL | 33.00 | BFTE | 17.00 |
| SUL | 50.00 | TOL | 15.00 | FDMB | 35.00 |
| SUL | 50.00 | TOL | 25.00 | FDMB | 25.00 |
| SUL | 50.00 | TOL | 33.00 | FDMB | 17.00 |
| SUL | 50.00 | TOL | 15.00 | ISDN | 35.00 |
| SUL | 50.00 | TOL | 25.00 | ISDN | 25.00 |
| SUL | 50.00 | TOL | 33.00 | ISDN | 17.00 |
| SUL | 50.00 | TOL | 15.00 | TTE | 35.00 |
| SUL | 50.00 | TOL | 25.00 | TTE | 25.00 |
| SUL | 50.00 | TOL | 33.00 | TTE | 17.00 |
| TOL | 25.00 | none | 0 | BFE | 75.00 |
| TOL | 25.00 | none | 0 | 3FP | 75.00 |
| TOL | 25.00 | none | 0 | BFTE | 75.00 |
| TOL | 25.00 | none | 0 | FDMB | 75.00 |
| TOL | 25.00 | none | 0 | ISDN | 75.00 |
| TOL | 25.00 | none | 0 | TTE | 75.00 |
| TOL | 33.00 | none | 0 | BFE | 67.00 |
| TOL | 33.00 | none | 0 | 3FP | 67.00 |
| TOL | 33.00 | none | 0 | BFTE | 67.00 |
| TOL | 33.00 | none | 0 | FDMB | 67.00 |
| TOL | 33.00 | none | 0 | ISDN | 67.00 |
| TOL | 33.00 | none | 0 | TTE | 67.00 |
| TOL | 50.00 | none | 0 | BFE | 50.00 |
| TOL | 50.00 | none | 0 | 3FP | 50.00 |
| TOL | 50.00 | none | 0 | BFTE | 50.00 |
| TOL | 50.00 | none | 0 | FDMB | 50.00 |
| TOL | 50.00 | none | 0 | ISDN | 50.00 |
| TOL | 50.00 | none | 0 | TTE | 50.00 |
| TOL | 75.00 | none | 0 | BFE | 25.00 |
| TOL | 75.00 | none | 0 | 3FP | 25.00 |
| TOL | 75.00 | none | 0 | BFTE | 25.00 |
| TOL | 75.00 | none | 0 | FDMB | 25.00 |
| TOL | 75.00 | none | 0 | ISDN | 25.00 |
| TOL | 75.00 | none | 0 | TTE | 25.00 |
| TOL | 10.00 | DME | 15.00 | BFE | 75.00 |
| TOL | 10.00 | DME | 25.00 | BFE | 65.00 |
| TOL | 10.00 | DME | 33.00 | BFE | 57.00 |
| TOL | 10.00 | DME | 50.00 | BFE | 40.00 |
| TOL | 10.00 | DME | 65.00 | BFE | 25.00 |
| TOL | 10.00 | DME | 15.00 | 3FP | 75.00 |
| TOL | 10.00 | DME | 25.00 | 3FP | 65.00 |
| TOL | 10.00 | DME | 33.00 | 3FP | 57.00 |
| TOL | 10.00 | DME | 50.00 | 3FP | 40.00 |
| TOL | 10.00 | DME | 65.00 | 3FP | 25.00 |
| TOL | 10.00 | DME | 15.00 | BFTE | 75.00 |
| TOL | 10.00 | DME | 25.00 | BFTE | 65.00 |
| TOL | 10.00 | DME | 33.00 | BFTE | 57.00 |
| TOL | 10.00 | DME | 50.00 | BFTE | 40.00 |
| TOL | 10.00 | DME | 65.00 | BFTE | 25.00 |
| TOL | 10.00 | DME | 15.00 | FDMB | 75.00 |
| TOL | 10.00 | DME | 25.00 | FDMB | 65.00 |
| TOL | 10.00 | DME | 33.00 | FDMB | 57.00 |
| TOL | 10.00 | DME | 50.00 | FDMB | 40.00 |
| TOL | 10.00 | DME | 65.00 | FDMB | 25.00 |
| TOL | 10.00 | DME | 15.00 | ISDN | 75.00 |
| TOL | 10.00 | DME | 25.00 | ISDN | 65.00 |
| TOL | 10.00 | DME | 33.00 | ISDN | 57.00 |
| TOL | 10.00 | DME | 50.00 | ISDN | 40.00 |
| TOL | 10.00 | DME | 65.00 | ISDN | 25.00 |
| TOL | 10.00 | DME | 15.00 | TTE | 75.00 |
| TOL | 10.00 | DME | 25.00 | TTE | 65.00 |
| TOL | 10.00 | DME | 33.00 | TTE | 57.00 |
| TOL | 10.00 | DME | 50.00 | TTE | 40.00 |
| TOL | 10.00 | DME | 65.00 | TTE | 25.00 |
| TOL | 10.00 | DOL | 15.00 | BFE | 75.00 |
| TOL | 10.00 | DOL | 25.00 | BFE | 65.00 |
| TOL | 10.00 | DOL | 33.00 | BFE | 57.00 |
| TOL | 10.00 | DOL | 50.00 | BFE | 40.00 |
| TOL | 10.00 | DOL | 65.00 | BFE | 25.00 |
| TOL | 10.00 | DOL | 15.00 | 3FP | 75.00 |
| TOL | 10.00 | DOL | 25.00 | 3FP | 65.00 |
| TOL | 10.00 | DOL | 33.00 | 3FP | 57.00 |
| TOL | 10.00 | DOL | 50.00 | 3FP | 40.00 |
| TOL | 10.00 | DOL | 65.00 | 3FP | 25.00 |
| TOL | 10.00 | DOL | 15.00 | BFTE | 75.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| TOL | 10.00 | DOL | 25.00 | BFTE | 65.00 |
| TOL | 10.00 | DOL | 33.00 | BFTE | 57.00 |
| TOL | 10.00 | DOL | 50.00 | BFTE | 40.00 |
| TOL | 10.00 | DOL | 65.00 | BFTE | 25.00 |
| TOL | 10.00 | DOL | 15.00 | FDMB | 75.00 |
| TOL | 10.00 | DOL | 25.00 | FDMB | 65.00 |
| TOL | 10.00 | DOL | 33.00 | FDMB | 57.00 |
| TOL | 10.00 | DOL | 50.00 | FDMB | 40.00 |
| TOL | 10.00 | DOL | 65.00 | FDMB | 25.00 |
| TOL | 10.00 | DOL | 15.00 | ISDN | 75.00 |
| TOL | 10.00 | DOL | 25.00 | ISDN | 65.00 |
| TOL | 10.00 | DOL | 33.00 | ISDN | 57.00 |
| TOL | 10.00 | DOL | 50.00 | ISDN | 40.00 |
| TOL | 10.00 | DOL | 65.00 | ISDN | 25.00 |
| TOL | 10.00 | DOL | 15.00 | TTE | 75.00 |
| TOL | 10.00 | DOL | 25.00 | TTE | 65.00 |
| TOL | 10.00 | DOL | 33.00 | TTE | 57.00 |
| TOL | 10.00 | DOL | 50.00 | TTE | 40.00 |
| TOL | 10.00 | DOL | 65.00 | TTE | 25.00 |
| TOL | 10.00 | SUL | 15.00 | BFE | 75.00 |
| TOL | 10.00 | SUL | 25.00 | BFE | 65.00 |
| TOL | 10.00 | SUL | 33.00 | BFE | 57.00 |
| TOL | 10.00 | SUL | 50.00 | BFE | 40.00 |
| TOL | 10.00 | SUL | 65.00 | BFE | 25.00 |
| TOL | 10.00 | SUL | 15.00 | 3FP | 75.00 |
| TOL | 10.00 | SUL | 25.00 | 3FP | 65.00 |
| TOL | 10.00 | SUL | 33.00 | 3FP | 57.00 |
| TOL | 10.00 | SUL | 50.00 | 3FP | 40.00 |
| TOL | 10.00 | SUL | 65.00 | 3FP | 25.00 |
| TOL | 10.00 | SUL | 15.00 | BFTE | 75.00 |
| TOL | 10.00 | SUL | 25.00 | BFTE | 65.00 |
| TOL | 10.00 | SUL | 33.00 | BFTE | 57.00 |
| TOL | 10.00 | SUL | 50.00 | BFTE | 40.00 |
| TOL | 10.00 | SUL | 65.00 | BFTE | 25.00 |
| TOL | 10.00 | SUL | 15.00 | FDMB | 75.00 |
| TOL | 10.00 | SUL | 25.00 | FDMB | 65.00 |
| TOL | 10.00 | SUL | 33.00 | FDMB | 57.00 |
| TOL | 10.00 | SUL | 50.00 | FDMB | 40.00 |
| TOL | 10.00 | SUL | 65.00 | FDMB | 25.00 |
| TOL | 10.00 | SUL | 15.00 | ISDN | 75.00 |
| TOL | 10.00 | SUL | 25.00 | ISDN | 65.00 |
| TOL | 10.00 | SUL | 33.00 | ISDN | 57.00 |
| TOL | 10.00 | SUL | 50.00 | ISDN | 40.00 |
| TOL | 10.00 | SUL | 65.00 | ISDN | 25.00 |
| TOL | 10.00 | SUL | 15.00 | TTE | 75.00 |
| TOL | 10.00 | SUL | 25.00 | TTE | 65.00 |
| TOL | 10.00 | SUL | 33.00 | TTE | 57.00 |
| TOL | 10.00 | SUL | 50.00 | TTE | 40.00 |
| TOL | 10.00 | SUL | 65.00 | TTE | 25.00 |
| TOL | 25.00 | DME | 15.00 | BFE | 60.00 |
| TOL | 25.00 | DME | 25.00 | BFE | 50.00 |
| TOL | 25.00 | DME | 33.00 | BFE | 42.00 |
| TOL | 25.00 | DME | 50.00 | BFE | 25.00 |
| TOL | 25.00 | DME | 15.00 | 3FP | 60.00 |
| TOL | 25.00 | DME | 25.00 | 3FP | 50.00 |
| TOL | 25.00 | DME | 33.00 | 3FP | 42.00 |
| TOL | 25.00 | DME | 50.00 | 3FP | 25.00 |
| TOL | 25.00 | DME | 15.00 | BFTE | 60.00 |
| TOL | 25.00 | DME | 25.00 | BFTE | 50.00 |
| TOL | 25.00 | DME | 33.00 | BFTE | 42.00 |
| TOL | 25.00 | DME | 50.00 | BFTE | 25.00 |
| TOL | 25.00 | DME | 15.00 | FDMB | 60.00 |
| TOL | 25.00 | DME | 25.00 | FDMB | 50.00 |
| TOL | 25.00 | DME | 33.00 | FDMB | 42.00 |
| TOL | 25.00 | DME | 50.00 | FDMB | 25.00 |
| TOL | 25.00 | DME | 15.00 | ISDN | 60.00 |
| TOL | 25.00 | DME | 25.00 | ISDN | 50.00 |
| TOL | 25.00 | DME | 33.00 | ISDN | 42.00 |
| TOL | 25.00 | DME | 50.00 | ISDN | 25.00 |
| TOL | 25.00 | DME | 15.00 | TTE | 60.00 |
| TOL | 25.00 | DME | 25.00 | TTE | 50.00 |
| TOL | 25.00 | DME | 33.00 | TTE | 42.00 |
| TOL | 25.00 | DME | 50.00 | TTE | 25.00 |
| TOL | 25.00 | DOL | 15.00 | BFE | 60.00 |
| TOL | 25.00 | DOL | 25.00 | BFE | 50.00 |
| TOL | 25.00 | DOL | 33.00 | BFE | 42.00 |
| TOL | 25.00 | DOL | 50.00 | BFE | 25.00 |
| TOL | 25.00 | DOL | 15.00 | 3FP | 60.00 |
| TOL | 25.00 | DOL | 25.00 | 3FP | 50.00 |
| TOL | 25.00 | DOL | 33.00 | 3FP | 42.00 |
| TOL | 25.00 | DOL | 50.00 | 3FP | 25.00 |
| TOL | 25.00 | DOL | 15.00 | BFTE | 60.00 |
| TOL | 25.00 | DOL | 25.00 | BFTE | 50.00 |
| TOL | 25.00 | DOL | 33.00 | BFTE | 42.00 |
| TOL | 25.00 | DOL | 50.00 | BFTE | 25.00 |
| TOL | 25.00 | DOL | 15.00 | FDMB | 60.00 |
| TOL | 25.00 | DOL | 25.00 | FDMB | 50.00 |
| TOL | 25.00 | DOL | 33.00 | FDMB | 42.00 |
| TOL | 25.00 | DOL | 50.00 | FDMB | 25.00 |
| TOL | 25.00 | DOL | 15.00 | ISDN | 60.00 |
| TOL | 25.00 | DOL | 25.00 | ISDN | 50.00 |
| TOL | 25.00 | DOL | 33.00 | ISDN | 42.00 |
| TOL | 25.00 | DOL | 50.00 | ISDN | 25.00 |
| TOL | 25.00 | DOL | 15.00 | TTE | 60.00 |
| TOL | 25.00 | DOL | 25.00 | TTE | 50.00 |
| TOL | 25.00 | DOL | 33.00 | TTE | 42.00 |
| TOL | 25.00 | DOL | 50.00 | TTE | 25.00 |
| TOL | 25.00 | SUL | 15.00 | BFE | 60.00 |
| TOL | 25.00 | SUL | 25.00 | BFE | 50.00 |
| TOL | 25.00 | SUL | 33.00 | BFE | 42.00 |
| TOL | 25.00 | SUL | 50.00 | BFE | 25.00 |
| TOL | 25.00 | SUL | 15.00 | 3FP | 60.00 |
| TOL | 25.00 | SUL | 25.00 | 3FP | 50.00 |
| TOL | 25.00 | SUL | 33.00 | 3FP | 42.00 |
| TOL | 25.00 | SUL | 50.00 | 3FP | 25.00 |
| TOL | 25.00 | SUL | 15.00 | BFTE | 60.00 |
| TOL | 25.00 | SUL | 25.00 | BFTE | 50.00 |
| TOL | 25.00 | SUL | 33.00 | BFTE | 42.00 |
| TOL | 25.00 | SUL | 50.00 | BFTE | 25.00 |
| TOL | 25.00 | SUL | 15.00 | FDMB | 60.00 |
| TOL | 25.00 | SUL | 25.00 | FDMB | 50.00 |
| TOL | 25.00 | SUL | 33.00 | FDMB | 42.00 |
| TOL | 25.00 | SUL | 50.00 | FDMB | 25.00 |
| TOL | 25.00 | SUL | 15.00 | ISDN | 60.00 |
| TOL | 25.00 | SUL | 25.00 | ISDN | 50.00 |
| TOL | 25.00 | SUL | 33.00 | ISDN | 42.00 |
| TOL | 25.00 | SUL | 50.00 | ISDN | 25.00 |
| TOL | 25.00 | SUL | 15.00 | TTE | 60.00 |
| TOL | 25.00 | SUL | 25.00 | TTE | 50.00 |
| TOL | 25.00 | SUL | 33.00 | TTE | 42.00 |
| TOL | 25.00 | SUL | 50.00 | TTE | 25.00 |
| TOL | 33.00 | DME | 15.00 | BFE | 52.00 |
| TOL | 33.00 | DME | 25.00 | BFE | 42.00 |
| TOL | 33.00 | DME | 33.00 | BFE | 34.00 |
| TOL | 33.00 | DME | 50.00 | BFE | 17.00 |
| TOL | 33.00 | DME | 15.00 | 3FP | 52.00 |
| TOL | 33.00 | DME | 25.00 | 3FP | 42.00 |
| TOL | 33.00 | DME | 33.00 | 3FP | 34.00 |
| TOL | 33.00 | DME | 50.00 | 3FP | 17.00 |
| TOL | 33.00 | DME | 15.00 | BFTE | 52.00 |
| TOL | 33.00 | DME | 25.00 | BFTE | 42.00 |
| TOL | 33.00 | DME | 33.00 | BFTE | 34.00 |
| TOL | 33.00 | DME | 50.00 | BFTE | 17.00 |
| TOL | 33.00 | DME | 15.00 | FDMB | 52.00 |
| TOL | 33.00 | DME | 25.00 | FDMB | 42.00 |
| TOL | 33.00 | DME | 33.00 | FDMB | 34.00 |
| TOL | 33.00 | DME | 50.00 | FDMB | 17.00 |
| TOL | 33.00 | DME | 15.00 | ISDN | 52.00 |
| TOL | 33.00 | DME | 25.00 | ISDN | 42.00 |
| TOL | 33.00 | DME | 33.00 | ISDN | 34.00 |
| TOL | 33.00 | DME | 50.00 | ISDN | 17.00 |
| TOL | 33.00 | DME | 15.00 | TTE | 52.00 |
| TOL | 33.00 | DME | 25.00 | TTE | 42.00 |
| TOL | 33.00 | DME | 33.00 | TTE | 34.00 |
| TOL | 33.00 | DME | 50.00 | TTE | 17.00 |
| TOL | 33.00 | DOL | 15.00 | BFE | 52.00 |
| TOL | 33.00 | DOL | 25.00 | BFE | 42.00 |
| TOL | 33.00 | DOL | 33.00 | BFE | 34.00 |

TABLE 2-continued

Exemplary Solvent System Components

| Solvent 1 | Vol % Solvent 1 | Solvent 2 | Vol % Solvent 2 | Electron Withdrawing Compound (EWC) | Vol % EWC |
|---|---|---|---|---|---|
| TOL | 33.00 | DOL | 50.00 | BFE | 17.00 |
| TOL | 33.00 | DOL | 15.00 | 3FP | 52.00 |
| TOL | 33.00 | DOL | 25.00 | 3FP | 42.00 |
| TOL | 33.00 | DOL | 33.00 | 3FP | 34.00 |
| TOL | 33.00 | DOL | 50.00 | 3FP | 17.00 |
| TOL | 33.00 | DOL | 15.00 | BFTE | 52.00 |
| TOL | 33.00 | DOL | 25.00 | BFTE | 42.00 |
| TOL | 33.00 | DOL | 33.00 | BFTE | 34.00 |
| TOL | 33.00 | DOL | 50.00 | BFTE | 17.00 |
| TOL | 33.00 | DOL | 15.00 | FDMB | 52.00 |
| TOL | 33.00 | DOL | 25.00 | FDMB | 42.00 |
| TOL | 33.00 | DOL | 33.00 | FDMB | 34.00 |
| TOL | 33.00 | DOL | 50.00 | FDMB | 17.00 |
| TOL | 33.00 | DOL | 15.00 | ISDN | 52.00 |
| TOL | 33.00 | DOL | 25.00 | ISDN | 42.00 |
| TOL | 33.00 | DOL | 33.00 | ISDN | 34.00 |
| TOL | 33.00 | DOL | 50.00 | ISDN | 17.00 |
| TOL | 33.00 | DOL | 15.00 | TTE | 52.00 |
| TOL | 33.00 | DOL | 25.00 | TTE | 42.00 |
| TOL | 33.00 | DOL | 33.00 | TTE | 34.00 |
| TOL | 33.00 | DOL | 50.00 | TTE | 17.00 |
| TOL | 33.00 | SUL | 15.00 | BFE | 52.00 |
| TOL | 33.00 | SUL | 25.00 | BFE | 42.00 |
| TOL | 33.00 | SUL | 33.00 | BFE | 34.00 |
| TOL | 33.00 | SUL | 50.00 | BFE | 17.00 |
| TOL | 33.00 | SUL | 15.00 | 3FP | 52.00 |
| TOL | 33.00 | SUL | 25.00 | 3FP | 42.00 |
| TOL | 33.00 | SUL | 33.00 | 3FP | 34.00 |
| TOL | 33.00 | SUL | 50.00 | 3FP | 17.00 |
| TOL | 33.00 | SUL | 15.00 | BFTE | 52.00 |
| TOL | 33.00 | SUL | 25.00 | BFTE | 42.00 |
| TOL | 33.00 | SUL | 33.00 | BFTE | 34.00 |
| TOL | 33.00 | SUL | 50.00 | BFTE | 17.00 |
| TOL | 33.00 | SUL | 15.00 | FDMB | 52.00 |
| TOL | 33.00 | SUL | 25.00 | FDMB | 42.00 |
| TOL | 33.00 | SUL | 33.00 | FDMB | 34.00 |
| TOL | 33.00 | SUL | 50.00 | FDMB | 17.00 |
| TOL | 33.00 | SUL | 15.00 | ISDN | 52.00 |
| TOL | 33.00 | SUL | 25.00 | ISDN | 42.00 |
| TOL | 33.00 | SUL | 33.00 | ISDN | 34.00 |
| TOL | 33.00 | SUL | 50.00 | ISDN | 17.00 |
| TOL | 33.00 | SUL | 15.00 | TTE | 52.00 |
| TOL | 33.00 | SUL | 25.00 | TTE | 42.00 |
| TOL | 33.00 | SUL | 33.00 | TTE | 34.00 |
| TOL | 33.00 | SUL | 50.00 | TTE | 17.00 |
| TOL | 50.00 | DME | 10.00 | BFE | 40.00 |
| TOL | 50.00 | DME | 25.00 | BFE | 25.00 |
| TOL | 50.00 | DME | 33.00 | BFE | 17.00 |
| TOL | 50.00 | DME | 15.00 | 3FP | 35.00 |
| TOL | 50.00 | DME | 25.00 | 3FP | 25.00 |
| TOL | 50.00 | DME | 33.00 | 3FP | 17.00 |
| TOL | 50.00 | DME | 15.00 | BFTE | 35.00 |
| TOL | 50.00 | DME | 25.00 | BFTE | 25.00 |
| TOL | 50.00 | DME | 33.00 | BFTE | 17.00 |
| TOL | 50.00 | DME | 15.00 | FDMB | 35.00 |
| TOL | 50.00 | DME | 25.00 | FDMB | 25.00 |
| TOL | 50.00 | DME | 33.00 | FDMB | 17.00 |
| TOL | 50.00 | DME | 15.00 | ISDN | 35.00 |
| TOL | 50.00 | DME | 25.00 | ISDN | 25.00 |
| TOL | 50.00 | DME | 33.00 | ISDN | 17.00 |
| TOL | 50.00 | DME | 15.00 | TTE | 35.00 |
| TOL | 50.00 | DME | 25.00 | TTE | 25.00 |
| TOL | 50.00 | DME | 33.00 | TTE | 17.00 |
| TOL | 50.00 | DOL | 15.00 | BFE | 35.00 |
| TOL | 50.00 | DOL | 25.00 | BFE | 25.00 |
| TOL | 50.00 | DOL | 33.00 | BFE | 17.00 |
| TOL | 50.00 | DOL | 15.00 | 3FP | 35.00 |
| TOL | 50.00 | DOL | 25.00 | 3FP | 25.00 |
| TOL | 50.00 | DOL | 33.00 | 3FP | 17.00 |
| TOL | 50.00 | DOL | 15.00 | BFTE | 35.00 |
| TOL | 50.00 | DOL | 25.00 | BFTE | 25.00 |
| TOL | 50.00 | DOL | 33.00 | BFTE | 17.00 |
| TOL | 50.00 | DOL | 15.00 | FDMB | 35.00 |
| TOL | 50.00 | DOL | 25.00 | FDMB | 25.00 |
| TOL | 50.00 | DOL | 33.00 | FDMB | 17.00 |
| TOL | 50.00 | DOL | 15.00 | ISDN | 35.00 |
| TOL | 50.00 | DOL | 25.00 | ISDN | 25.00 |
| TOL | 50.00 | DOL | 33.00 | ISDN | 17.00 |
| TOL | 50.00 | DOL | 15.00 | TTE | 35.00 |
| TOL | 50.00 | DOL | 25.00 | TTE | 25.00 |
| TOL | 50.00 | DOL | 33.00 | TTE | 17.00 |
| TOL | 50.00 | SUL | 15.00 | BFE | 35.00 |
| TOL | 50.00 | SUL | 25.00 | BFE | 25.00 |
| TOL | 50.00 | SUL | 33.00 | BFE | 17.00 |
| TOL | 50.00 | SUL | 15.00 | 3FP | 35.00 |
| TOL | 50.00 | SUL | 25.00 | 3FP | 25.00 |
| TOL | 50.00 | SUL | 33.00 | 3FP | 17.00 |
| TOL | 50.00 | SUL | 15.00 | BFTE | 35.00 |
| TOL | 50.00 | SUL | 25.00 | BFTE | 25.00 |
| TOL | 50.00 | SUL | 33.00 | BFTE | 17.00 |
| TOL | 50.00 | SUL | 15.00 | FDMB | 35.00 |
| TOL | 50.00 | SUL | 25.00 | FDMB | 25.00 |
| TOL | 50.00 | SUL | 33.00 | FDMB | 17.00 |
| TOL | 50.00 | SUL | 15.00 | ISDN | 35.00 |
| TOL | 50.00 | SUL | 25.00 | ISDN | 25.00 |
| TOL | 50.00 | SUL | 33.00 | ISDN | 17.00 |
| TOL | 50.00 | SUL | 15.00 | TTE | 35.00 |
| TOL | 50.00 | SUL | 25.00 | TTE | 25.00 |
| TOL | 50.00 | SUL | 33.00 | TTE | 17.00 |

TABLE 3

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| lithium bis(trifluoro-methane sulfonyl)-imide (LiTFSI) | 0.10 | none | 0.00 | guanidine nitrate | 0.10 |
| LiTFSI | 0.25 | none | 0.00 | guanidine nitrate | 0.10 |
| LiTFSI | 0.40 | none | 0.00 | guanidine nitrate | 0.10 |
| LiTFSI | 0.50 | none | 0.00 | guanidine nitrate | 0.10 |
| LiTFSI | 0.66 | none | 0.00 | guanidine nitrate | 0.10 |
| LiTFSI | 0.75 | none | 0.00 | guanidine nitrate | 0.10 |
| LiTFSI | 1.00 | none | 0.00 | guanidine nitrate | 0.10 |
| LiTFSI | 0.10 | none | 0.00 | guanidine nitrate | 0.15 |
| LiTFSI | 0.25 | none | 0.00 | guanidine nitrate | 0.15 |
| LiTFSI | 0.40 | none | 0.00 | guanidine nitrate | 0.15 |
| LiTFSI | 0.50 | none | 0.00 | guanidine nitrate | 0.15 |
| LiTFSI | 0.66 | none | 0.00 | guanidine nitrate | 0.15 |
| LiTFSI | 0.75 | none | 0.00 | guanidine nitrate | 0.15 |
| LiTFSI | 1.00 | none | 0.00 | guanidine nitrate | 0.15 |
| LiTFSI | 0.10 | lithium nitrate (LiNO$_3$) | 0.10 | dicyaner diamide (DCDA) | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFSI | 0.10 | LiNO₃ | 0.25 | DCDA | 0.10 |
| LiTFSI | 0.10 | LiNO₃ | 0.33 | DCDA | 0.10 |
| LiTFSI | 0.10 | LiNO₃ | 0.50 | DCDA | 0.10 |
| LiTFSI | 0.10 | LiNO₃ | 0.66 | DCDA | 0.10 |
| LiTFSI | 0.10 | LiNO₃ | 0.75 | DCDA | 0.10 |
| LiTFSI | 0.10 | LiNO₃ | 1.00 | DCDA | 0.10 |
| LiTFSI | 0.10 | LiNO₃ | 0.10 | DCDA | 0.15 |
| LiTFSI | 0.10 | LiNO₃ | 0.25 | DCDA | 0.15 |
| LiTFSI | 0.10 | LiNO₃ | 0.33 | DCDA | 0.15 |
| LiTFSI | 0.10 | LiNO₃ | 0.50 | DCDA | 0.15 |
| LiTFSI | 0.10 | LiNO₃ | 0.66 | DCDA | 0.15 |
| LiTFSI | 0.10 | LiNO₃ | 0.75 | DCDA | 0.15 |
| LiTFSI | 0.10 | LiNO₃ | 1.00 | DCDA | 0.15 |
| LiTFSI | 0.25 | LiNO₃ | 0.10 | DCDA | 0.10 |
| LiTFSI | 0.25 | LiNO₃ | 0.25 | DCDA | 0.10 |
| LiTFSI | 0.25 | LiNO₃ | 0.33 | DCDA | 0.10 |
| LiTFSI | 0.25 | LiNO₃ | 0.50 | DCDA | 0.10 |
| LiTFSI | 0.25 | LiNO₃ | 0.66 | DCDA | 0.10 |
| LiTFSI | 0.25 | LiNO₃ | 0.75 | DCDA | 0.10 |
| LiTFSI | 0.25 | LiNO₃ | 1.00 | DCDA | 0.10 |
| LiTFSI | 0.25 | LiNO₃ | 0.10 | DCDA | 0.15 |
| LiTFSI | 0.25 | LiNO₃ | 0.25 | DCDA | 0.15 |
| LiTFSI | 0.25 | LiNO₃ | 0.33 | DCDA | 0.15 |
| LiTFSI | 0.25 | LiNO₃ | 0.50 | DCDA | 0.15 |
| LiTFSI | 0.25 | LiNO₃ | 0.66 | DCDA | 0.15 |
| LiTFSI | 0.25 | LiNO₃ | 0.75 | DCDA | 0.15 |
| LiTFSI | 0.25 | LiNO₃ | 1.00 | DCDA | 0.15 |
| LiTFSI | 0.40 | LiNO₃ | 0.10 | DCDA | 0.10 |
| LiTFSI | 0.40 | LiNO₃ | 0.25 | DCDA | 0.10 |
| LiTFSI | 0.40 | LiNO₃ | 0.33 | DCDA | 0.10 |
| LiTFSI | 0.40 | LiNO₃ | 0.50 | DCDA | 0.10 |
| LiTFSI | 0.40 | LiNO₃ | 0.66 | DCDA | 0.10 |
| LiTFSI | 0.40 | LiNO₃ | 0.75 | DCDA | 0.10 |
| LiTFSI | 0.40 | LiNO₃ | 1.00 | DCDA | 0.10 |
| LiTFSI | 0.40 | LiNO₃ | 0.10 | DCDA | 0.15 |
| LiTFSI | 0.40 | LiNO₃ | 0.25 | DCDA | 0.15 |
| LiTFSI | 0.40 | LiNO₃ | 0.33 | DCDA | 0.15 |
| LiTFSI | 0.40 | LiNO₃ | 0.50 | DCDA | 0.15 |
| LiTFSI | 0.40 | LiNO₃ | 0.66 | DCDA | 0.15 |
| LiTFSI | 0.40 | LiNO₃ | 0.75 | DCDA | 0.15 |
| LiTFSI | 0.40 | LiNO₃ | 1.00 | DCDA | 0.15 |
| LiTFSI | 0.50 | LiNO₃ | 0.10 | DCDA | 0.10 |
| LiTFSI | 0.50 | LiNO₃ | 0.25 | DCDA | 0.10 |
| LiTFSI | 0.50 | LiNO₃ | 0.33 | DCDA | 0.10 |
| LiTFSI | 0.50 | LiNO₃ | 0.50 | DCDA | 0.10 |
| LiTFSI | 0.50 | LiNO₃ | 0.66 | DCDA | 0.10 |
| LiTFSI | 0.50 | LiNO₃ | 0.75 | DCDA | 0.10 |
| LiTFSI | 0.50 | LiNO₃ | 1.00 | DCDA | 0.10 |
| LiTFSI | 0.50 | LiNO₃ | 0.10 | DCDA | 0.15 |
| LiTFSI | 0.50 | LiNO₃ | 0.25 | DCDA | 0.15 |
| LiTFSI | 0.50 | LiNO₃ | 0.33 | DCDA | 0.15 |
| LiTFSI | 0.50 | LiNO₃ | 0.50 | DCDA | 0.15 |
| LiTFSI | 0.50 | LiNO₃ | 0.66 | DCDA | 0.15 |
| LiTFSI | 0.50 | LiNO₃ | 0.75 | DCDA | 0.15 |
| LiTFSI | 0.50 | LiNO₃ | 1.00 | DCDA | 0.15 |
| LiTFSI | 0.66 | LiNO₃ | 0.10 | DCDA | 0.10 |
| LiTFSI | 0.66 | LiNO₃ | 0.25 | DCDA | 0.10 |
| LiTFSI | 0.66 | LiNO₃ | 0.33 | DCDA | 0.10 |
| LiTFSI | 0.66 | LiNO₃ | 0.50 | DCDA | 0.10 |
| LiTFSI | 0.66 | LiNO₃ | 0.66 | DCDA | 0.10 |
| LiTFSI | 0.66 | LiNO₃ | 0.75 | DCDA | 0.10 |
| LiTFSI | 0.66 | LiNO₃ | 1.00 | DCDA | 0.10 |
| LiTFSI | 0.66 | LiNO₃ | 0.10 | DCDA | 0.15 |
| LiTFSI | 0.66 | LiNO₃ | 0.25 | DCDA | 0.15 |
| LiTFSI | 0.66 | LiNO₃ | 0.33 | DCDA | 0.15 |
| LiTFSI | 0.66 | LiNO₃ | 0.50 | DCDA | 0.15 |
| LiTFSI | 0.66 | LiNO₃ | 0.66 | DCDA | 0.15 |
| LiTFSI | 0.66 | LiNO₃ | 0.75 | DCDA | 0.15 |
| LiTFSI | 0.66 | LiNO₃ | 1.00 | DCDA | 0.15 |
| LiTFSI | 0.75 | LiNO₃ | 0.10 | DCDA | 0.10 |
| LiTFSI | 0.75 | LiNO₃ | 0.25 | DCDA | 0.10 |
| LiTFSI | 0.75 | LiNO₃ | 0.33 | DCDA | 0.10 |
| LiTFSI | 0.75 | LiNO₃ | 0.50 | DCDA | 0.10 |
| LiTFSI | 0.75 | LiNO₃ | 0.66 | DCDA | 0.10 |
| LiTFSI | 0.75 | LiNO₃ | 0.75 | DCDA | 0.10 |
| LiTFSI | 0.75 | LiNO₃ | 1.00 | DCDA | 0.10 |
| LiTFSI | 0.75 | LiNO₃ | 0.10 | DCDA | 0.15 |
| LiTFSI | 0.75 | LiNO₃ | 0.25 | DCDA | 0.15 |
| LiTFSI | 0.75 | LiNO₃ | 0.33 | DCDA | 0.15 |
| LiTFSI | 0.75 | LiNO₃ | 0.50 | DCDA | 0.15 |
| LiTFSI | 0.75 | LiNO₃ | 0.66 | DCDA | 0.15 |
| LiTFSI | 0.75 | LiNO₃ | 0.75 | DCDA | 0.15 |
| LiTFSI | 0.75 | LiNO₃ | 1.00 | DCDA | 0.15 |
| LiTFSI | 1.00 | LiNO₃ | 0.10 | DCDA | 0.10 |
| LiTFSI | 1.00 | LiNO₃ | 0.25 | DCDA | 0.10 |
| LiTFSI | 1.00 | LiNO₃ | 0.33 | DCDA | 0.10 |
| LiTFSI | 1.00 | LiNO₃ | 0.50 | DCDA | 0.10 |
| LiTFSI | 1.00 | LiNO₃ | 0.66 | DCDA | 0.10 |
| LiTFSI | 1.00 | LiNO₃ | 0.75 | DCDA | 0.10 |
| LiTFSI | 1.00 | LiNO₃ | 1.00 | DCDA | 0.10 |
| LiTFSI | 1.00 | LiNO₃ | 0.10 | DCDA | 0.15 |
| LiTFSI | 1.00 | LiNO₃ | 0.25 | DCDA | 0.15 |
| LiTFSI | 1.00 | LiNO₃ | 0.33 | DCDA | 0.15 |
| LiTFSI | 1.00 | LiNO₃ | 0.50 | DCDA | 0.15 |
| LiTFSI | 1.00 | LiNO₃ | 0.66 | DCDA | 0.15 |
| LiTFSI | 1.00 | LiNO₃ | 0.75 | DCDA | 0.15 |
| LiTFSI | 1.00 | LiNO₃ | 1.00 | DCDA | 0.15 |
| LiTFSI | 0.10 | lithium Perchlorate (LiClO₄) | 0.10 | guanine | 0.10 |
| LiTFSI | 0.10 | LiClO₄ | 0.25 | guanine | 0.10 |
| LiTFSI | 0.10 | LiClO₄ | 0.33 | guanine | 0.10 |
| LiTFSI | 0.10 | LiClO₄ | 0.50 | guanine | 0.10 |
| LiTFSI | 0.10 | LiClO₄ | 0.66 | guanine | 0.10 |
| LiTFSI | 0.10 | LiClO₄ | 0.75 | guanine | 0.10 |
| LiTFSI | 0.10 | LiClO₄ | 1.00 | guanine | 0.10 |
| LiTFSI | 0.10 | LiClO₄ | 0.10 | guanine | 0.15 |
| LiTFSI | 0.10 | LiClO₄ | 0.25 | guanine | 0.15 |
| LiTFSI | 0.10 | LiClO₄ | 0.33 | guanine | 0.15 |
| LiTFSI | 0.10 | LiClO₄ | 0.50 | guanine | 0.15 |
| LiTFSI | 0.10 | LiClO₄ | 0.66 | guanine | 0.15 |
| LiTFSI | 0.10 | LiClO₄ | 0.75 | guanine | 0.15 |
| LiTFSI | 0.10 | LiClO₄ | 1.00 | guanine | 0.15 |
| LiTFSI | 0.25 | LiClO₄ | 0.10 | guanine | 0.10 |
| LiTFSI | 0.25 | LiClO₄ | 0.25 | guanine | 0.10 |
| LiTFSI | 0.25 | LiClO₄ | 0.33 | guanine | 0.10 |
| LiTFSI | 0.25 | LiClO₄ | 0.50 | guanine | 0.10 |
| LiTFSI | 0.25 | LiClO₄ | 0.66 | guanine | 0.10 |
| LiTFSI | 0.25 | LiClO₄ | 0.75 | guanine | 0.10 |
| LiTFSI | 0.25 | LiClO₄ | 1.00 | guanine | 0.10 |
| LiTFSI | 0.25 | LiClO₄ | 0.10 | guanine | 0.15 |
| LiTFSI | 0.25 | LiClO₄ | 0.25 | guanine | 0.15 |
| LiTFSI | 0.25 | LiClO₄ | 0.33 | guanine | 0.15 |
| LiTFSI | 0.25 | LiClO₄ | 0.50 | guanine | 0.15 |
| LiTFSI | 0.25 | LiClO₄ | 0.66 | guanine | 0.15 |
| LiTFSI | 0.25 | LiClO₄ | 0.75 | guanine | 0.15 |
| LiTFSI | 0.25 | LiClO₄ | 1.00 | guanine | 0.15 |
| LiTFSI | 0.40 | LiClO₄ | 0.10 | guanine | 0.10 |
| LiTFSI | 0.40 | LiClO₄ | 0.25 | guanine | 0.10 |
| LiTFSI | 0.40 | LiClO₄ | 0.33 | guanine | 0.10 |
| LiTFSI | 0.40 | LiClO₄ | 0.50 | guanine | 0.10 |
| LiTFSI | 0.40 | LiClO₄ | 0.66 | guanine | 0.10 |
| LiTFSI | 0.40 | LiClO₄ | 0.75 | guanine | 0.10 |
| LiTFSI | 0.40 | LiClO₄ | 1.00 | guanine | 0.10 |
| LiTFSI | 0.40 | LiClO₄ | 0.10 | guanine | 0.15 |
| LiTFSI | 0.40 | LiClO₄ | 0.25 | guanine | 0.15 |
| LiTFSI | 0.40 | LiClO₄ | 0.33 | guanine | 0.15 |
| LiTFSI | 0.40 | LiClO₄ | 0.50 | guanine | 0.15 |
| LiTFSI | 0.40 | LiClO₄ | 0.66 | guanine | 0.15 |
| LiTFSI | 0.40 | LiClO₄ | 0.75 | guanine | 0.15 |
| LiTFSI | 0.40 | LiClO₄ | 1.00 | guanine | 0.15 |
| LiTFSI | 0.50 | LiClO₄ | 0.10 | guanine | 0.10 |
| LiTFSI | 0.50 | LiClO₄ | 0.25 | guanine | 0.10 |
| LiTFSI | 0.50 | LiClO₄ | 0.33 | guanine | 0.10 |
| LiTFSI | 0.50 | LiClO₄ | 0.50 | guanine | 0.10 |
| LiTFSI | 0.50 | LiClO₄ | 0.66 | guanine | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFSI | 0.50 | LiClO$_4$ | 0.75 | guanine | 0.10 |
| LiTFSI | 0.50 | LiClO$_4$ | 1.00 | guanine | 0.10 |
| LiTFSI | 0.50 | LiClO$_4$ | 0.10 | guanine | 0.15 |
| LiTFSI | 0.50 | LiClO$_4$ | 0.25 | guanine | 0.15 |
| LiTFSI | 0.50 | LiClO$_4$ | 0.33 | guanine | 0.15 |
| LiTFSI | 0.50 | LiClO$_4$ | 0.50 | guanine | 0.15 |
| LiTFSI | 0.50 | LiClO$_4$ | 0.66 | guanine | 0.15 |
| LiTFSI | 0.50 | LiClO$_4$ | 0.75 | guanine | 0.15 |
| LiTFSI | 0.50 | LiClO$_4$ | 1.00 | guanine | 0.15 |
| LiTFSI | 0.66 | LiClO$_4$ | 0.10 | guanine | 0.10 |
| LiTFSI | 0.66 | LiClO$_4$ | 0.25 | guanine | 0.10 |
| LiTFSI | 0.66 | LiClO$_4$ | 0.33 | guanine | 0.10 |
| LiTFSI | 0.66 | LiClO$_4$ | 0.50 | guanine | 0.10 |
| LiTFSI | 0.66 | LiClO$_4$ | 0.66 | guanine | 0.10 |
| LiTFSI | 0.66 | LiClO$_4$ | 0.75 | guanine | 0.10 |
| LiTFSI | 0.66 | LiClO$_4$ | 1.00 | guanine | 0.10 |
| LiTFSI | 0.66 | LiClO$_4$ | 0.10 | guanine | 0.15 |
| LiTFSI | 0.66 | LiClO$_4$ | 0.25 | guanine | 0.15 |
| LiTFSI | 0.66 | LiClO$_4$ | 0.33 | guanine | 0.15 |
| LiTFSI | 0.66 | LiClO$_4$ | 0.50 | guanine | 0.15 |
| LiTFSI | 0.66 | LiClO$_4$ | 0.66 | guanine | 0.15 |
| LiTFSI | 0.66 | LiClO$_4$ | 0.75 | guanine | 0.15 |
| LiTFSI | 0.66 | LiClO$_4$ | 1.00 | guanine | 0.15 |
| LiTFSI | 0.75 | LiClO$_4$ | 0.10 | guanine | 0.10 |
| LiTFSI | 0.75 | LiClO$_4$ | 0.25 | guanine | 0.10 |
| LiTFSI | 0.75 | LiClO$_4$ | 0.33 | guanine | 0.10 |
| LiTFSI | 0.75 | LiClO$_4$ | 0.50 | guanine | 0.10 |
| LiTFSI | 0.75 | LiClO$_4$ | 0.66 | guanine | 0.10 |
| LiTFSI | 0.75 | LiClO$_4$ | 0.75 | guanine | 0.10 |
| LiTFSI | 0.75 | LiClO$_4$ | 1.00 | guanine | 0.10 |
| LiTFSI | 0.75 | LiClO$_4$ | 0.10 | guanine | 0.15 |
| LiTFSI | 0.75 | LiClO$_4$ | 0.25 | guanine | 0.15 |
| LiTFSI | 0.75 | LiClO$_4$ | 0.33 | guanine | 0.15 |
| LiTFSI | 0.75 | LiClO$_4$ | 0.50 | guanine | 0.15 |
| LiTFSI | 0.75 | LiClO$_4$ | 0.66 | guanine | 0.15 |
| LiTFSI | 0.75 | LiClO$_4$ | 0.75 | guanine | 0.15 |
| LiTFSI | 0.75 | LiClO$_4$ | 1.00 | guanine | 0.15 |
| LiTFSI | 1.00 | LiClO$_4$ | 0.10 | guanine | 0.10 |
| LiTFSI | 1.00 | LiClO$_4$ | 0.25 | guanine | 0.10 |
| LiTFSI | 1.00 | LiClO$_4$ | 0.33 | guanine | 0.10 |
| LiTFSI | 1.00 | LiClO$_4$ | 0.50 | guanine | 0.10 |
| LiTFSI | 1.00 | LiClO$_4$ | 0.66 | guanine | 0.10 |
| LiTFSI | 1.00 | LiClO$_4$ | 0.75 | guanine | 0.10 |
| LiTFSI | 1.00 | LiClO$_4$ | 1.00 | guanine | 0.10 |
| LiTFSI | 1.00 | LiClO$_4$ | 0.10 | guanine | 0.15 |
| LiTFSI | 1.00 | LiClO$_4$ | 0.25 | guanine | 0.15 |
| LiTFSI | 1.00 | LiClO$_4$ | 0.33 | guanine | 0.15 |
| LiTFSI | 1.00 | LiClO$_4$ | 0.50 | guanine | 0.15 |
| LiTFSI | 1.00 | LiClO$_4$ | 0.66 | guanine | 0.15 |
| LiTFSI | 1.00 | LiClO$_4$ | 0.75 | guanine | 0.15 |
| LiTFSI | 1.00 | LiClO$_4$ | 1.00 | guanine | 0.15 |
| LiTFSI | 0.10 | Lithium trifluoroacetate (LiTFAc) | 0.10 | guanidine nitrate | 0.10 |
| LiTFSI | 0.10 | LiTFAc | 0.25 | guanidine nitrate | 0.10 |
| LiTFSI | 0.10 | LiTFAc | 0.33 | guanidine nitrate | 0.10 |
| LiTFSI | 0.10 | LiTFAc | 0.50 | guanidine nitrate | 0.10 |
| LiTFSI | 0.10 | LiTFAc | 0.66 | guanidine nitrate | 0.10 |
| LiTFSI | 0.10 | LiTFAc | 0.75 | guanidine nitrate | 0.10 |
| LiTFSI | 0.10 | LiTFAc | 1.00 | guanidine nitrate | 0.10 |
| LiTFSI | 0.10 | LiTFAc | 0.10 | guanidine nitrate | 0.15 |
| LiTFSI | 0.10 | LiTFAc | 0.25 | guanidine nitrate | 0.15 |
| LiTFSI | 0.10 | LiTFAc | 0.33 | guanidine nitrate | 0.15 |
| LiTFSI | 0.10 | LiTFAc | 0.50 | guanidine nitrate | 0.15 |
| LiTFSI | 0.10 | LiTFAc | 0.66 | guanidine nitrate | 0.15 |
| LiTFSI | 0.10 | LiTFAc | 0.75 | guanidine nitrate | 0.15 |
| LiTFSI | 0.10 | LiTFAc | 1.00 | guanidine nitrate | 0.15 |
| LiTFSI | 0.25 | LiTFAc | 0.10 | guanidine nitrate | 0.10 |
| LiTFSI | 0.25 | LiTFAc | 0.25 | guanidine nitrate | 0.10 |
| LiTFSI | 0.25 | LiTFAc | 0.33 | guanidine nitrate | 0.10 |
| LiTFSI | 0.25 | LiTFAc | 0.50 | guanidine nitrate | 0.10 |
| LiTFSI | 0.25 | LiTFAc | 0.66 | guanidine nitrate | 0.10 |
| LiTFSI | 0.25 | LiTFAc | 0.75 | guanidine nitrate | 0.10 |
| LiTFSI | 0.25 | LiTFAc | 1.00 | guanidine nitrate | 0.10 |
| LiTFSI | 0.25 | LiTFAc | 0.10 | guanidine nitrate | 0.15 |
| LiTFSI | 0.25 | LiTFAc | 0.25 | guanidine nitrate | 0.15 |
| LiTFSI | 0.25 | LiTFAc | 0.33 | guanidine nitrate | 0.15 |
| LiTFSI | 0.25 | LiTFAc | 0.50 | guanidine nitrate | 0.15 |
| LiTFSI | 0.25 | LiTFAc | 0.66 | guanidine nitrate | 0.15 |
| LiTFSI | 0.25 | LiTFAc | 0.75 | guanidine nitrate | 0.15 |
| LiTFSI | 0.25 | LiTFAc | 1.00 | guanidine nitrate | 0.15 |
| LiTFSI | 0.40 | LiTFAc | 0.10 | guanidine nitrate | 0.10 |
| LiTFSI | 0.40 | LiTFAc | 0.25 | guanidine nitrate | 0.10 |
| LiTFSI | 0.40 | LiTFAc | 0.33 | guanidine nitrate | 0.10 |
| LiTFSI | 0.40 | LiTFAc | 0.50 | guanidine nitrate | 0.10 |
| LiTFSI | 0.40 | LiTFAc | 0.66 | guanidine nitrate | 0.10 |
| LiTFSI | 0.40 | LiTFAc | 0.75 | guanidine nitrate | 0.10 |
| LiTFSI | 0.40 | LiTFAc | 1.00 | guanidine nitrate | 0.10 |
| LiTFSI | 0.40 | LiTFAc | 0.10 | guanidine nitrate | 0.15 |
| LiTFSI | 0.40 | LiTFAc | 0.25 | guanidine nitrate | 0.15 |
| LiTFSI | 0.40 | LiTFAc | 0.33 | guanidine nitrate | 0.15 |
| LiTFSI | 0.40 | LiTFAc | 0.50 | guanidine nitrate | 0.15 |
| LiTFSI | 0.40 | LiTFAc | 0.66 | guanidine nitrate | 0.15 |
| LiTFSI | 0.40 | LiTFAc | 0.75 | guanidine nitrate | 0.15 |
| LiTFSI | 0.40 | LiTFAc | 1.00 | guanidine nitrate | 0.15 |
| LiTFSI | 0.50 | LiTFAc | 0.10 | guanidine nitrate | 0.10 |
| LiTFSI | 0.50 | LiTFAc | 0.25 | guanidine nitrate | 0.10 |
| LiTFSI | 0.50 | LiTFAc | 0.33 | guanidine nitrate | 0.10 |
| LiTFSI | 0.50 | LiTFAc | 0.50 | guanidine nitrate | 0.10 |
| LiTFSI | 0.50 | LiTFAc | 0.66 | guanidine nitrate | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFSI | 0.50 | LiTFAc | 0.75 | guanidine nitrate | 0.10 |
| LiTFSI | 0.50 | LiTFAc | 1.00 | guanidine nitrate | 0.10 |
| LiTFSI | 0.50 | LiTFAc | 0.10 | guanidine nitrate | 0.15 |
| LiTFSI | 0.50 | LiTFAc | 0.25 | guanidine nitrate | 0.15 |
| LiTFSI | 0.50 | LiTFAc | 0.33 | guanidine nitrate | 0.15 |
| LiTFSI | 0.50 | LiTFAc | 0.50 | guanidine nitrate | 0.15 |
| LiTFSI | 0.50 | LiTFAc | 0.66 | guanidine nitrate | 0.15 |
| LiTFSI | 0.50 | LiTFAc | 0.75 | guanidine nitrate | 0.15 |
| LiTFSI | 0.50 | LiTFAc | 1.00 | guanidine nitrate | 0.15 |
| LiTFSI | 0.66 | LiTFAc | 0.10 | guanidine nitrate | 0.10 |
| LiTFSI | 0.66 | LiTFAc | 0.25 | guanidine nitrate | 0.10 |
| LiTFSI | 0.66 | LiTFAc | 0.33 | guanidine nitrate | 0.10 |
| LiTFSI | 0.66 | LiTFAc | 0.50 | guanidine nitrate | 0.10 |
| LiTFSI | 0.66 | LiTFAc | 0.66 | guanidine nitrate | 0.10 |
| LiTFSI | 0.66 | LiTFAc | 0.75 | guanidine nitrate | 0.10 |
| LiTFSI | 0.66 | LiTFAc | 1.00 | guanidine nitrate | 0.10 |
| LiTFSI | 0.66 | LiTFAc | 0.10 | guanidine nitrate | 0.15 |
| LiTFSI | 0.66 | LiTFAc | 0.25 | guanidine nitrate | 0.15 |
| LiTFSI | 0.66 | LiTFAc | 0.33 | guanidine nitrate | 0.15 |
| LiTFSI | 0.66 | LiTFAc | 0.50 | guanidine nitrate | 0.15 |
| LiTFSI | 0.66 | LiTFAc | 0.66 | guanidine nitrate | 0.15 |
| LiTFSI | 0.66 | LiTFAc | 0.75 | guanidine nitrate | 0.15 |
| LiTFSI | 0.66 | LiTFAc | 1.00 | guanidine nitrate | 0.15 |
| LiTFSI | 0.75 | LiTFAc | 0.10 | guanidine nitrate | 0.10 |
| LiTFSI | 0.75 | LiTFAc | 0.25 | guanidine nitrate | 0.10 |
| LiTFSI | 0.75 | LiTFAc | 0.33 | guanidine nitrate | 0.10 |
| LiTFSI | 0.75 | LiTFAc | 0.50 | guanidine nitrate | 0.10 |
| LiTFSI | 0.75 | LiTFAc | 0.66 | guanidine nitrate | 0.10 |
| LiTFSI | 0.75 | LiTFAc | 0.75 | guanidine nitrate | 0.10 |
| LiTFSI | 0.75 | LiTFAc | 1.00 | guanidine nitrate | 0.10 |
| LiTFSI | 0.75 | LiTFAc | 0.10 | guanidine nitrate | 0.15 |
| LiTFSI | 0.75 | LiTFAc | 0.25 | guanidine nitrate | 0.15 |
| LiTFSI | 0.75 | LiTFAc | 0.33 | guanidine nitrate | 0.15 |
| LiTFSI | 0.75 | LiTFAc | 0.50 | guanidine nitrate | 0.15 |
| LiTFSI | 0.75 | LiTFAc | 0.66 | guanidine nitrate | 0.15 |
| LiTFSI | 0.75 | LiTFAc | 0.75 | guanidine nitrate | 0.15 |
| LiTFSI | 0.75 | LiTFAc | 1.00 | guanidine nitrate | 0.15 |
| LiTFSI | 1.00 | LiTFAc | 0.10 | guanidine nitrate | 0.10 |
| LiTFSI | 1.00 | LiTFAc | 0.25 | guanidine nitrate | 0.10 |
| LiTFSI | 1.00 | LiTFAc | 0.33 | guanidine nitrate | 0.10 |
| LiTFSI | 1.00 | LiTFAc | 0.50 | guanidine nitrate | 0.10 |
| LiTFSI | 1.00 | LiTFAc | 0.66 | guanidine nitrate | 0.10 |
| LiTFSI | 1.00 | LiTFAc | 0.75 | guanidine nitrate | 0.10 |
| LiTFSI | 1.00 | LiTFAc | 1.00 | guanidine nitrate | 0.10 |
| LiTFSI | 1.00 | LiTFAc | 0.10 | guanidine nitrate | 0.15 |
| LiTFSI | 1.00 | LiTFAc | 0.25 | guanidine nitrate | 0.15 |
| LiTFSI | 1.00 | LiTFAc | 0.33 | guanidine nitrate | 0.15 |
| LiTFSI | 1.00 | LiTFAc | 0.50 | guanidine nitrate | 0.15 |
| LiTFSI | 1.00 | LiTFAc | 0.66 | guanidine nitrate | 0.15 |
| LiTFSI | 1.00 | LiTFAc | 0.75 | guanidine nitrate | 0.15 |
| LiTFSI | 1.00 | LiTFAc | 1.00 | guanidine nitrate | 0.15 |
| lithium bis(fluoro-sulfonyl)-imide (LiFSI) | 0.10 | none | 0.00 | cyanamide | 0.10 |
| LiFSI | 0.25 | none | 0.00 | cyanamide | 0.10 |
| LiFSI | 0.40 | none | 0.00 | cyanamide | 0.10 |
| LiFSI | 0.50 | none | 0.00 | cyanamide | 0.10 |
| LiFSI | 0.66 | none | 0.00 | cyanamide | 0.10 |
| LiFSI | 0.75 | none | 0.00 | cyanamide | 0.10 |
| LiFSI | 1.00 | none | 0.00 | cyanamide | 0.10 |
| LiFSI | 0.10 | none | 0.00 | cyanamide | 0.15 |
| LiFSI | 0.25 | none | 0.00 | cyanamide | 0.15 |
| LiFSI | 0.40 | none | 0.00 | cyanamide | 0.15 |
| LiFSI | 0.50 | none | 0.00 | cyanamide | 0.15 |
| LiFSI | 0.66 | none | 0.00 | cyanamide | 0.15 |
| LiFSI | 0.75 | none | 0.00 | cyanamide | 0.15 |
| LiFSI | 1.00 | none | 0.00 | cyanamide | 0.15 |
| LiFSI | 0.10 | lithium nitrate (LiNO$_3$) | 0.10 | cyanamide | 0.10 |
| LiFSI | 0.10 | LiNO$_3$ | 0.25 | cyanamide | 0.10 |
| LiFSI | 0.10 | LiNO$_3$ | 0.33 | cyanamide | 0.10 |
| LiFSI | 0.10 | LiNO$_3$ | 0.50 | cyanamide | 0.10 |
| LiFSI | 0.10 | LiNO$_3$ | 0.66 | cyanamide | 0.10 |
| LiFSI | 0.10 | LiNO$_3$ | 0.75 | cyanamide | 0.10 |
| LiFSI | 0.10 | LiNO$_3$ | 1.00 | cyanamide | 0.10 |
| LiFSI | 0.10 | LiNO$_3$ | 0.10 | cyanamide | 0.15 |
| LiFSI | 0.10 | LiNO$_3$ | 0.25 | cyanamide | 0.15 |
| LiFSI | 0.10 | LiNO$_3$ | 0.33 | cyanamide | 0.15 |
| LiFSI | 0.10 | LiNO$_3$ | 0.50 | cyanamide | 0.15 |
| LiFSI | 0.10 | LiNO$_3$ | 0.66 | cyanamide | 0.15 |
| LiFSI | 0.10 | LiNO$_3$ | 0.75 | cyanamide | 0.15 |
| LiFSI | 0.10 | LiNO$_3$ | 1.00 | cyanamide | 0.15 |
| LiFSI | 0.25 | LiNO$_3$ | 0.10 | cyanamide | 0.10 |
| LiFSI | 0.25 | LiNO$_3$ | 0.25 | cyanamide | 0.10 |
| LiFSI | 0.25 | LiNO$_3$ | 0.33 | cyanamide | 0.10 |
| LiFSI | 0.25 | LiNO$_3$ | 0.50 | cyanamide | 0.10 |
| LiFSI | 0.25 | LiNO$_3$ | 0.66 | cyanamide | 0.10 |
| LiFSI | 0.25 | LiNO$_3$ | 0.75 | cyanamide | 0.10 |
| LiFSI | 0.25 | LiNO$_3$ | 1.00 | cyanamide | 0.10 |
| LiFSI | 0.25 | LiNO$_3$ | 0.10 | cyanamide | 0.15 |
| LiFSI | 0.25 | LiNO$_3$ | 0.25 | cyanamide | 0.15 |
| LiFSI | 0.25 | LiNO$_3$ | 0.33 | cyanamide | 0.15 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiFSI | 0.25 | LiNO$_3$ | 0.50 | cyanamide | 0.15 |
| LiFSI | 0.25 | LiNO$_3$ | 0.66 | cyanamide | 0.15 |
| LiFSI | 0.25 | LiNO$_3$ | 0.75 | cyanamide | 0.15 |
| LiFSI | 0.25 | LiNO$_3$ | 1.00 | cyanamide | 0.15 |
| LiFSI | 0.40 | LiNO$_3$ | 0.10 | cyanamide | 0.10 |
| LiFSI | 0.40 | LiNO$_3$ | 0.25 | cyanamide | 0.10 |
| LiFSI | 0.40 | LiNO$_3$ | 0.33 | cyanamide | 0.10 |
| LiFSI | 0.40 | LiNO$_3$ | 0.50 | cyanamide | 0.10 |
| LiFSI | 0.40 | LiNO$_3$ | 0.66 | cyanamide | 0.10 |
| LiFSI | 0.40 | LiNO$_3$ | 0.75 | cyanamide | 0.10 |
| LiFSI | 0.40 | LiNO$_3$ | 1.00 | cyanamide | 0.10 |
| LiFSI | 0.40 | LiNO$_3$ | 0.10 | cyanamide | 0.15 |
| LiFSI | 0.40 | LiNO$_3$ | 0.25 | cyanamide | 0.15 |
| LiFSI | 0.40 | LiNO$_3$ | 0.33 | cyanamide | 0.15 |
| LiFSI | 0.40 | LiNO$_3$ | 0.50 | cyanamide | 0.15 |
| LiFSI | 0.40 | LiNO$_3$ | 0.66 | cyanamide | 0.15 |
| LiFSI | 0.40 | LiNO$_3$ | 0.75 | cyanamide | 0.15 |
| LiFSI | 0.40 | LiNO$_3$ | 1.00 | cyanamide | 0.15 |
| LiFSI | 0.50 | LiNO$_3$ | 0.10 | cyanamide | 0.10 |
| LiFSI | 0.50 | LiNO$_3$ | 0.25 | cyanamide | 0.10 |
| LiFSI | 0.50 | LiNO$_3$ | 0.33 | cyanamide | 0.10 |
| LiFSI | 0.50 | LiNO$_3$ | 0.50 | cyanamide | 0.10 |
| LiFSI | 0.50 | LiNO$_3$ | 0.66 | cyanamide | 0.10 |
| LiFSI | 0.50 | LiNO$_3$ | 0.75 | cyanamide | 0.10 |
| LiFSI | 0.50 | LiNO$_3$ | 1.00 | cyanamide | 0.10 |
| LiFSI | 0.50 | LiNO$_3$ | 0.10 | cyanamide | 0.15 |
| LiFSI | 0.50 | LiNO$_3$ | 0.25 | cyanamide | 0.15 |
| LiFSI | 0.50 | LiNO$_3$ | 0.33 | cyanamide | 0.15 |
| LiFSI | 0.50 | LiNO$_3$ | 0.50 | cyanamide | 0.15 |
| LiFSI | 0.50 | LiNO$_3$ | 0.66 | cyanamide | 0.15 |
| LiFSI | 0.50 | LiNO$_3$ | 0.75 | cyanamide | 0.15 |
| LiFSI | 0.50 | LiNO$_3$ | 1.00 | cyanamide | 0.15 |
| LiFSI | 0.66 | LiNO$_3$ | 0.10 | cyanamide | 0.10 |
| LiFSI | 0.66 | LiNO$_3$ | 0.25 | cyanamide | 0.10 |
| LiFSI | 0.66 | LiNO$_3$ | 0.33 | cyanamide | 0.10 |
| LiFSI | 0.66 | LiNO$_3$ | 0.50 | cyanamide | 0.10 |
| LiFSI | 0.66 | LiNO$_3$ | 0.66 | cyanamide | 0.10 |
| LiFSI | 0.66 | LiNO$_3$ | 0.75 | cyanamide | 0.10 |
| LiFSI | 0.66 | LiNO$_3$ | 1.00 | cyanamide | 0.10 |
| LiFSI | 0.66 | LiNO$_3$ | 0.10 | cyanamide | 0.15 |
| LiFSI | 0.66 | LiNO$_3$ | 0.25 | cyanamide | 0.15 |
| LiFSI | 0.66 | LiNO$_3$ | 0.33 | cyanamide | 0.15 |
| LiFSI | 0.66 | LiNO$_3$ | 0.50 | cyanamide | 0.15 |
| LiFSI | 0.66 | LiNO$_3$ | 0.66 | cyanamide | 0.15 |
| LiFSI | 0.66 | LiNO$_3$ | 0.75 | cyanamide | 0.15 |
| LiFSI | 0.66 | LiNO$_3$ | 1.00 | cyanamide | 0.15 |
| LiFSI | 0.75 | LiNO$_3$ | 0.10 | cyanamide | 0.10 |
| LiFSI | 0.75 | LiNO$_3$ | 0.25 | cyanamide | 0.10 |
| LiFSI | 0.75 | LiNO$_3$ | 0.33 | cyanamide | 0.10 |
| LiFSI | 0.75 | LiNO$_3$ | 0.50 | cyanamide | 0.10 |
| LiFSI | 0.75 | LiNO$_3$ | 0.66 | cyanamide | 0.10 |
| LiFSI | 0.75 | LiNO$_3$ | 0.75 | cyanamide | 0.10 |
| LiFSI | 0.75 | LiNO$_3$ | 1.00 | cyanamide | 0.10 |
| LiFSI | 0.75 | LiNO$_3$ | 0.10 | cyanamide | 0.15 |
| LiFSI | 0.75 | LiNO$_3$ | 0.25 | cyanamide | 0.15 |
| LiFSI | 0.75 | LiNO$_3$ | 0.33 | cyanamide | 0.15 |
| LiFSI | 0.75 | LiNO$_3$ | 0.50 | cyanamide | 0.15 |
| LiFSI | 0.75 | LiNO$_3$ | 0.66 | cyanamide | 0.15 |
| LiFSI | 0.75 | LiNO$_3$ | 0.75 | cyanamide | 0.15 |
| LiFSI | 0.75 | LiNO$_3$ | 1.00 | cyanamide | 0.15 |
| LiFSI | 1.00 | LiNO$_3$ | 0.10 | cyanamide | 0.10 |
| LiFSI | 1.00 | LiNO$_3$ | 0.25 | cyanamide | 0.10 |
| LiFSI | 1.00 | LiNO$_3$ | 0.33 | cyanamide | 0.10 |
| LiFSI | 1.00 | LiNO$_3$ | 0.50 | cyanamide | 0.10 |
| LiFSI | 1.00 | LiNO$_3$ | 0.66 | cyanamide | 0.10 |
| LiFSI | 1.00 | LiNO$_3$ | 0.75 | cyanamide | 0.10 |
| LiFSI | 1.00 | LiNO$_3$ | 1.00 | cyanamide | 0.10 |
| LiFSI | 1.00 | LiNO$_3$ | 0.10 | cyanamide | 0.15 |
| LiFSI | 1.00 | LiNO$_3$ | 0.25 | cyanamide | 0.15 |
| LiFSI | 1.00 | LiNO$_3$ | 0.33 | cyanamide | 0.15 |
| LiFSI | 1.00 | LiNO$_3$ | 0.50 | cyanamide | 0.15 |
| LiFSI | 1.00 | LiNO$_3$ | 0.66 | cyanamide | 0.15 |
| LiFSI | 1.00 | LiNO$_3$ | 0.75 | cyanamide | 0.15 |
| LiFSI | 1.00 | LiNO$_3$ | 1.00 | cyanamide | 0.15 |
| LiFSI | 0.10 | LiClO$_4$ | 0.10 | cyanamide | 0.10 |
| LiFSI | 0.10 | LiClO$_4$ | 0.25 | cyanamide | 0.10 |
| LiFSI | 0.10 | LiClO$_4$ | 0.33 | cyanamide | 0.10 |
| LiFSI | 0.10 | LiClO$_4$ | 0.50 | cyanamide | 0.10 |
| LiFSI | 0.10 | LiClO$_4$ | 0.66 | cyanamide | 0.10 |
| LiFSI | 0.10 | LiClO$_4$ | 0.75 | cyanamide | 0.10 |
| LiFSI | 0.10 | LiClO$_4$ | 1.00 | cyanamide | 0.10 |
| LiFSI | 0.10 | LiClO$_4$ | 0.10 | cyanamide | 0.15 |
| LiFSI | 0.10 | LiClO$_4$ | 0.25 | cyanamide | 0.15 |
| LiFSI | 0.10 | LiClO$_4$ | 0.33 | cyanamide | 0.15 |
| LiFSI | 0.10 | LiClO$_4$ | 0.50 | cyanamide | 0.15 |
| LiFSI | 0.10 | LiClO$_4$ | 0.66 | cyanamide | 0.15 |
| LiFSI | 0.10 | LiClO$_4$ | 0.75 | cyanamide | 0.15 |
| LiFSI | 0.10 | LiClO$_4$ | 1.00 | cyanamide | 0.15 |
| LiFSI | 0.25 | LiClO$_4$ | 0.10 | cyanamide | 0.10 |
| LiFSI | 0.25 | LiClO$_4$ | 0.25 | cyanamide | 0.10 |
| LiFSI | 0.25 | LiClO$_4$ | 0.33 | cyanamide | 0.10 |
| LiFSI | 0.25 | LiClO$_4$ | 0.50 | cyanamide | 0.10 |
| LiFSI | 0.25 | LiClO$_4$ | 0.66 | cyanamide | 0.10 |
| LiFSI | 0.25 | LiClO$_4$ | 0.75 | cyanamide | 0.10 |
| LiFSI | 0.25 | LiClO$_4$ | 1.00 | cyanamide | 0.10 |
| LiFSI | 0.25 | LiClO$_4$ | 0.10 | cyanamide | 0.15 |
| LiFSI | 0.25 | LiClO$_4$ | 0.25 | cyanamide | 0.15 |
| LiFSI | 0.25 | LiClO$_4$ | 0.33 | cyanamide | 0.15 |
| LiFSI | 0.25 | LiClO$_4$ | 0.50 | cyanamide | 0.15 |
| LiFSI | 0.25 | LiClO$_4$ | 0.66 | cyanamide | 0.15 |
| LiFSI | 0.25 | LiClO$_4$ | 0.75 | cyanamide | 0.15 |
| LiFSI | 0.25 | LiClO$_4$ | 1.00 | cyanamide | 0.15 |
| LiFSI | 0.40 | LiClO$_4$ | 0.10 | cyanamide | 0.10 |
| LiFSI | 0.40 | LiClO$_4$ | 0.25 | cyanamide | 0.10 |
| LiFSI | 0.40 | LiClO$_4$ | 0.33 | cyanamide | 0.10 |
| LiFSI | 0.40 | LiClO$_4$ | 0.50 | cyanamide | 0.10 |
| LiFSI | 0.40 | LiClO$_4$ | 0.66 | cyanamide | 0.10 |
| LiFSI | 0.40 | LiClO$_4$ | 0.75 | cyanamide | 0.10 |
| LiFSI | 0.40 | LiClO$_4$ | 1.00 | cyanamide | 0.10 |
| LiFSI | 0.40 | LiClO$_4$ | 0.10 | cyanamide | 0.15 |
| LiFSI | 0.40 | LiClO$_4$ | 0.25 | cyanamide | 0.15 |
| LiFSI | 0.40 | LiClO$_4$ | 0.33 | cyanamide | 0.15 |
| LiFSI | 0.40 | LiClO$_4$ | 0.50 | cyanamide | 0.15 |
| LiFSI | 0.40 | LiClO$_4$ | 0.66 | cyanamide | 0.15 |
| LiFSI | 0.40 | LiClO$_4$ | 0.75 | cyanamide | 0.15 |
| LiFSI | 0.40 | LiClO$_4$ | 1.00 | cyanamide | 0.15 |
| LiFSI | 0.50 | LiClO$_4$ | 0.10 | cyanamide | 0.10 |
| LiFSI | 0.50 | LiClO$_4$ | 0.25 | cyanamide | 0.10 |
| LiFSI | 0.50 | LiClO$_4$ | 0.33 | cyanamide | 0.10 |
| LiFSI | 0.50 | LiClO$_4$ | 0.50 | cyanamide | 0.10 |
| LiFSI | 0.50 | LiClO$_4$ | 0.66 | cyanamide | 0.10 |
| LiFSI | 0.50 | LiClO$_4$ | 0.75 | cyanamide | 0.10 |
| LiFSI | 0.50 | LiClO$_4$ | 1.00 | cyanamide | 0.10 |
| LiFSI | 0.50 | LiClO$_4$ | 0.10 | cyanamide | 0.15 |
| LiFSI | 0.50 | LiClO$_4$ | 0.25 | cyanamide | 0.15 |
| LiFSI | 0.50 | LiClO$_4$ | 0.33 | cyanamide | 0.15 |
| LiFSI | 0.50 | LiClO$_4$ | 0.50 | cyanamide | 0.15 |
| LiFSI | 0.50 | LiClO$_4$ | 0.66 | cyanamide | 0.15 |
| LiFSI | 0.50 | LiClO$_4$ | 0.75 | cyanamide | 0.15 |
| LiFSI | 0.50 | LiClO$_4$ | 1.00 | cyanamide | 0.15 |
| LiFSI | 0.66 | LiClO$_4$ | 0.10 | cyanamide | 0.10 |
| LiFSI | 0.66 | LiClO$_4$ | 0.25 | cyanamide | 0.10 |
| LiFSI | 0.66 | LiClO$_4$ | 0.33 | cyanamide | 0.10 |
| LiFSI | 0.66 | LiClO$_4$ | 0.50 | cyanamide | 0.10 |
| LiFSI | 0.66 | LiClO$_4$ | 0.66 | cyanamide | 0.10 |
| LiFSI | 0.66 | LiClO$_4$ | 0.75 | cyanamide | 0.10 |
| LiFSI | 0.66 | LiClO$_4$ | 1.00 | cyanamide | 0.10 |
| LiFSI | 0.66 | LiClO$_4$ | 0.10 | cyanamide | 0.15 |
| LiFSI | 0.66 | LiClO$_4$ | 0.25 | cyanamide | 0.15 |
| LiFSI | 0.66 | LiClO$_4$ | 0.33 | cyanamide | 0.15 |
| LiFSI | 0.66 | LiClO$_4$ | 0.50 | cyanamide | 0.15 |
| LiFSI | 0.66 | LiClO$_4$ | 0.66 | cyanamide | 0.15 |
| LiFSI | 0.66 | LiClO$_4$ | 0.75 | cyanamide | 0.15 |
| LiFSI | 0.66 | LiClO$_4$ | 1.00 | cyanamide | 0.15 |
| LiFSI | 0.75 | LiClO$_4$ | 0.10 | cyanamide | 0.10 |
| LiFSI | 0.75 | LiClO$_4$ | 0.25 | cyanamide | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiFSI | 0.75 | LiClO$_4$ | 0.33 | cyanamide | 0.10 |
| LiFSI | 0.75 | LiClO$_4$ | 0.50 | cyanamide | 0.10 |
| LiFSI | 0.75 | LiClO$_4$ | 0.66 | cyanamide | 0.10 |
| LiFSI | 0.75 | LiClO$_4$ | 0.75 | cyanamide | 0.10 |
| LiFSI | 0.75 | LiClO$_4$ | 1.00 | cyanamide | 0.10 |
| LiFSI | 0.75 | LiClO$_4$ | 0.10 | cyanamide | 0.15 |
| LiFSI | 0.75 | LiClO$_4$ | 0.25 | cyanamide | 0.15 |
| LiFSI | 0.75 | LiClO$_4$ | 0.33 | cyanamide | 0.15 |
| LiFSI | 0.75 | LiClO$_4$ | 0.50 | cyanamide | 0.15 |
| LiFSI | 0.75 | LiClO$_4$ | 0.66 | cyanamide | 0.15 |
| LiFSI | 0.75 | LiClO$_4$ | 0.75 | cyanamide | 0.15 |
| LiFSI | 0.75 | LiClO$_4$ | 1.00 | cyanamide | 0.15 |
| LiFSI | 1.00 | LiClO$_4$ | 0.10 | cyanamide | 0.10 |
| LiFSI | 1.00 | LiClO$_4$ | 0.25 | cyanamide | 0.10 |
| LiFSI | 1.00 | LiClO$_4$ | 0.33 | cyanamide | 0.10 |
| LiFSI | 1.00 | LiClO$_4$ | 0.50 | cyanamide | 0.10 |
| LiFSI | 1.00 | LiClO$_4$ | 0.66 | cyanamide | 0.10 |
| LiFSI | 1.00 | LiClO$_4$ | 0.75 | cyanamide | 0.10 |
| LiFSI | 1.00 | LiClO$_4$ | 1.00 | cyanamide | 0.10 |
| LiFSI | 1.00 | LiClO$_4$ | 0.10 | cyanamide | 0.15 |
| LiFSI | 1.00 | LiClO$_4$ | 0.25 | cyanamide | 0.15 |
| LiFSI | 1.00 | LiClO$_4$ | 0.33 | cyanamide | 0.15 |
| LiFSI | 1.00 | LiClO$_4$ | 0.50 | cyanamide | 0.15 |
| LiFSI | 1.00 | LiClO$_4$ | 0.66 | cyanamide | 0.15 |
| LiFSI | 1.00 | LiClO$_4$ | 0.75 | cyanamide | 0.15 |
| LiFSI | 1.00 | LiClO$_4$ | 1.00 | cyanamide | 0.15 |
| LiFSI | 0.10 | Lithium trifluoroacetate (LiTFAc) | 0.10 | lithium dicyanamide | 0.10 |
| LiFSI | 0.10 | LiTFAc | 0.25 | lithium dicyanamide | 0.10 |
| LiFSI | 0.10 | LiTFAc | 0.33 | lithium dicyanamide | 0.10 |
| LiFSI | 0.10 | LiTFAc | 0.50 | lithium dicyanamide | 0.10 |
| LiFSI | 0.10 | LiTFAc | 0.66 | lithium dicyanamide | 0.10 |
| LiFSI | 0.10 | LiTFAc | 0.75 | lithium dicyanamide | 0.10 |
| LiFSI | 0.10 | LiTFAc | 1.00 | lithium dicyanamide | 0.10 |
| LiFSI | 0.10 | LiTFAc | 0.10 | lithium dicyanamide | 0.15 |
| LiFSI | 0.10 | LiTFAc | 0.25 | lithium dicyanamide | 0.15 |
| LiFSI | 0.10 | LiTFAc | 0.33 | lithium dicyanamide | 0.15 |
| LiFSI | 0.10 | LiTFAc | 0.50 | lithium dicyanamide | 0.15 |
| LiFSI | 0.10 | LiTFAc | 0.66 | lithium dicyanamide | 0.15 |
| LiFSI | 0.10 | LiTFAc | 0.75 | lithium dicyanamide | 0.15 |
| LiFSI | 0.10 | LiTFAc | 1.00 | lithium dicyanamide | 0.15 |
| LiFSI | 0.25 | LiTFAc | 0.10 | lithium dicyanamide | 0.10 |
| LiFSI | 0.25 | LiTFAc | 0.25 | lithium dicyanamide | 0.10 |
| LiFSI | 0.25 | LiTFAc | 0.33 | lithium dicyanamide | 0.10 |
| LiFSI | 0.25 | LiTFAc | 0.50 | lithium dicyanamide | 0.10 |
| LiFSI | 0.25 | LiTFAc | 0.66 | lithium dicyanamide | 0.10 |
| LiFSI | 0.25 | LiTFAc | 0.75 | lithium dicyanamide | 0.10 |
| LiFSI | 0.25 | LiTFAc | 1.00 | lithium dicyanamide | 0.10 |
| LiFSI | 0.25 | LiTFAc | 0.10 | lithium dicyanamide | 0.15 |
| LiFSI | 0.25 | LiTFAc | 0.25 | lithium dicyanamide | 0.15 |
| LiFSI | 0.25 | LiTFAc | 0.33 | lithium dicyanamide | 0.15 |
| LiFSI | 0.25 | LiTFAc | 0.50 | lithium dicyanamide | 0.15 |
| LiFSI | 0.25 | LiTFAc | 0.66 | lithium dicyanamide | 0.15 |
| LiFSI | 0.25 | LiTFAc | 0.75 | lithium dicyanamide | 0.15 |
| LiFSI | 0.25 | LiTFAc | 1.00 | lithium dicyanamide | 0.15 |
| LiFSI | 0.40 | LiTFAc | 0.10 | lithium dicyanamide | 0.10 |
| LiFSI | 0.40 | LiTFAc | 0.25 | lithium dicyanamide | 0.10 |
| LiFSI | 0.40 | LiTFAc | 0.33 | lithium dicyanamide | 0.10 |
| LiFSI | 0.40 | LiTFAc | 0.50 | lithium dicyanamide | 0.10 |
| LiFSI | 0.40 | LiTFAc | 0.66 | lithium dicyanamide | 0.10 |
| LiFSI | 0.40 | LiTFAc | 0.75 | lithium dicyanamide | 0.10 |
| LiFSI | 0.40 | LiTFAc | 1.00 | lithium dicyanamide | 0.10 |
| LiFSI | 0.40 | LiTFAc | 0.10 | lithium dicyanamide | 0.15 |
| LiFSI | 0.40 | LiTFAc | 0.25 | lithium dicyanamide | 0.15 |
| LiFSI | 0.40 | LiTFAc | 0.33 | lithium dicyanamide | 0.15 |
| LiFSI | 0.40 | LiTFAc | 0.50 | lithium dicyanamide | 0.15 |
| LiFSI | 0.40 | LiTFAc | 0.66 | lithium dicyanamide | 0.15 |
| LiFSI | 0.40 | LiTFAc | 0.75 | lithium dicyanamide | 0.15 |
| LiFSI | 0.40 | LiTFAc | 1.00 | lithium dicyanamide | 0.15 |
| LiFSI | 0.50 | LiTFAc | 0.10 | lithium dicyanamide | 0.10 |
| LiFSI | 0.50 | LiTFAc | 0.25 | lithium dicyanamide | 0.10 |
| LiFSI | 0.50 | LiTFAc | 0.33 | lithium dicyanamide | 0.10 |
| LiFSI | 0.50 | LiTFAc | 0.50 | lithium dicyanamide | 0.10 |
| LiFSI | 0.50 | LiTFAc | 0.66 | lithium dicyanamide | 0.10 |
| LiFSI | 0.50 | LiTFAc | 0.75 | lithium dicyanamide | 0.10 |
| LiFSI | 0.50 | LiTFAc | 1.00 | lithium dicyanamide | 0.10 |
| LiFSI | 0.50 | LiTFAc | 0.10 | lithium dicyanamide | 0.15 |
| LiFSI | 0.50 | LiTFAc | 0.25 | lithium dicyanamide | 0.15 |
| LiFSI | 0.50 | LiTFAc | 0.33 | lithium dicyanamide | 0.15 |
| LiFSI | 0.50 | LiTFAc | 0.50 | lithium dicyanamide | 0.15 |
| LiFSI | 0.50 | LiTFAc | 0.66 | lithium dicyanamide | 0.15 |
| LiFSI | 0.50 | LiTFAc | 0.75 | lithium dicyanamide | 0.15 |
| LiFSI | 0.50 | LiTFAc | 1.00 | lithium dicyanamide | 0.15 |
| LiFSI | 0.66 | LiTFAc | 0.10 | lithium dicyanamide | 0.10 |
| LiFSI | 0.66 | LiTFAc | 0.25 | lithium dicyanamide | 0.10 |
| LiFSI | 0.66 | LiTFAc | 0.33 | lithium dicyanamide | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiFSI | 0.66 | LiTFAc | 0.50 | lithium dicyanamide | 0.10 |
| LiFSI | 0.66 | LiTFAc | 0.66 | lithium dicyanamide | 0.10 |
| LiFSI | 0.66 | LiTFAc | 0.75 | lithium dicyanamide | 0.10 |
| LiFSI | 0.66 | LiTFAc | 1.00 | lithium dicyanamide | 0.10 |
| LiFSI | 0.66 | LiTFAc | 0.10 | lithium dicyanamide | 0.15 |
| LiFSI | 0.66 | LiTFAc | 0.25 | lithium dicyanamide | 0.15 |
| LiFSI | 0.66 | LiTFAc | 0.33 | lithium dicyanamide | 0.15 |
| LiFSI | 0.66 | LiTFAc | 0.50 | lithium dicyanamide | 0.15 |
| LiFSI | 0.66 | LiTFAc | 0.66 | lithium dicyanamide | 0.15 |
| LiFSI | 0.66 | LiTFAc | 0.75 | lithium dicyanamide | 0.15 |
| LiFSI | 0.66 | LiTFAc | 1.00 | lithium dicyanamide | 0.15 |
| LiFSI | 0.75 | LiTFAc | 0.10 | lithium dicyanamide | 0.10 |
| LiFSI | 0.75 | LiTFAc | 0.25 | lithium dicyanamide | 0.10 |
| LiFSI | 0.75 | LiTFAc | 0.33 | lithium dicyanamide | 0.10 |
| LiFSI | 0.75 | LiTFAc | 0.50 | lithium dicyanamide | 0.10 |
| LiFSI | 0.75 | LiTFAc | 0.66 | lithium dicyanamide | 0.10 |
| LiFSI | 0.75 | LiTFAc | 0.75 | lithium dicyanamide | 0.10 |
| LiFSI | 0.75 | LiTFAc | 1.00 | lithium dicyanamide | 0.10 |
| LiFSI | 0.75 | LiTFAc | 0.10 | lithium dicyanamide | 0.15 |
| LiFSI | 0.75 | LiTFAc | 0.25 | lithium dicyanamide | 0.15 |
| LiFSI | 0.75 | LiTFAc | 0.33 | lithium dicyanamide | 0.15 |
| LiFSI | 0.75 | LiTFAc | 0.50 | lithium dicyanamide | 0.15 |
| LiFSI | 0.75 | LiTFAc | 0.66 | lithium dicyanamide | 0.15 |
| LiFSI | 0.75 | LiTFAc | 0.75 | lithium dicyanamide | 0.15 |
| LiFSI | 0.75 | LiTFAc | 1.00 | lithium dicyanamide | 0.15 |
| LiFSI | 1.00 | LiTFAc | 0.10 | lithium dicyanamide | 0.10 |
| LiFSI | 1.00 | LiTFAc | 0.25 | lithium dicyanamide | 0.10 |
| LiFSI | 1.00 | LiTFAc | 0.33 | lithium dicyanamide | 0.10 |
| LiFSI | 1.00 | LiTFAc | 0.50 | lithium dicyanamide | 0.10 |
| LiFSI | 1.00 | LiTFAc | 0.66 | lithium dicyanamide | 0.10 |
| LiFSI | 1.00 | LiTFAc | 0.75 | lithium dicyanamide | 0.10 |
| LiFSI | 1.00 | LiTFAc | 1.00 | lithium dicyanamide | 0.10 |
| LiFSI | 1.00 | LiTFAc | 0.10 | lithium dicyanamide | 0.15 |
| LiFSI | 1.00 | LiTFAc | 0.25 | lithium dicyanamide | 0.15 |
| LiFSI | 1.00 | LiTFAc | 0.33 | lithium dicyanamide | 0.15 |
| LiFSI | 1.00 | LiTFAc | 0.50 | lithium dicyanamide | 0.15 |
| LiFSI | 1.00 | LiTFAc | 0.66 | lithium dicyanamide | 0.15 |
| LiFSI | 1.00 | LiTFAc | 0.75 | lithium dicyanamide | 0.15 |
| LiFSI | 1.00 | LiTFAc | 1.00 | lithium dicyanamide | 0.15 |
| LiTFAc | 0.10 | none | 0.00 | lithium dicyanamide | 0.10 |
| LiTFAc | 0.25 | none | 0.00 | lithium dicyanamide | 0.10 |
| LiTFAc | 0.40 | none | 0.00 | lithium dicyanamide | 0.10 |
| LiTFAc | 0.50 | none | 0.00 | lithium dicyanamide | 0.10 |
| LiTFAc | 0.66 | none | 0.00 | lithium dicyanamide | 0.10 |
| LiTFAc | 0.75 | none | 0.00 | lithium dicyanamide | 0.10 |
| LiTFAc | 1.00 | none | 0.00 | lithium dicyanamide | 0.10 |
| LiTFAc | 0.10 | none | 0.00 | lithium dicyanamide | 0.15 |
| LiTFAc | 0.25 | none | 0.00 | lithium dicyanamide | 0.15 |
| LiTFAc | 0.40 | none | 0.00 | lithium dicyanamide | 0.15 |
| LiTFAc | 0.50 | none | 0.00 | lithium dicyanamide | 0.15 |
| LiTFAc | 0.66 | none | 0.00 | lithium dicyanamide | 0.15 |
| LiTFAc | 0.75 | none | 0.00 | lithium dicyanamide | 0.15 |
| LiTFAc | 1.00 | none | 0.00 | lithium dicyanamide | 0.15 |
| LiTFAc | 0.10 | Lithium nitrate (LiNO$_3$) | 0.10 | lithium dicyanamide | 0.10 |
| LiTFAc | 0.10 | LiNO$_3$ | 0.25 | lithium dicyanamide | 0.10 |
| LiTFAc | 0.10 | LiNO$_3$ | 0.33 | lithium dicyanamide | 0.10 |
| LiTFAc | 0.10 | LiNO$_3$ | 0.50 | lithium dicyanamide | 0.10 |
| LiTFAc | 0.10 | LiNO$_3$ | 0.66 | lithium dicyanamide | 0.10 |
| LiTFAc | 0.10 | LiNO$_3$ | 0.75 | lithium dicyanamide | 0.10 |
| LiTFAc | 0.10 | LiNO$_3$ | 1.00 | lithium dicyanamide | 0.10 |
| LiTFAc | 0.10 | LiNO$_3$ | 0.10 | lithium dicyanamide | 0.15 |
| LiTFAc | 0.10 | LiNO$_3$ | 0.25 | lithium dicyanamide | 0.15 |
| LiTFAc | 0.10 | LiNO$_3$ | 0.33 | lithium dicyanamide | 0.15 |
| LiTFAc | 0.10 | LiNO$_3$ | 0.50 | lithium dicyanamide | 0.15 |
| LiTFAc | 0.10 | LiNO$_3$ | 0.66 | lithium dicyanamide | 0.15 |
| LiTFAc | 0.10 | LiNO$_3$ | 0.75 | lithium dicyanamide | 0.15 |
| LiTFAc | 0.10 | LiNO$_3$ | 1.00 | lithium dicyanamide | 0.15 |
| LiTFAc | 0.25 | LiNO$_3$ | 0.10 | lithium dicyanamide | 0.10 |
| LiTFAc | 0.25 | LiNO$_3$ | 0.25 | lithium dicyanamide | 0.10 |
| LiTFAc | 0.25 | LiNO$_3$ | 0.33 | lithium dicyanamide | 0.10 |
| LiTFAc | 0.25 | LiNO$_3$ | 0.50 | lithium dicyanamide | 0.10 |
| LiTFAc | 0.25 | LiNO$_3$ | 0.66 | lithium dicyanamide | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFAc | 0.25 | LiNO$_3$ | 0.75 | lithium dicyanamide | 0.10 |
| LiTFAc | 0.25 | LiNO$_3$ | 1.00 | lithium dicyanamide | 0.10 |
| LiTFAc | 0.25 | LiNO$_3$ | 0.10 | lithium dicyanamide | 0.15 |
| LiTFAc | 0.25 | LiNO$_3$ | 0.25 | lithium dicyanamide | 0.15 |
| LiTFAc | 0.25 | LiNO$_3$ | 0.33 | lithium dicyanamide | 0.15 |
| LiTFAc | 0.25 | LiNO$_3$ | 0.50 | lithium dicyanamide | 0.15 |
| LiTFAc | 0.25 | LiNO$_3$ | 0.66 | lithium dicyanamide | 0.15 |
| LiTFAc | 0.25 | LiNO$_3$ | 0.75 | lithium dicyanamide | 0.15 |
| LiTFAc | 0.25 | LiNO$_3$ | 1.00 | lithium dicyanamide | 0.15 |
| LiTFAc | 0.40 | LiNO$_3$ | 0.10 | lithium dicyanamide | 0.10 |
| LiTFAc | 0.40 | LiNO$_3$ | 0.25 | lithium dicyanamide | 0.10 |
| LiTFAc | 0.40 | LiNO$_3$ | 0.33 | lithium dicyanamide | 0.10 |
| LiTFAc | 0.40 | LiNO$_3$ | 0.50 | lithium dicyanamide | 0.10 |
| LiTFAc | 0.40 | LiNO$_3$ | 0.66 | lithium dicyanamide | 0.10 |
| LiTFAc | 0.40 | LiNO$_3$ | 0.75 | lithium dicyanamide | 0.10 |
| LiTFAc | 0.40 | LiNO$_3$ | 1.00 | lithium dicyanamide | 0.10 |
| LiTFAc | 0.40 | LiNO$_3$ | 0.10 | lithium dicyanamide | 0.15 |
| LiTFAc | 0.40 | LiNO$_3$ | 0.25 | lithium dicyanamide | 0.15 |
| LiTFAc | 0.40 | LiNO$_3$ | 0.33 | lithium dicyanamide | 0.15 |
| LiTFAc | 0.40 | LiNO$_3$ | 0.50 | lithium dicyanamide | 0.15 |
| LiTFAc | 0.40 | LiNO$_3$ | 0.66 | lithium dicyanamide | 0.15 |
| LiTFAc | 0.40 | LiNO$_3$ | 0.75 | lithium dicyanamide | 0.15 |
| LiTFAc | 0.40 | LiNO$_3$ | 1.00 | lithium dicyanamide | 0.15 |
| LiTFAc | 0.50 | LiNO$_3$ | 0.10 | lithium dicyanamide | 0.10 |
| LiTFAc | 0.50 | LiNO$_3$ | 0.25 | lithium dicyanamide | 0.10 |
| LiTFAc | 0.50 | LiNO$_3$ | 0.33 | lithium dicyanamide | 0.10 |
| LiTFAc | 0.50 | LiNO$_3$ | 0.50 | lithium dicyanamide | 0.10 |
| LiTFAc | 0.50 | LiNO$_3$ | 0.66 | lithium dicyanamide | 0.10 |
| LiTFAc | 0.50 | LiNO$_3$ | 0.75 | lithium dicyanamide | 0.10 |
| LiTFAc | 0.50 | LiNO$_3$ | 1.00 | lithium dicyanamide | 0.10 |
| LiTFAc | 0.50 | LiNO$_3$ | 0.10 | lithium dicyanamide | 0.15 |
| LiTFAc | 0.50 | LiNO$_3$ | 0.25 | lithium dicyanamide | 0.15 |
| LiTFAc | 0.50 | LiNO$_3$ | 0.33 | lithium dicyanamide | 0.15 |
| LiTFAc | 0.50 | LiNO$_3$ | 0.50 | lithium dicyanamide | 0.15 |
| LiTFAc | 0.50 | LiNO$_3$ | 0.66 | lithium dicyanamide | 0.15 |
| LiTFAc | 0.50 | LiNO$_3$ | 0.75 | lithium dicyanamide | 0.15 |
| LiTFAc | 0.50 | LiNO$_3$ | 1.00 | lithium dicyanamide | 0.15 |
| LiTFAc | 0.66 | LiNO$_3$ | 0.10 | lithium dicyanamide | 0.10 |
| LiTFAc | 0.66 | LiNO$_3$ | 0.25 | lithium dicyanamide | 0.10 |
| LiTFAc | 0.66 | LiNO$_3$ | 0.33 | lithium dicyanamide | 0.10 |
| LiTFAc | 0.66 | LiNO$_3$ | 0.50 | lithium dicyanamide | 0.10 |
| LiTFAc | 0.66 | LiNO$_3$ | 0.66 | lithium dicyanamide | 0.10 |
| LiTFAc | 0.66 | LiNO$_3$ | 0.75 | lithium dicyanamide | 0.10 |
| LiTFAc | 0.66 | LiNO$_3$ | 1.00 | lithium dicyanamide | 0.10 |
| LiTFAc | 0.66 | LiNO$_3$ | 0.10 | lithium dicyanamide | 0.15 |
| LiTFAc | 0.66 | LiNO$_3$ | 0.25 | lithium dicyanamide | 0.15 |
| LiTFAc | 0.66 | LiNO$_3$ | 0.33 | lithium dicyanamide | 0.15 |
| LiTFAc | 0.66 | LiNO$_3$ | 0.50 | lithium dicyanamide | 0.15 |
| LiTFAc | 0.66 | LiNO$_3$ | 0.66 | lithium dicyanamide | 0.15 |
| LiTFAc | 0.66 | LiNO$_3$ | 0.75 | lithium dicyanamide | 0.15 |
| LiTFAc | 0.66 | LiNO$_3$ | 1.00 | lithium dicyanamide | 0.15 |
| LiTFAc | 0.75 | LiNO$_3$ | 0.10 | lithium dicyanamide | 0.10 |
| LiTFAc | 0.75 | LiNO$_3$ | 0.25 | lithium dicyanamide | 0.10 |
| LiTFAc | 0.75 | LiNO$_3$ | 0.33 | lithium dicyanamide | 0.10 |
| LiTFAc | 0.75 | LiNO$_3$ | 0.50 | lithium dicyanamide | 0.10 |
| LiTFAc | 0.75 | LiNO$_3$ | 0.66 | lithium dicyanamide | 0.10 |
| LiTFAc | 0.75 | LiNO$_3$ | 0.75 | lithium dicyanamide | 0.10 |
| LiTFAc | 0.75 | LiNO$_3$ | 1.00 | lithium dicyanamide | 0.10 |
| LiTFAc | 0.75 | LiNO$_3$ | 0.10 | lithium dicyanamide | 0.15 |
| LiTFAc | 0.75 | LiNO$_3$ | 0.25 | lithium dicyanamide | 0.15 |
| LiTFAc | 0.75 | LiNO$_3$ | 0.33 | lithium dicyanamide | 0.15 |
| LiTFAc | 0.75 | LiNO$_3$ | 0.50 | lithium dicyanamide | 0.15 |
| LiTFAc | 0.75 | LiNO$_3$ | 0.66 | lithium dicyanamide | 0.15 |
| LiTFAc | 0.75 | LiNO$_3$ | 0.75 | lithium dicyanamide | 0.15 |
| LiTFAc | 0.75 | LiNO$_3$ | 1.00 | lithium dicyanamide | 0.15 |
| LiTFAc | 1.00 | LiNO$_3$ | 0.10 | lithium dicyanamide | 0.10 |
| LiTFAc | 1.00 | LiNO$_3$ | 0.25 | lithium dicyanamide | 0.10 |
| LiTFAc | 1.00 | LiNO$_3$ | 0.33 | lithium dicyanamide | 0.10 |
| LiTFAc | 1.00 | LiNO$_3$ | 0.50 | lithium dicyanamide | 0.10 |
| LiTFAc | 1.00 | LiNO$_3$ | 0.66 | lithium dicyanamide | 0.10 |
| LiTFAc | 1.00 | LiNO$_3$ | 0.75 | lithium dicyanamide | 0.10 |
| LiTFAc | 1.00 | LiNO$_3$ | 1.00 | lithium dicyanamide | 0.10 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFAc | 1.00 | LiNO$_3$ | 0.10 | lithium dicyanamide | 0.15 |
| LiTFAc | 1.00 | LiNO$_3$ | 0.25 | lithium dicyanamide | 0.15 |
| LiTFAc | 1.00 | LiNO$_3$ | 0.33 | lithium dicyanamide | 0.15 |
| LiTFAc | 1.00 | LiNO$_3$ | 0.50 | lithium dicyanamide | 0.15 |
| LiTFAc | 1.00 | LiNO$_3$ | 0.66 | lithium dicyanamide | 0.15 |
| LiTFAc | 1.00 | LiNO$_3$ | 0.75 | lithium dicyanamide | 0.15 |
| LiTFAc | 1.00 | LiNO$_3$ | 1.00 | lithium dicyanamide | 0.15 |
| LiTFAc | 0.10 | LiClO$_4$ | 0.10 | lithium dicyanamide | 0.10 |
| LiTFAc | 0.10 | LiClO$_4$ | 0.25 | lithium dicyanamide | 0.10 |
| LiTFAc | 0.10 | LiClO$_4$ | 0.33 | lithium dicyanamide | 0.10 |
| LiTFAc | 0.10 | LiClO$_4$ | 0.50 | lithium dicyanamide | 0.10 |
| LiTFAc | 0.10 | LiClO$_4$ | 0.66 | lithium dicyanamide | 0.10 |
| LiTFAc | 0.10 | LiClO$_4$ | 0.75 | lithium dicyanamide | 0.10 |
| LiTFAc | 0.10 | LiClO$_4$ | 1.00 | lithium dicyanamide | 0.10 |
| LiTFAc | 0.10 | LiClO$_4$ | 0.10 | lithium dicyanamide | 0.15 |
| LiTFAc | 0.10 | LiClO$_4$ | 0.25 | lithium dicyanamide | 0.15 |
| LiTFAc | 0.10 | LiClO$_4$ | 0.33 | lithium dicyanamide | 0.15 |
| LiTFAc | 0.10 | LiClO$_4$ | 0.50 | lithium dicyanamide | 0.15 |
| LiTFAc | 0.10 | LiClO$_4$ | 0.66 | lithium dicyanamide | 0.15 |
| LiTFAc | 0.10 | LiClO$_4$ | 0.75 | lithium dicyanamide | 0.15 |
| LiTFAc | 0.10 | LiClO$_4$ | 1.00 | lithium dicyanamide | 0.15 |
| LiTFAc | 0.25 | LiClO$_4$ | 0.10 | lithium dicyanamide | 0.10 |
| LiTFAc | 0.25 | LiClO$_4$ | 0.25 | lithium dicyanamide | 0.10 |
| LiTFAc | 0.25 | LiClO$_4$ | 0.33 | lithium dicyanamide | 0.10 |
| LiTFAc | 0.25 | LiClO$_4$ | 0.50 | lithium dicyanamide | 0.10 |
| LiTFAc | 0.25 | LiClO$_4$ | 0.66 | lithium dicyanamide | 0.10 |
| LiTFAc | 0.25 | LiClO$_4$ | 0.75 | lithium dicyanamide | 0.10 |
| LiTFAc | 0.25 | LiClO$_4$ | 1.00 | lithium dicyanamide | 0.10 |
| LiTFAc | 0.25 | LiClO$_4$ | 0.10 | lithium dicyanamide | 0.15 |
| LiTFAc | 0.25 | LiClO$_4$ | 0.25 | lithium dicyanamide | 0.15 |
| LiTFAc | 0.25 | LiClO$_4$ | 0.33 | lithium dicyanamide | 0.15 |
| LiTFAc | 0.25 | LiClO$_4$ | 0.50 | lithium dicyanamide | 0.15 |
| LiTFAc | 0.25 | LiClO$_4$ | 0.66 | lithium dicyanamide | 0.15 |
| LiTFAc | 0.25 | LiClO$_4$ | 0.75 | lithium dicyanamide | 0.15 |
| LiTFAc | 0.25 | LiClO$_4$ | 1.00 | lithium dicyanamide | 0.15 |
| LiTFAc | 0.40 | LiClO$_4$ | 0.10 | lithium dicyanamide | 0.10 |
| LiTFAc | 0.40 | LiClO$_4$ | 0.25 | lithium dicyanamide | 0.10 |
| LiTFAc | 0.40 | LiClO$_4$ | 0.33 | lithium dicyanamide | 0.10 |
| LiTFAc | 0.40 | LiClO$_4$ | 0.50 | lithium dicyanamide | 0.10 |
| LiTFAc | 0.40 | LiClO$_4$ | 0.66 | lithium dicyanamide | 0.10 |
| LiTFAc | 0.40 | LiClO$_4$ | 0.75 | lithium dicyanamide | 0.10 |
| LiTFAc | 0.40 | LiClO$_4$ | 1.00 | lithium dicyanamide | 0.10 |
| LiTFAc | 0.40 | LiClO$_4$ | 0.10 | lithium dicyanamide | 0.15 |
| LiTFAc | 0.40 | LiClO$_4$ | 0.25 | lithium dicyanamide | 0.15 |
| LiTFAc | 0.40 | LiClO$_4$ | 0.33 | lithium dicyanamide | 0.15 |
| LiTFAc | 0.40 | LiClO$_4$ | 0.50 | lithium dicyanamide | 0.15 |
| LiTFAc | 0.40 | LiClO$_4$ | 0.66 | lithium dicyanamide | 0.15 |
| LiTFAc | 0.40 | LiClO$_4$ | 0.75 | lithium dicyanamide | 0.15 |
| LiTFAc | 0.40 | LiClO$_4$ | 1.00 | lithium dicyanamide | 0.15 |
| LiTFAc | 0.50 | LiClO$_4$ | 0.10 | lithium dicyanamide | 0.10 |
| LiTFAc | 0.50 | LiClO$_4$ | 0.25 | lithium dicyanamide | 0.10 |
| LiTFAc | 0.50 | LiClO$_4$ | 0.33 | lithium dicyanamide | 0.10 |
| LiTFAc | 0.50 | LiClO$_4$ | 0.50 | lithium dicyanamide | 0.10 |
| LiTFAc | 0.50 | LiClO$_4$ | 0.66 | lithium dicyanamide | 0.10 |
| LiTFAc | 0.50 | LiClO$_4$ | 0.75 | lithium dicyanamide | 0.10 |
| LiTFAc | 0.50 | LiClO$_4$ | 1.00 | lithium dicyanamide | 0.10 |
| LiTFAc | 0.50 | LiClO$_4$ | 0.10 | lithium dicyanamide | 0.15 |
| LiTFAc | 0.50 | LiClO$_4$ | 0.25 | lithium dicyanamide | 0.15 |
| LiTFAc | 0.50 | LiClO$_4$ | 0.33 | lithium dicyanamide | 0.15 |
| LiTFAc | 0.50 | LiClO$_4$ | 0.50 | lithium dicyanamide | 0.15 |
| LiTFAc | 0.50 | LiClO$_4$ | 0.66 | lithium dicyanamide | 0.15 |
| LiTFAc | 0.50 | LiClO$_4$ | 0.75 | lithium dicyanamide | 0.15 |
| LiTFAc | 0.50 | LiClO$_4$ | 1.00 | lithium dicyanamide | 0.15 |
| LiTFAc | 0.66 | LiClO$_4$ | 0.10 | lithium dicyanamide | 0.10 |
| LiTFAc | 0.66 | LiClO$_4$ | 0.25 | lithium dicyanamide | 0.10 |
| LiTFAc | 0.66 | LiClO$_4$ | 0.33 | lithium dicyanamide | 0.10 |
| LiTFAc | 0.66 | LiClO$_4$ | 0.50 | lithium dicyanamide | 0.10 |
| LiTFAc | 0.66 | LiClO$_4$ | 0.66 | lithium dicyanamide | 0.10 |
| LiTFAc | 0.66 | LiClO$_4$ | 0.75 | lithium dicyanamide | 0.10 |
| LiTFAc | 0.66 | LiClO$_4$ | 1.00 | lithium dicyanamide | 0.10 |
| LiTFAc | 0.66 | LiClO$_4$ | 0.10 | lithium dicyanamide | 0.15 |
| LiTFAc | 0.66 | LiClO$_4$ | 0.25 | lithium dicyanamide | 0.15 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFAc | 0.66 | LiClO$_4$ | 0.33 | lithium dicyanamide | 0.15 |
| LiTFAc | 0.66 | LiClO$_4$ | 0.50 | lithium dicyanamide | 0.15 |
| LiTFAc | 0.66 | LiClO$_4$ | 0.66 | lithium dicyanamide | 0.15 |
| LiTFAc | 0.66 | LiClO$_4$ | 0.75 | lithium dicyanamide | 0.15 |
| LiTFAc | 0.66 | LiClO$_4$ | 1.00 | lithium dicyanamide | 0.15 |
| LiTFAc | 0.75 | LiClO$_4$ | 0.10 | lithium dicyanamide | 0.10 |
| LiTFAc | 0.75 | LiClO$_4$ | 0.25 | lithium dicyanamide | 0.10 |
| LiTFAc | 0.75 | LiClO$_4$ | 0.33 | lithium dicyanamide | 0.10 |
| LiTFAc | 0.75 | LiClO$_4$ | 0.50 | lithium dicyanamide | 0.10 |
| LiTFAc | 0.75 | LiClO$_4$ | 0.66 | lithium dicyanamide | 0.10 |
| LiTFAc | 0.75 | LiClO$_4$ | 0.75 | lithium dicyanamide | 0.10 |
| LiTFAc | 0.75 | LiClO$_4$ | 1.00 | lithium dicyanamide | 0.10 |
| LiTFAc | 0.75 | LiClO$_4$ | 0.10 | lithium dicyanamide | 0.15 |
| LiTFAc | 0.75 | LiClO$_4$ | 0.25 | lithium dicyanamide | 0.15 |
| LiTFAc | 0.75 | LiClO$_4$ | 0.33 | lithium dicyanamide | 0.15 |
| LiTFAc | 0.75 | LiClO$_4$ | 0.50 | lithium dicyanamide | 0.15 |
| LiTFAc | 0.75 | LiClO$_4$ | 0.66 | lithium dicyanamide | 0.15 |
| LiTFAc | 0.75 | LiClO$_4$ | 0.75 | lithium dicyanamide | 0.15 |
| LiTFAc | 0.75 | LiClO$_4$ | 1.00 | lithium dicyanamide | 0.15 |
| LiTFAc | 1.00 | LiClO$_4$ | 0.10 | lithium dicyanamide | 0.10 |
| LiTFAc | 1.00 | LiClO$_4$ | 0.25 | lithium dicyanamide | 0.10 |
| LiTFAc | 1.00 | LiClO$_4$ | 0.33 | lithium dicyanamide | 0.10 |
| LiTFAc | 1.00 | LiClO$_4$ | 0.50 | lithium dicyanamide | 0.10 |
| LiTFAc | 1.00 | LiClO$_4$ | 0.66 | lithium dicyanamide | 0.10 |
| LiTFAc | 1.00 | LiClO$_4$ | 0.75 | lithium dicyanamide | 0.10 |
| LiTFAc | 1.00 | LiClO$_4$ | 1.00 | lithium dicyanamide | 0.10 |
| LiTFAc | 1.00 | LiClO$_4$ | 0.10 | lithium dicyanamide | 0.15 |
| LiTFAc | 1.00 | LiClO$_4$ | 0.25 | lithium dicyanamide | 0.15 |
| LiTFAc | 1.00 | LiClO$_4$ | 0.33 | lithium dicyanamide | 0.15 |
| LiTFAc | 1.00 | LiClO$_4$ | 0.50 | lithium dicyanamide | 0.15 |
| LiTFAc | 1.00 | LiClO$_4$ | 0.66 | lithium dicyanamide | 0.15 |
| LiTFAc | 1.00 | LiClO$_4$ | 0.75 | lithium dicyanamide | 0.15 |
| LiTFAc | 1.00 | LiClO$_4$ | 1.00 | lithium dicyanamide | 0.15 |
| LiTFAc | 0.10 | lithium triflate (LiTf) | 0.10 | lithium dicyanamide | 0.10 |
| LiTFAc | 0.10 | LiTf | 0.25 | lithium dicyanamide | 0.10 |
| LiTFAc | 0.10 | LiTf | 0.33 | lithium dicyanamide | 0.10 |
| LiTFAc | 0.10 | LiTf | 0.50 | lithium dicyanamide | 0.10 |
| LiTFAc | 0.10 | LiTf | 0.66 | lithium dicyanamide | 0.10 |
| LiTFAc | 0.10 | LiTf | 0.75 | lithium dicyanamide | 0.10 |
| LiTFAc | 0.10 | LiTf | 1.00 | lithium dicyanamide | 0.10 |
| LiTFAc | 0.10 | LiTf | 0.10 | lithium dicyanamide | 0.15 |
| LiTFAc | 0.10 | LiTf | 0.25 | lithium dicyanamide | 0.15 |
| LiTFAc | 0.10 | LiTf | 0.33 | lithium dicyanamide | 0.15 |
| LiTFAc | 0.10 | LiTf | 0.50 | lithium dicyanamide | 0.15 |
| LiTFAc | 0.10 | LiTf | 0.66 | lithium dicyanamide | 0.15 |
| LiTFAc | 0.10 | LiTf | 0.75 | lithium dicyanamide | 0.15 |
| LiTFAc | 0.10 | LiTf | 1.00 | lithium dicyanamide | 0.15 |
| LiTFAc | 0.25 | LiTf | 0.10 | lithium dicyanamide | 0.10 |
| LiTFAc | 0.25 | LiTf | 0.25 | lithium dicyanamide | 0.10 |
| LiTFAc | 0.25 | LiTf | 0.33 | lithium dicyanamide | 0.10 |
| LiTFAc | 0.25 | LiTf | 0.50 | lithium dicyanamide | 0.10 |
| LiTFAc | 0.25 | LiTf | 0.66 | lithium dicyanamide | 0.10 |
| LiTFAc | 0.25 | LiTf | 0.75 | lithium dicyanamide | 0.10 |
| LiTFAc | 0.25 | LiTf | 1.00 | lithium dicyanamide | 0.10 |
| LiTFAc | 0.25 | LiTf | 0.10 | lithium dicyanamide | 0.15 |
| LiTFAc | 0.25 | LiTf | 0.25 | lithium dicyanamide | 0.15 |
| LiTFAc | 0.25 | LiTf | 0.33 | lithium dicyanamide | 0.15 |
| LiTFAc | 0.25 | LiTf | 0.50 | lithium dicyanamide | 0.15 |
| LiTFAc | 0.25 | LiTf | 0.66 | lithium dicyanamide | 0.15 |
| LiTFAc | 0.25 | LiTf | 0.75 | lithium dicyanamide | 0.15 |
| LiTFAc | 0.25 | LiTf | 1.00 | lithium dicyanamide | 0.15 |
| LiTFAc | 0.40 | LiTf | 0.10 | lithium dicyanamide | 0.10 |
| LiTFAc | 0.40 | LiTf | 0.25 | lithium dicyanamide | 0.10 |
| LiTFAc | 0.40 | LiTf | 0.33 | lithium dicyanamide | 0.10 |
| LiTFAc | 0.40 | LiTf | 0.50 | lithium dicyanamide | 0.10 |
| LiTFAc | 0.40 | LiTf | 0.66 | lithium dicyanamide | 0.10 |
| LiTFAc | 0.40 | LiTf | 0.75 | lithium dicyanamide | 0.10 |
| LiTFAc | 0.40 | LiTf | 1.00 | lithium dicyanamide | 0.10 |
| LiTFAc | 0.40 | LiTf | 0.10 | lithium dicyanamide | 0.15 |
| LiTFAc | 0.40 | LiTf | 0.25 | lithium dicyanamide | 0.15 |
| LiTFAc | 0.40 | LiTf | 0.33 | lithium dicyanamide | 0.15 |
| LiTFAc | 0.40 | LiTf | 0.50 | lithium dicyanamide | 0.15 |

TABLE 3-continued

Exemplary Additional Components

| Li-Ion Transport Compound 1 | Conc. (mol/L) | Li-Ion Transport Compound 2 | Conc. (mol/L) | Enhancer | Conc. (mol/L) |
|---|---|---|---|---|---|
| LiTFAc | 0.40 | LiTf | 0.66 | lithium dicyanamide | 0.15 |
| LiTFAc | 0.40 | LiTf | 0.75 | lithium dicyanamide | 0.15 |
| LiTFAc | 0.40 | LiTf | 1.00 | lithium dicyanamide | 0.15 |
| LiTFAc | 0.50 | LiTf | 0.10 | lithium dicyanamide | 0.10 |
| LiTFAc | 0.50 | LiTf | 0.25 | lithium dicyanamide | 0.10 |
| LiTFAc | 0.50 | LiTf | 0.33 | lithium dicyanamide | 0.10 |
| LiTFAc | 0.50 | LiTf | 0.50 | lithium dicyanamide | 0.10 |
| LiTFAc | 0.50 | LiTf | 0.66 | lithium dicyanamide | 0.10 |
| LiTFAc | 0.50 | LiTf | 0.75 | lithium dicyanamide | 0.10 |
| LiTFAc | 0.50 | LiTf | 1.00 | lithium dicyanamide | 0.10 |
| LiTFAc | 0.50 | LiTf | 0.10 | lithium dicyanamide | 0.15 |
| LiTFAc | 0.50 | LiTf | 0.25 | lithium dicyanamide | 0.15 |
| LiTFAc | 0.50 | LiTf | 0.33 | lithium dicyanamide | 0.15 |
| LiTFAc | 0.50 | LiTf | 0.50 | lithium dicyanamide | 0.15 |
| LiTFAc | 0.50 | LiTf | 0.66 | lithium dicyanamide | 0.15 |
| LiTFAc | 0.50 | LiTf | 0.75 | lithium dicyanamide | 0.15 |
| LiTFAc | 0.50 | LiTf | 1.00 | lithium dicyanamide | 0.15 |
| LiTFAc | 0.66 | LiTf | 0.10 | lithium dicyanamide | 0.10 |
| LiTFAc | 0.66 | LiTf | 0.25 | lithium dicyanamide | 0.10 |
| LiTFAc | 0.66 | LiTf | 0.33 | lithium dicyanamide | 0.10 |
| LiTFAc | 0.66 | LiTf | 0.50 | lithium dicyanamide | 0.10 |
| LiTFAc | 0.66 | LiTf | 0.66 | lithium dicyanamide | 0.10 |
| LiTFAc | 0.66 | LiTf | 0.75 | lithium dicyanamide | 0.10 |
| LiTFAc | 0.66 | LiTf | 1.00 | lithium dicyanamide | 0.10 |
| LiTFAc | 0.66 | LiTf | 0.10 | lithium dicyanamide | 0.15 |
| LiTFAc | 0.66 | LiTf | 0.25 | lithium dicyanamide | 0.15 |
| LiTFAc | 0.66 | LiTf | 0.33 | lithium dicyanamide | 0.15 |
| LiTFAc | 0.66 | LiTf | 0.50 | lithium dicyanamide | 0.15 |
| LiTFAc | 0.66 | LiTf | 0.66 | lithium dicyanamide | 0.15 |
| LiTFAc | 0.66 | LiTf | 0.75 | lithium dicyanamide | 0.15 |
| LiTFAc | 0.66 | LiTf | 1.00 | lithium dicyanamide | 0.15 |
| LiTFAc | 0.75 | LiTf | 0.10 | lithium dicyanamide | 0.10 |
| LiTFAc | 0.75 | LiTf | 0.25 | lithium dicyanamide | 0.10 |
| LiTFAc | 0.75 | LiTf | 0.33 | lithium dicyanamide | 0.10 |
| LiTFAc | 0.75 | LiTf | 0.50 | lithium dicyanamide | 0.10 |
| LiTFAc | 0.75 | LiTf | 0.66 | lithium dicyanamide | 0.10 |
| LiTFAc | 0.75 | LiTf | 0.75 | lithium dicyanamide | 0.10 |
| LiTFAc | 0.75 | LiTf | 1.00 | lithium dicyanamide | 0.10 |
| LiTFAc | 0.75 | LiTf | 0.10 | lithium dicyanamide | 0.15 |
| LiTFAc | 0.75 | LiTf | 0.25 | lithium dicyanamide | 0.15 |
| LiTFAc | 0.75 | LiTf | 0.33 | lithium dicyanamide | 0.15 |
| LiTFAc | 0.75 | LiTf | 0.50 | lithium dicyanamide | 0.15 |
| LiTFAc | 0.75 | LiTf | 0.66 | lithium dicyanamide | 0.15 |
| LiTFAc | 0.75 | LiTf | 0.75 | lithium dicyanamide | 0.15 |
| LiTFAc | 0.75 | LiTf | 1.00 | lithium dicyanamide | 0.15 |
| LiTFAc | 1.00 | LiTf | 0.10 | lithium dicyanamide | 0.10 |
| LiTFAc | 1.00 | LiTf | 0.25 | lithium dicyanamide | 0.10 |
| LiTFAc | 1.00 | LiTf | 0.33 | lithium dicyanamide | 0.10 |
| LiTFAc | 1.00 | LiTf | 0.50 | lithium dicyanamide | 0.10 |
| LiTFAc | 1.00 | LiTf | 0.66 | lithium dicyanamide | 0.10 |
| LiTFAc | 1.00 | LiTf | 0.75 | lithium dicyanamide | 0.10 |
| LiTFAc | 1.00 | LiTf | 1.00 | lithium dicyanamide | 0.10 |
| LiTFAc | 1.00 | LiTf | 0.10 | lithium dicyanamide | 0.15 |
| LiTFAc | 1.00 | LiTf | 0.25 | lithium dicyanamide | 0.15 |
| LiTFAc | 1.00 | LiTf | 0.33 | lithium dicyanamide | 0.15 |
| LiTFAc | 1.00 | LiTf | 0.50 | lithium dicyanamide | 0.15 |
| LiTFAc | 1.00 | LiTf | 0.66 | lithium dicyanamide | 0.15 |
| LiTFAc | 1.00 | LiTf | 0.75 | lithium dicyanamide | 0.15 |
| LiTFAc | 1.00 | LiTf | 1.00 | lithium dicyanamide | 0.15 |

In various approaches, the inventive structures, compositions, configurations, etc. described herein may be implemented in electrochemical cells of various types for practical utilization in a wide variety of applications. Without limitation, exemplary electrochemical cell configurations that may utilize any combination of features described herein, may be in the form of a pouch, a coin, a prismatic cell, a cylindrical configuration, or any suitable equivalent(s) thereof that would be appreciated by those having ordinary skill in the art upon reading the present disclosure.

Figure 8B:
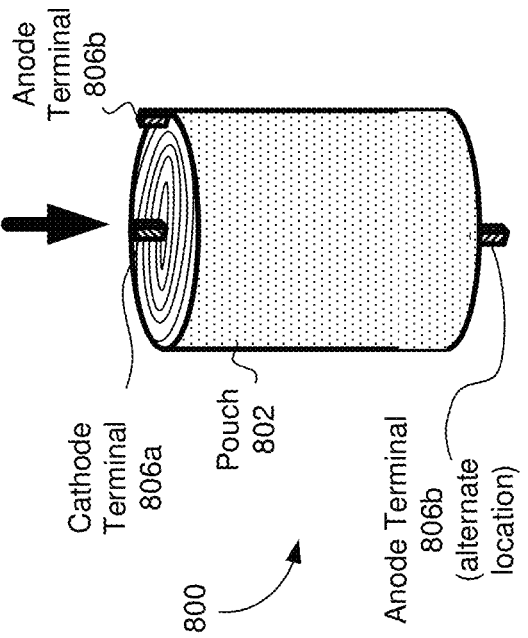
FIG. 8B is a simplified schematic external view of the electrochemical cell shown in FIG. 8A, according to one embodiment of the presently disclosed inventive concepts.
Figure 8C:
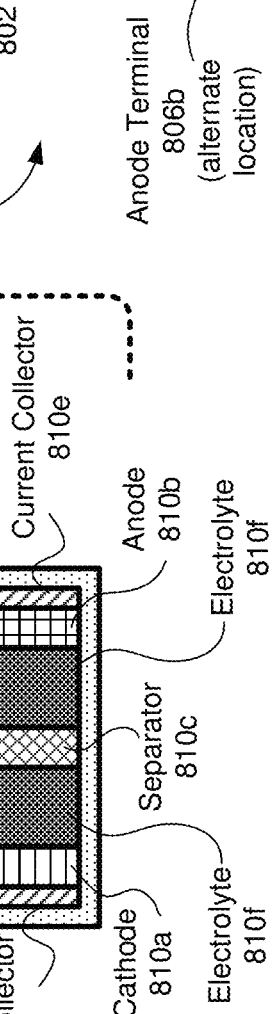
FIG. 8C depicts a simplified schematic of the pouch cell arrangement shown in FIG. 8B, wrapped into a jelly-roll configuration, according to one approach of the presently disclosed inventive concepts.
Figure 8A:
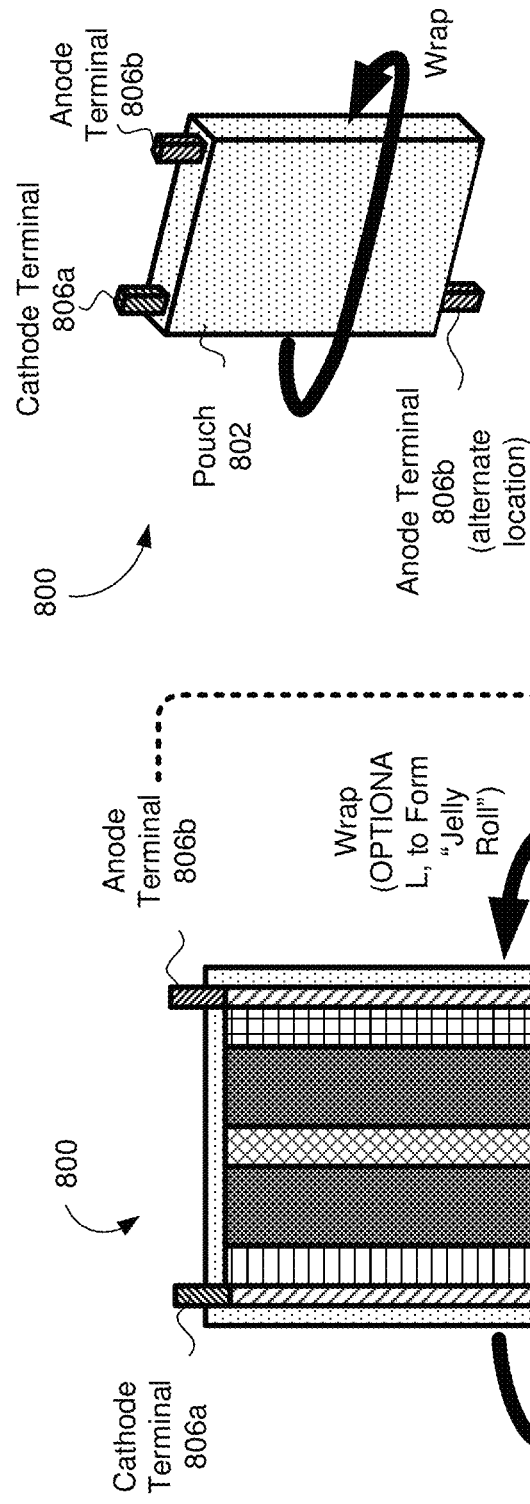
FIG. 8A shows a simplified schematic cross-sectional view of an electrochemical cell characterized by a pouch cell arrangement, according to one embodiment of the presently disclosed inventive concepts.

With reference to electrochemical cells having a pouch cell arrangement 800, and as shown according to exemplary embodiments in FIGS. 8A-8C, an electrochemical cell includes a cathode 810*a* and an anode 810*b* positioned on opposing sides of the pouch cell arrangement 800, and separated (physically and/or chemically) by a separator 810*c*. The anode 810*b* and cathode 810*a* are electronically coupled via an electrolyte 810*f* present in the pouch cell arrangement 800. Moreover, each electrode is electronically coupled to an external environment of the pouch cell arrangement 800 via a current collector and corresponding terminal, i.e. the cathode 810a is coupled to the external environment via cathode current collector 810d and cathode terminal 806a, while the anode 810b is coupled via anode current collector 810e and anode terminal 806b. The foregoing structures are enclosed, encased, or otherwise spatially fixed and contained via a pouch 802 surrounding the components.

The pouch 802, according to various embodiments, may take any suitable form that would be understood by those having ordinary skill in the art upon reading the present disclosure, such as a wrapping, a coating, an enclosure (soft or hard), a compressive structure (such as a metal band or mesh), etc. as would be understood by those having ordinary skill in the art upon reading the present disclosure.

Moreover, as shown in FIG. 8B, the anode terminal 806b and cathode terminal 806a extend through the pouch 802, providing electronic coupling between interior and exterior environments of the pouch cell arrangement 800. Note the anode terminal 806b may alternatively be positioned on a same side, or an opposite side, of the pouch cell arrangement 800 relative to the cathode terminal 806a. Moreover, the relative position of the anode terminal 806b and the cathode terminal 806a may be switched relative to the arrangement shown in FIGS. 8B and 8C, according to alternative implementations and without departing from the scope of the presently described inventive concepts.

As noted in FIGS. 8A and 8B, the illustrative pouch cell arrangement 800 may be wound around, e.g., its longitudinal axis, to form a spiral, folded, pleated, rolled, or otherwise at least partially overlapping configuration of the above-referenced electrochemical cell components. In preferred implementations, winding the pouch cell arrangement 800 yields a configuration known as a "jellyroll", Shown schematically in FIG. 8C.

Turning now to FIGS. 9A and 9B, which depict a simplified schematic of an electrochemical cell configured according to a coin cell arrangement 900 is aptly named for its substantially flat, cylindrical shape as shown in FIG. 9A. According to various embodiments, the coin cell arrangement 900 includes a can 902 and cap 902 which protect the components placed therein from mechanical damage, chemical damage (e.g. corrosion, oxidation, etc.) electrical damage, etc. and also prevent leakage of compounds within the coin cell arrangement 900 into the environment.

Coupled to the cap 902 is an anode terminal 906b, and likewise coupled to the can 902 is a cathode terminal 906a (not shown in FIG. 9B). Preferably, these terminals have a composition suitable for conducting electricity generated within the coin cell arrangement 900 to an appropriately connected or coupled output, and may be inserted into a circuit to provide power thereto, as would be appreciated by those having ordinary skill in the art upon reading the present descriptions. Exemplary compositions suitable for use in cathode terminal 906a and anode terminal 906b include electrically conductive metals, such as copper, nickel, etc. as known in the art, electrically conductive carbonaceous materials, such as graphene, etc. as known in the art, or any other suitable equivalent thereof that would be appreciated by a skilled artisan upon reading the present disclosures.

Turning now to FIG. 9B, a plurality of components that may be included in a coin cell arrangement 900 are shown according to an exploded view consistent with various embodiments of the presently described inventive concepts. It shall be appreciated that components such as washer/spring 920, spacer 922, and gasket 929, represented by dotted outlines, are optional and may, but need not, be included in accordance with the inventive concepts disclosed herein. However, it shall also be appreciated that, depending on the intended application for the coin cell arrangement 900, washer/spring 920, spacer 922, and/or gasket 929 may advantageously convey mechanical strength, or convey advantageous electrical properties, on the coin cell arrangement 900. For instance, washer/spring 920 and/or gasket 929 may help secure the other depicted components in place, facilitating desired operation of the coin cell arrangement 900. Similarly, spacer 922 may cushion the anode 910b from friction or compressive force from the washer/spring 920, and/or be formed from a material that facilitates conduction of heat and/or electricity from within the coin cell arrangement 900 to the anode terminal 906b, according to the configuration shown in FIG. 9B. Of course, those having ordinary skill in the art will appreciate various advantages that may be realized via inclusion of washer/spring 920, spacer 922, and/or gasket 929, in various implementations, based on knowledge generally available at the time of the present disclosure's filing date.

With continuing reference to FIG. 9B, illustrative coin cell arrangement 900 features internal components including an anode 910b positioned toward an opposing end of the coin cell arrangement as a cathode 910a, with a separator 910c and electrolyte 910f positioned therebetween. As with all electrochemical cell arrangements shown in FIGS. 8A-11 and consistent with corresponding descriptions thereof provided herein, the anode 910b, cathode 910a, separator 910c, and electrolyte 910f may each be characterized by any composition as known in the art or as described herein that a skilled artisan would appreciate as suitable for the respective function thereof in an electrochemical cell, upon reading the present disclosure and without departing from the scope of the presently described inventive concepts. Several such exemplary compositions are provided hereinbelow, and others may be set forth elsewhere in the detailed descriptions of the inventive concepts instantly set forth. Unless expressly admitted as being known in the art, it shall be understood that any such exemplary composition described for any of the components of electrochemical cell arrangements 8A-11 is not admitted as being so well-known, but rather is considered part of the inventive concepts presented herein.

In other approaches, electrochemical cells may be characterized by a cylindrical cell arrangement 1000, e.g., as shown according to illustrative implementations in FIG. 10A (external view) and 10B (cut-out view), includes a can 1002 and a cap 1004 that contain and protect other components internal to the cylindrical cell configuration, in similar manner as described herein regarding coin cell arrangements such as coin cell arrangement 900 shown in FIGS. 9A and 9B. Also similar to other arrangements described herein, the cap 1004 and can 1002 each respectively include a terminal configured to conduct electricity generated within the cylindrical cell arrangement 1000 to an external environment, output device electrically coupled to the cylindrical cell arrangement 1000, etc., according to various embodiments and as would be appreciated by those having ordinary skill in the art upon reading the present disclosure. As shown in FIG. 10B, cap 1004 includes a cathode terminal 1006a, while can 1002 includes an anode terminal 1006b (not shown in FIG. 10B), positioned at substantially opposite ends of the cylindrical cell arrangement 1000. Of course, the relative position of the cathode terminal 1006a and anode terminal 1006b may be swapped, according to alternative embodiments of the cylindrical cell arrangement 1000.

With continuing reference to FIG. 10B, the illustrative cylindrical cell arrangement 1000 includes similar components as described herein with reference to other electrochemical cell arrangements, but structurally arranged in a unique manner. Most notably, while the cathode(s) 1010*a* and anode(s) 1010*b* are spatially separated by separator(s) 1010*c*, there are a plurality of such structures arranged in a substantially laminar configuration and wound around a central longitudinal axis of the cylindrical cell arrangement 1000. In this manner, the cathode(s) 1010*a* and anode(s) 1010*b* are not positioned proximate to opposing ends of the cylindrical cell arrangement 1000 as is the case for pouch cell arrangement 800 and coin cell arrangement 900, but rather present throughout a volume of the cylindrical cell arrangement 1000. Regardless, consistent with pouch cell arrangement 800, the cylindrical cell arrangement 1000 includes a cathode current collector 1010*d* (not shown in FIG. 10B) and an anode current collector 1010*e* positioned at opposing ends of the cylindrical cell arrangement 1000 and electrically coupled to a corresponding terminal (i.e., either cathode terminal 1006*a* or anode terminal 1006*b*), as would be understood by those having ordinary skill in the art upon reading the present disclosures.

Figure 11:
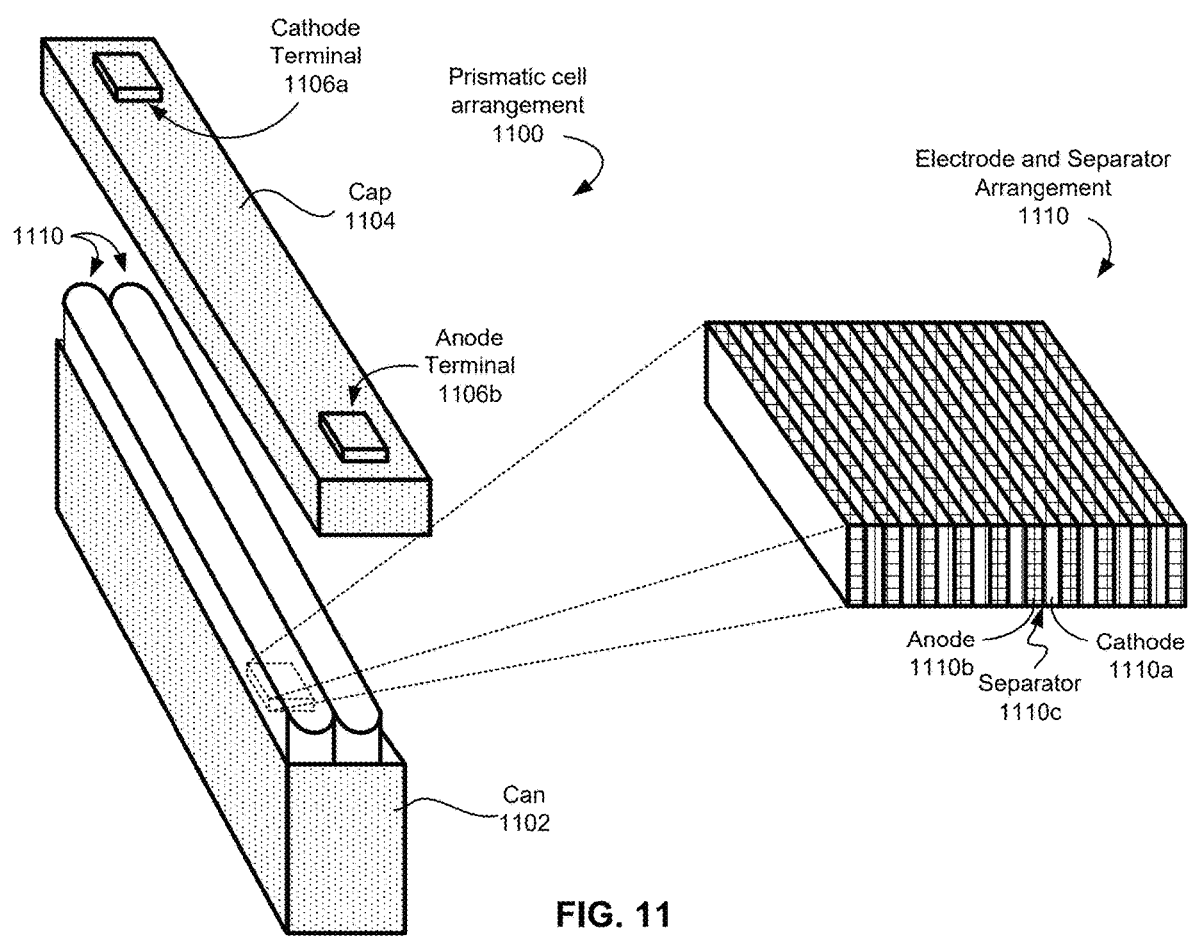
FIG. 11 is a simplified schematic of an electrochemical cell characterized by a cylindrical cell arrangement, according to one aspect of the presently disclosed inventive concepts.

Now regarding FIG. 11, a simplified schematic of an electrochemical cell embodied in a prismatic configuration 1100 is shown, according to one aspect of the presently disclosed inventive concepts. As with other electrochemical cell arrangements described hereinabove, the prismatic cell arrangement 1100 includes a can 1102 and a cap 1104. Unique to the prismatic cell arrangement 1100, the can 1102 and cap 1104 as shown in FIG. 11 are substantially rectangular cuboidal in shape, although those having ordinary skill in the art will appreciate that a unique advantage of prismatic cell arrangements as contemplated herein is nearly unlimited flexibility with respect to the spatial configuration of the can 1102 and cap 1104. The sole limitation on such spatial configuration is the ability to fully enclose and contain the internal components, shown according to one exemplary embodiment with reference to electrode and separator arrangement 1110. This flexibility, in large part, is due to implementation of electrode and separator arrangements 1110 characterized by a laminar structure including anode(s) 1110*b* and cathode(s) 1110*a* physically and/or chemically separated by separator(s) 1110*c*. While the particular electrode and separator arrangement 1110 shown in FIG. 11 is a multi-layered structure (e.g., composed of a series of thin films deposited sequentially one onto the other) those having ordinary skill in the art will appreciate that according to various implementations the components of the electrode and separator arrangement 1110 (which may include components other than anode 1110*b*, cathode 1110*a*, and separator 1110*c* without departing from the scope of the presently disclosed inventive concepts) may be arranged in a "rolled" configuration such as shown in FIGS. 8C and 10B, or in a folded configuration, a pleated configuration, or any other configuration in which at least portion(s) of the components of the electrode and separator arrangement 1110 at least partially overlap themselves, one another, or both. Furthermore, combinations of overlapping arrangements may be implemented in electrode and separator arrangement 1110 without departing from the scope of the presently disclosed inventive concepts.

Returning to the cap 1104 of exemplary prismatic cell arrangement 1100 shown in FIG. 11, in one illustrative implementation a plurality of terminals including cathode terminal 1106*a* and anode terminal 1106*b* are disposed on an external surface of the cap 1104 and electrically coupled to the electrode and separator arrangement 1110, e.g. via one or more current collectors (not shown in FIG. 11) using any suitable means and/or mechanisms that would be understood by those having ordinary skill in the art upon reading the instant descriptions.

Several exemplary electrochemical cell arrangements have been shown and described with reference to FIGS. 8A-11, and shall be understood as illustrative rather than limiting on the scope of the inventive concepts presented herein. Moreover, certain arrangements are depicted as including or omitting certain components not expressly shown or described with reference to other arrangements (such as the washer/spring 920, spacer 922, gasket 929, electrolyte 910*f*, current collectors 810*d* and 810*e*, shown with reference to FIGS. 8A and 9B but not expressly shown or described with reference to other arrangements set forth herein. Despite the particular components shown in FIGS. 8A-11, it shall be understood that any electrochemical cell arrangement, whether in accordance with FIGS. 8A-11 or according to a different electrochemical cell arrangement, may include any suitable combination of components described with reference to any single Figure, or components not shown in any of the Figures, but which would be appreciated as suitable for creating a functioning electrochemical cell by a person having ordinary skill in the art upon reading the instant descriptions.

Of course, the various exemplary embodiments of electrochemical cells arranged according to different configurations shown in FIGS. 8A-11 and described hereinabove are provided for illustrative purposes, and should not be interpreted as limiting on the scope of electrochemical cells in which the inventive anode structures and compositions presently disclosed may be implemented. For instance, in various approaches different electrochemical cell configurations may be used together, in any combination, to provide power to one or more machines.

Moreover, the exemplary electrochemical cell configurations described hereinabove may be modified in any suitable manner known in the art without departing from the scope of the inventive concepts described herein. For instance, various components shown above in FIGS. 8A-11 may be modified, substituted, omitted, supplemented, etc. in any manner that a skilled artisan reading the present disclosure would appreciate as suitable for producing a working electrochemical cell, without extending beyond the scope of the presently described inventive concepts.

For instance, according to various embodiments, electrochemical cells implemented in accordance with the presently described inventive concepts may include one or more (preferably at least two) electrodes, which may individually be characterized as anode(s), or cathode(s), e.g., according to electrochemical function within the overall cell, and may be formed from any suitable material(s) known in the art and appreciated, upon reading the present disclosure, as suitable for use in combination with other structures and compositions in the exemplary electrochemical cell and in accordance with the inventive concepts provided herein.

In some approaches, either or both electrode types may be configured in the form of a three-dimensional, monolithic structure that is "free-standing". In other words, the "free-standing" electrode is "structurally self-supporting", such that no separate substrate, framework, scaffold, foam, matrix, current collector, supporting fluid, etc. is necessary for the monolith to support its own weight and maintain defining physical characteristics (e.g., density, volume, porosity, physical dimensions, shape, chemical composition, etc.) when deposited, positioned, or otherwise placed in a working environment such as an electrochemical cell. Of course, the inventive concepts presented herein should not be interpreted as being limited in any way to inclusion of or requirement for "free standing" electrode(s), but should be understood as allowing for such structures where advantageous to the specific application(s) or intended utility for the inventive electrochemical cell of interest.

Where a "free standing" electrode structure is implemented, corresponding electrochemical cells may, and preferably do, omit a distinct current collector (or at least a distinct anode current collector), according to select implementations. Indeed, even where no "free standing" electrode structure is present, electrochemical cells in accordance with the inventive concepts described herein may still omit a distinct current collector structure or component.

For instance, according to certain implementations, the electrode itself may serve as the current collector, or the separator(s) may serve as the current collector, in addition to fulfilling additional functions described herein with respect to the separator, such as physically, chemically, electrically, etc. segregating various components of the electrochemical cell from one another to avoid undesirable chemical reactions, physical phenomena, etc. as would be understood by a person having ordinary skill in the art upon reading the present disclosure. Again, the inventive concepts presented herein shall be understood as including, but not requiring, omission of distinct current collector components, according to various embodiments.

Accordingly, electrodes of the illustrative electrochemical cell implementations may be distinct structures, such as three dimensional monoliths, which may optionally be porous, have surface(s) thereof functionalized in order to enhance, suppress, or otherwise modify functional characteristics thereof (such as permeability, reactivity, etc. to select chemical species present within the electrochemical cell) without limitation. Electrodes may optionally or additionally include indeterminate structures, such as solutions that exhibit functional characteristics of monolithic electrode structures, but are present partially or wholly in the form of a solution. Further still, electrodes may be physically arranged in various configurations, such as thin films which may be sprayed or deposited on a suitable substrate; a one or more (flat) layers which may be sprayed or deposited on a suitable substrate or as free-standing structures; as a plurality of rows and/or channels (e.g., as may be formed in a suitable electrode material, or as may be formed as a result of stacking various layers of an electrochemical cell, rolling a multilayered electrochemical cell, etc.) as would be understood by those having ordinary skill in the art upon reading the present disclosure.

Optionally, electrodes may be coated with a protective layer designed to facilitate or mitigate predetermined chemical or physical interactions with other components of the electrochemical cell, such as reactions that consume electrode active material, form dendritic structures extending from the electrode, etc. as would be understood by those having ordinary skill in the art upon reading the present disclosure. In like manner, an electrode may include a plurality of particles (e.g. of active material) dispersed within or throughout the volume of a binder such as a polymer matrix, and the binder may be or include material(s) that facilitate or mitigate desired or undesired interactions within the electrochemical cell, respectively. In still more approaches, electrolyte(s) may be operatively, chemically, or electrically coupled to a membrane or membrane(s) configured (e.g., according to physical characteristics such as porosity, lack of porosity, spatial arrangement, surface area, etc., or chemically configured, e.g. according to chemical composition, specific functionalization (e.g., of surface(s) of the membrane), etc.) to isolate the electrolyte and/or chemical species formed or derived therefrom from other components of the electrochemical cell.

Figure 12:
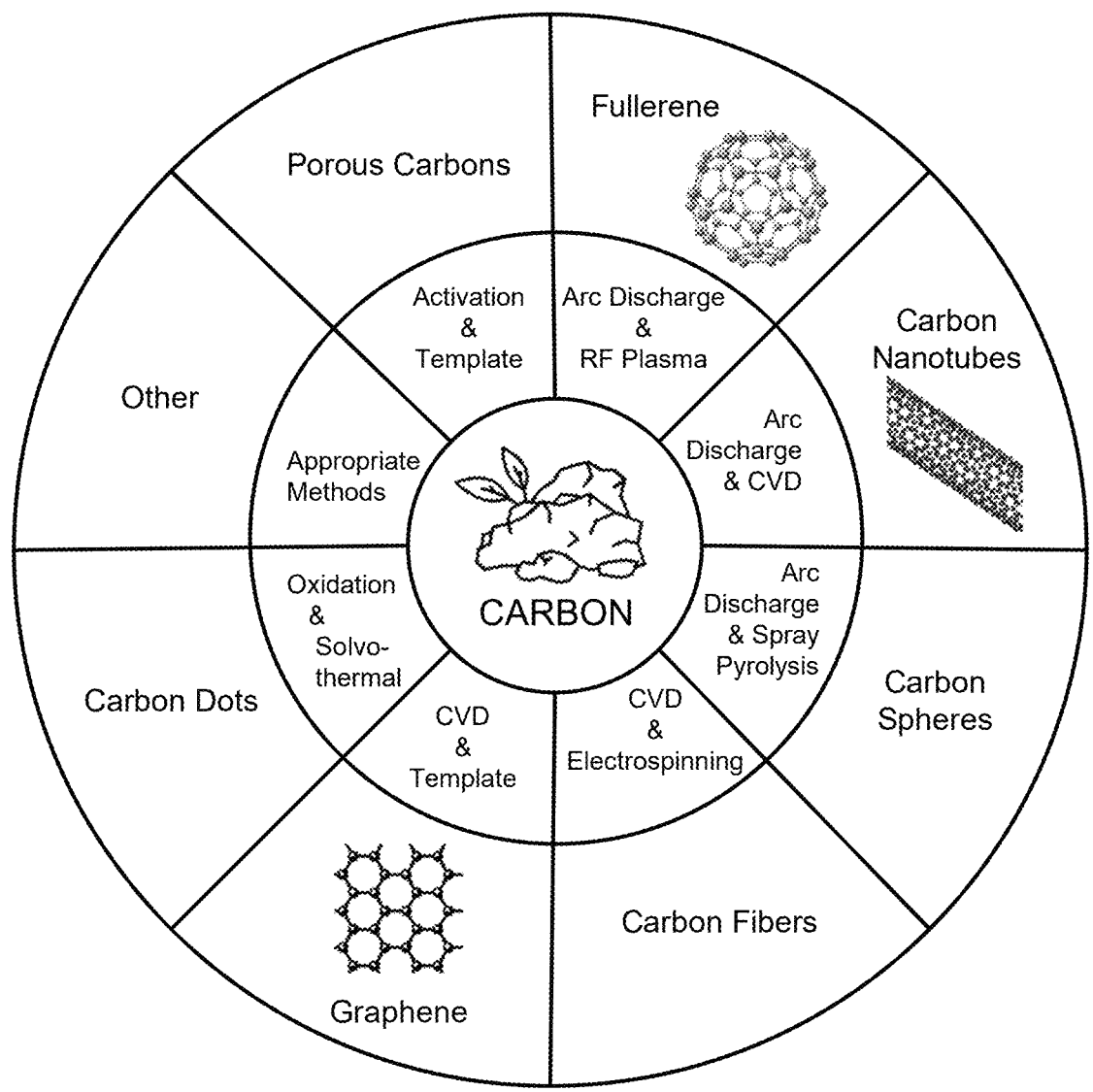
FIG. 12 is a chart showing various forms of carbonaceous material, and methods of producing the same from elemental carbon (e.g., charcoal), which may be included in various components of electrochemical cells such as shown in the foregoing Figures.

In particularly preferred approaches, electrodes may include one or more carbonaceous materials such as shown in FIG. 12 and described in greater detail hereinbelow.

It shall be appreciated that electrolytes in accordance with the presently disclosed inventive concepts may have any suitable chemical composition that would be understood by a person having ordinary skill in the art taking into consideration the particular context of the electrochemical cell, e.g., the chemical composition and structural arrangement of various other components included in the electrochemical cell.

Similarly, electrolyte(s) present in various electrochemical cells may be in liquid form, may be or include solid state electrolyte composition(s), may be or include gel-phase or gel-based electrolytes (such as gel polymer electrolytes), or any combination thereof that would be appreciated by those having ordinary skill in the art upon reading the present disclosure. Similarly, electrolytes may include semi-solid compositions such as gels, slurries, suspensions, etc. as would be appreciated by those having ordinary skill in the art upon reading the instant disclosure.

Separator(s), which may also be omitted in accordance with certain aspects of the inventive concepts described herein, may be or include any suitable composition or structure known in the art and which skilled artisans reading the present disclosure will appreciate are compatible with the inventive compositions and/or structures described herein. For instance, separator(s) may include impermeable, solid structures, semi-permeable membranes, selectively permeable compositions (i.e., compositions that are permeable to one or more predetermined chemical species, but impermeable or substantially impermeable to select, or all, other chemical species, according to various embodiments). For example, separators may be configured to physically, chemically, electrically, or otherwise functionally separate or segregate different components of the electrochemical cell from one another in order to avoid undesirable chemical reactions (such as parasitic reactions between electrolyte or derivatives thereof and electrodes, polysulfide shuttling, dendrite formation, etc. as would be understood by those having ordinary skill in the art upon reading the instant descriptions).

In addition, the exemplary electrochemical cells, in any configuration described herein or equivalents thereof that would be appreciated by those having ordinary skill in the art upon reading the instant disclosure, may include one or more mechanisms for mitigating or preventing polysulfide shuttling, dendrite formation, parasitic reactions between electrode(s) and electrolyte(s) (as well as species formed or derived from electrodes or electrolytes during operation of the electrochemical cell), or other chemical species present in the electrochemical cell environment. These mechanisms may be inherent to one or more of the exemplary structures described hereinabove (e.g., electrodes, separators, electrolytes, etc.), or may be specifically configured via specific modification, functionalization, structural arrangement, etc. of the particular components of the electrochemical cell. Any such characteristics, whether inherently present or specifically configured, are described in greater detail herein in accordance with various exemplary embodiments of the inventive concepts presently disclosed.

From the foregoing general descriptions and corresponding drawings, skilled artisans reviewing the present application will appreciate that, according to different implementations, electrochemical cells as described herein include a variety of components which each have a specific, core role in function of the electrochemical cell as a whole (e.g., electrodes facilitating electrical contact between electrolyte and an environment external to the electrochemical cell; separators serving to isolate or segregate various components, chemical species, etc. from one another within the electrochemical cell environment; and electrolyte facilitating charge transfer between electrodes of the electrochemical cell), the various components may optionally serve or convey one or more additional functions to the electrochemical cell. For instance, and as mentioned above, electrodes or separators may serve, in addition to their respective core roles, as current collectors, allowing omission of separate (often heavy, metal) structures dedicated to collecting current generated by the electrochemical cell.

In various aspects, any one or more component(s) of the electrochemical cell arrangements described herein may include one or more carbonaceous materials, including but not limited to those shown in FIG. 12. For example, certain components may include carbonaceous materials, carbonaceous materials may be included in addition to the various components shown and described with reference to FIGS. 8A-11, or both, as would be appreciated by those having ordinary skill in the art upon reading the present disclosures. In myriad embodiments, exemplary carbonaceous materials may include, without limitation, carbon black, carbon nanoonions (CNOs), necked CNOs, carbon nanospheres, graphite, pyrolytic graphite, graphene, graphene nanoparticles, graphene platelets, three-dimensional (3D) graphene, graphene oxides, fullerenes, hybrid fullerenes, single-walled nanotubes, multi-walled nanotubes, carbon dots, carbon spheres, porous carbons, carbon fibers, etc. as would be understood by skilled artisans upon reading the present descriptions. Additional details regarding the fabrication of select carbonaceous materials and characteristics thereof, particularly those shown in FIG. 12, are provided by Li, et al. "Synthesis, modification strategies and applications of coal-based materials", *Fuel Processing Tech.*, 230:1, 107203 (June 2022) (https://doi.org/10.1016/j.fuproc.2022.107203).

Moreover, the exemplary components of electrochemical cells described hereinabove, particularly as shown in FIGS. 8-11, may be present in a single cell "stack" (e.g., two opposing electrodes with corresponding separator, electrolyte, etc. arranged therebetween) or in a repeating (e.g., laminar) structure, according to various embodiments. A simplified repeating structure may, for example, include a first cathode (optionally coupled to a first cathode current collector) at one end of the electrochemical cell, which is immediately adjacent to a first electrolyte, which in turn is immediately adjacent to a first separator, which in turn is immediately adjacent to a second electrolyte, which in turn is immediately adjacent to a first anode (optionally coupled to a first anode current collector) positioned toward an opposing end of the electrochemical cell as the first cathode, collectively forming a single electrochemical cell layer. The repeating structure may further comprise additional electrolyte, separator, and electrode structures in a similar manner to form a multilayered, repeating pattern within the resulting electrochemical cell.

Whether including repeating structures or not, in various approaches, electrochemical cells may be manipulated, configured, arranged, etc. during fabrication of a larger structure (such as a battery). For instance, and as will be appreciated by those having ordinary skill in the art upon reviewing the inventive concepts described herein, in some approaches an electrochemical cell such as shown in FIG. 8B may be "rolled" around a central axis, forming a so-called "jelly roll" configuration, as shown in FIG. 8C according to one embodiment, which may be particularly suitable for certain arrangements or applications, such as for cylindrical or prismatic electrochemical cell embodiments, among others that skilled artisans will comprehend upon reviewing the present disclosure.

While the foregoing electrode, electrolyte, and separator components are the most common and critical aspects of the exemplary electrochemical cell as described herein, it shall be appreciated that according to various implementations electrochemical cells may, or may not, include any suitable combination or permutation of additional or alternative components, such as membranes, cans, caps, casings, wrappings, springs, wires, spacers, tabs, contacts, leads, gaskets, compressive structures or mechanisms, etc. as would be understood by a person having ordinary skill in the art upon reading the present descriptions.

Moreover, it shall be appreciated that persons having ordinary skill in the art may employ the various electrochemical cell embodiments described herein, including but not limited to coin cell arrangements, cylindrical cell arrangements, pouch cell arrangements, prismatic cell arrangements, etc. or any suitable equivalent(s) thereof that would be understood by said skilled artisan upon reading the present disclosure, in any effective permutation or combination, without departing from the scope of the inventive concepts in this disclosure. For instance, multiple of the same arrangements, combinations of different arrangements, or both, may be employed, e.g., to form a battery, or an assembly (e.g., a battery module, or a battery pack, etc. as would be understood by persons having ordinary skill in the art upon reading the present disclosure).

For example, those having ordinary skill in the art will appreciate that different arrangements described herein may have different advantages or disadvantages in the context of different applications, and may choose to employ the most advantageous arrangements of the particular application of interest. Additionally or alternatively, a skilled artisan may include different arrangements to provide robustness across different applications or working conditions to the resulting structure, providing flexibility of use, redundant failure points, or other advantage that would be understood by those having ordinary skill in the art in light of the particular application in mind.

As a concrete example, cylindrical cells are, relative to other arrangements described herein, are prone to cracking. Accordingly, a cylindrical cell arrangement such as shown in FIGS. 10A and 10B may not be applicable to or compatible with a prismatic cell configuration such as shown in FIG. 11, depending on the intended application for a given electrochemical cell, such as applications involving substantial and/or frequent application of mechanical forces (e.g. rapid acceleration/deceleration, vibration, etc. such as often experienced in vehicular applications. Similarly, pouch cell arrangements are particularly sensitive to volumetric expansion and contraction that occurs during natural operation and cycling of the electrochemical cell, and may require or benefit from additional support such as a compressive structure or internal mechanism (e.g. a polymeric support network such as described in U.S. Pat. No. 12,009,531, granted Jun. 11, 2024 and entitled "Internally enclosed support system for batteries, fabrication techniques and applications for the same", the contents of which are herein incorporated by reference).

Moreover, while exemplary electrochemical cell arrangements expressly described herein and shown in the various Figures include a pouch cell arrangement, a coin cell arrangement, a cylindrical cell arrangement, and a prismatic cell arrangement, other arrangements and/or components may be utilized without departing from the scope of the inventive concepts presented in this disclosure. For example, electrochemical cell arrangements may additionally or alternatively include components or be characterized by arrangements such as chassis, trays, packs, modules, assemblies, casings, etc. as would be understood by those having ordinary skill in the art upon reading the present disclosure.

Of course, the electrochemical cells described herein, according to various embodiments, may include external component(s) at least partially surrounding the electrochemical cell. For instance, exemplary external components may be selected from the group consisting of an external casing enclosing the electrochemical cell, a module operatively coupled to the electrochemical cell, an assembly operatively coupled to the electrochemical cell, a pack enclosing the electrochemical cell, a pouch enclosing the electrochemical cell, a can enclosing the electrochemical cell, a tray operatively coupled to the electrochemical cell, a pan operatively coupled to the electrochemical cell, and combinations thereof. The assembly may comprise: a parallel assembly, an in-series assembly, or a cell-to-chassis assembly. In still further embodiments, an electrochemical cell may be integrated into, or may be a part of, a structural component of the device to which the electrochemical cell is providing power, such as being integrated into a structural component of an electric vehicle.

The presently described inventive concepts include fabricating electrochemical cells of various types using additive manufacturing techniques, injection molding techniques, compression molding techniques, hybrid injection/compression molding techniques, preforming techniques, hand layup techniques, casting techniques, infusion techniques, sintering techniques, or any combination thereof that would be appreciated by a skilled artisan upon reading the present disclosure.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

For instance, in accordance with one implementation, the inventive concepts presented herein include one or more of the following compounds, features, configurations, etc., in any suitable combination or permutation that would be understood by a person having ordinary skill in the art upon reading the present disclosures: an electrolyte system comprising: at least one solvent; at least one electron withdrawing compound; at least one performance enhancing additive; and at least one lithium ion-transporting compound. The at least one solvent may include at least one ether, and preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacctamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), tricthylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluorocthyl ether (OFE), (1,1,2,2-tetrafluoroethyl 2,2,3, 3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis (2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluorocthane (DMETF), 2-methyl-1 (1,1, 2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The at least one solvent is cumulatively present in an amount ranging from greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolanc ether (DTDL), 1,1,1-trifluoro-2-(2-(2-(2,2,2-trifluoroethoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2, 2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridinc (3FP), 1,1,2, 2-tetrafluorocthyl 2,2,3,3-tetrafluororopyl ether (TTE), bis (2,2,3,3-tetrafluoropropyl) ether) (BTFPE), 2,2,2-trifluoroethyl 1,1,2,2-tetrafluorocthyl ether (TFTFE), tris(2, 2,2-trifluoroethyl)phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one performance-enhancing additive comprises dicyandiamide (DCDA), and is present in an amount ranging from about 0.01 M to about 0.2 M. The at least one lithium ion-transporting compound comprises at least one lithium salt, and preferably is selected from the group consisting of: lithium bis(trifluoromethanesulfonyl) imide (LiTFSI), lithium nitrate (LiNO$_3$), lithium Perchlorate (LiClO$_4$), lithium difluoro (oxalato) borate (LiFOB), lithium bis(oxalato) borate (LiBOB), lithium trifilate (LiTf), lithium bis(pentafluorocthanesulfonyl)imide (LiBETi), lithium bis (fluorosulfonyl)imide (LiFSI), lithium trifluoroacetate (LiTFAc), and combinations thereof. The lithium ion-transporting compound is present in an amount ranging from about 0.1 M to about 10 M. Moreover, the electrolyte system may include at least one chalcogenide, which is preferably selected from the group consisting of: dimethyl diselenide (DMDSe), diphenyl diselenide (DPDSe), dimethyl ditelluride (DMDTe), diphenyl ditelluride (DPDTe), and combination(s) thereof, and is preferably present in an amount ranging from about 0.1 wt % to about 3.0 wt %. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

According to another implementation, the inventive concepts presented herein include one or more of the following compounds, features, configurations, etc., in any suitable combination or permutation that would be understood by a person having ordinary skill in the art upon reading the present disclosures: an electrolyte system comprising: a solvent system; at least one electron withdrawing compound; and at least one lithium ion-transporting compound. The solvent system includes at least one solvent, which preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), tricthylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutanc (FDMB), bis(2,2,2, trifluoroethyl) ether (BTFE), 1H, 1H,5H-octafluoropentyl 1,1,2,2-tetrafluoroethyl ether (OFE), (1,1,2,2-tetrafluorocthyl 2,2,3, 3-tetrafluoropropyl ether (TTE), 2,2,2-trifluoroethyl 1,1,2,2-tetrafluoroethyl ether (TFETFE), 1,1,2,2-tetrafluorocthyl isobutyl ether (TFEIE), 1,1,2,3,3,3-hexafluoropropyl 2,2,2-trifluoroethyl ether (THE), methoxyperfluorobutane (MPB), bis(2,2-difluorocthyl) ether (DFE), 2,2,2-trifluoroethyl methyl ether (TFEME), bis(2-fluoroethyl) ether (BFE), bis (2,2,2, trifluoroethyl) ether (BTFE), 3-fluoropyridine (3FP), 1,2-(1,1,2,2-tetrafluorocthoxy) ethane (TFEE), 1,2-dimethoxy-1,1,2,2-tetrafluorocthane (DMETF), 2-methyl-1 (1,1, 2,2-tetrafluorocthoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The solvent system comprises greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis(2,2,3,3-tetrafluoropropyl) ether) (BTFPE), 2,2,2-trifluoroethyl 1,1,2,2-tetrafluoroethyl ether (TFTFE), tris(2,2,2-trifluoroethyl) phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one electron withdrawing compound comprises at least one alpha-hydrogenated, selectively beta-modified motif, and the at least one alpha-hydrogenated, selectively beta-modified motif excludes fluorine. In other aspects, the at least one electron withdrawing compound excludes fluorine. The at least one lithium ion-transporting compound comprises at least one lithium salt, and preferably is selected from the group consisting of: lithium bis(trifluoromethanesulfonyl)imide (LiTFSI), lithium nitrate (LiNO$_3$), lithium Perchlorate (LiClO$_4$), lithium difluoro (oxalato) borate (LiFOB), lithium bis(oxalato) borate (LiBOB), lithium triflate (LiTf), lithium bis(pentafluoroethanesulfonyl)imide (LiBETi), lithium bis(fluorosulfonyl)imide (LiFSI), lithium trifluoroacetate (LiTFAc), and combinations thereof. The at least one lithium ion-transporting compound is present in an amount ranging from about 0.1 M to about 10 M. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

In still yet more implementations, a lithium-based anode includes one or more of the following compounds, features, configurations, etc., in any suitable combination or permutation that would be understood by a person having ordinary skill in the art upon reading the present disclosures: an interphase formed on surface(s) of the lithium-based anode, wherein the interphase is formed by interaction between an active material of the lithium-based anode and a derivative of at least one electron withdrawing compound. The at least one electron withdrawing compound preferably comprises at least one alpha-hydrogenated, selectively beta-modified motif, where the at least one alpha-hydrogenated, selectively beta-modified motif excludes fluorine and/or the at least one electron withdrawing compound excludes fluorine as a whole. Preferably, the at least one electron withdrawing compound is includes at least one electron withdrawing compound that is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis(2,2,3,3-tetrafluoropropyl) ether) (BTFPE), 2,2,2-trifluoroethyl 1,1,2,2-tetrafluoroethyl ether (TFTFE), tris(2,2,2-trifluoroethyl)phosphate, bis(2,2,2-trifluoroethyl) methylphosphonate, isosorbide dinitrate (ISDN), bis(2-fluoroethyl) ether (BFE), and combinations thereof. An active material of the lithium-based anode preferably comprises elemental lithium or a lithium alloy, where the lithium alloy comprises lithium-magnesium, lithium-sulfur, or a combination thereof. The inventive anode may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

In still yet more implementations, an electrolyte system includes one or more of the following compounds, features, configurations, etc., in any suitable combination or permutation that would be understood by a person having ordinary skill in the art upon reading the present disclosures: a solvent system; at least one electron withdrawing compound; at least one lithium ion-transporting compound; and at least one chalcogenide. The solvent system includes at least one solvent, which preferably is selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), tricthylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis(2,2,2, trifluoroethyl) ether (BTFE), 3-fluoropyridinc (3FP), 1,2-(1,1,2,2-tetrafluoroethoxy) ethane (TFEE), 1,2-dimethoxy-1,1,2,2-tetrafluoroethane (DMETF), 2-methyl-1 (1,1,2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof. The solvent system comprises greater than 0 vol % of the electrolyte system to about 75 vol % of the electrolyte system. Moreover, the at least one electron withdrawing group comprises at least one compound characterized by an alpha-hydrogenated, beta-functionalized motif, and preferably includes at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy) cthanc (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTcG), bis(2, 2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis (2,2,3,3-tetrafluoropropyl) ether) (BTFPE), 2,2,2-trifluoroethyl 1,1,2,2-tetrafluoroethyl ether (TFTFE), tris(2,2,2-trifluoroethyl)phosphate, bis(2,2,2-trifluoroethyl) methylphosphonate, isosorbide dinitrate (ISDN), bis(2-fluoroethyl) ether (BFE), and combinations thereof. The at least one electron withdrawing compound is cumulatively present in an amount preferably ranging from greater than 0 vol % of the electrolyte system to about 75 vol % of the electrolyte system. The at least one electron withdrawing compound comprises at least one alpha-hydrogenated, selectively beta-modified motif, and the at least one alpha-hydrogenated, selectively beta-modified motif excludes fluorine. In other aspects, the at least one electron withdrawing compound excludes fluorine. The at least one lithium ion-transporting compound comprises at least one lithium salt, and preferably is selected from the group consisting of: lithium bis(trifluoromethanesulfonyl)imide (LiTFSI), lithium nitrate (LiNO$_3$), lithium Perchlorate (LiClO$_4$), lithium difluoro (oxalato) borate (LiFOB), lithium bis(oxalato) borate (LiBOB), lithium triflate (LiTf), lithium bis (pentafluoroethanesulfonyl)imide (LiBETi), lithium bis (fluorosulfonyl)imide (LiFSI), lithium trifluoroacetate (LiTFAc), and combinations thereof. The lithium ion-transporting compound is present in an amount ranging from about 0.1 M to about 10 M. The at least one chalcogenide is selected from the group consisting of: dimethyl diselenide (DMDSe), diphenyl diselenide (DPDSe), dimethyl ditelluride (DMDTe), diphenyl ditelluride (DPDTe), and combination(s) thereof, and is preferably present in an amount ranging from about 0.1 wt % to about 3.0 wt %. The inventive electrolyte system may be embodied in an electrochemical cell, which may have a configuration such as described herein, including a pouch configuration, a coin configuration, a cylindrical configuration, or a prismatic configuration. Said electrochemical cells may or may not include a distinct structure serving as a current collector.

What is claimed is:

1. An electrolyte system, comprising:
   a solvent system;
   at least one electron withdrawing compound;
   at least one lithium ion-transporting compound; and
   at least one chalcogenide, wherein the at least one chalcogenide is cumulatively present in an amount ranging from about 0.5 wt % up to 3.0 wt %,
   wherein the at least one chalcogenide is selected from the group consisting of: dimethyl diselenide (DMDSe), diphenyl diselenide (DPDSe), dimethyl ditelluride (DMDTe), diphenyl ditelluride (DPDTe), and combination(s) thereof.

2. The electrolyte system as recited in claim 1, wherein the solvent system comprises at least one solvent selected from the group consisting of: dimethoxyethane (DME), dioxolane (DOL), dimethyl sulfoxide (DMSO), dimethyl formamide (DMF), toluene, tetramethyl urea (TMU), tetrabutylammonium hydroxide (TBA), dimethylacetamide (DMA), tetrahydrofuran (THF), diethylene glycol dimethyl ether (diglyme or DEGDME), acetonitrile (ACN), dimethyl trisulfide (DMTS), diisopropyl ether (DIPE), tetrahydrofuran (THF), 1,2-diaminopropane (DAP), triethylene glycol dimethyl ether (Triglyme/trigDME), tetraethylene glycol dimethyl ether (Tetraglyme/TEGDME), sulfolane (SUL), methyl tert-butyl ether (MTBE), 2,2,3,3-tetrafluoro-1,4-dimethoxybutane (FDMB), bis(2,2,2, trifluoroethyl) ether (BTFE), 1H,1H,5H-octafluoropentyl 1,1,2,2-tetrafluoroethyl ether (OFE), (1,1,2,2-tetrafluoroethyl 2,2,3,3-tetrafluoropropyl ether (TTE), 2,2,2-trifluoroethyl 1,1,2,2-tetrafluoroethyl ether (TFETFE), 1,1,2,2-tetrafluoroethyl isobutyl ether (TFEIE), 1,1,2,3,3,3-hexafluoropropyl 2,2,2-trifluoroethyl ether (THE), methoxyperfluorobutane (MPB), bis(2,2-difluoroethyl) ether (DFE), 2,2,2-trifluoroethyl methyl ether (TFEME), bis(2-fluoroethyl) ether (BFE), bis(2,2,2, trifluoroethyl) ether (BTFE), 3-fluoropyridine (3FP), 1,2-(1,1,2,2-tetrafluoroethoxy) ethane (TFEE), 1,2-dimethoxy-1,1,2,2-tetrafluoroethane (DMETF), 2-methyl-1 (1,1,2,2-tetrafluoroethoxy) propane (TFEIBE), bis(2,2,3,3,3-pentafluoropropyl) ether (BPFPE), allyl 2,2,3,3,3-pentafluoropropyl ether (APFPE), hydrocarbons, and combinations thereof.

3. The electrolyte system as recited in claim 1, wherein the solvent system is cumulatively present in an amount ranging from greater than 0 vol % of the electrolyte system to about 75 vol % of the electrolyte system.

4. The electrolyte system as recited in claim 1, wherein the at least one lithium ion-transporting compound is selected from the group consisting of: lithium bis(trifluoromethanesulfonyl)imide (LiTFSI), lithium nitrate (LiNO$_3$), lithium perchlorate (LiClO$_4$), lithium difluoro (oxalato) borate (LiFOB), lithium bis(oxalato) borate (LiBOB), lithium triflate (LiTf), lithium bis(pentafluoroethanesulfonyl)imide (LiBETi), lithium bis(fluorosulfonyl)imide (LiFSI), lithium trifluoroacetate (LiTFAc), and combinations thereof.

5. The electrolyte system as recited in claim 1, wherein the at least one lithium ion-transporting compound is present in an amount ranging from about 0.1 M to about 10 M.

6. The electrolyte system of claim 1, wherein the at least one electron withdrawing compound excludes fluorine.

7. The electrolyte system as recited in claim 1, wherein the at least one electron withdrawing compound is selected from the group consisting of: 2,2-dimethoxy-4-trifluoromethyl-1,3-dioxolane ether (DTDL), 1,1,1-trifluoro-2-(2-(2-(2,2,2-trifluoroethoxy) ethoxy) ethoxy) ethane (FDG), 1,1,1,14,14,14-hexafluoro-3,6,9,12-tetraoxatetradecane (FTrG), 1,1,1,17,17,17-hexafluoro-3,6,9,12,15-pentaoxaheptadecane (FTeG), bis(2,2-difluoroethyl) ether (BDE), bis(2,2,2, trifluoroethyl) ether (BTFE), 2,2,2-trifluoroethyl 2-fluoroethyl ether (TFFE), 1,1-difluoroethyl-2-fluoroethyl ether (DFE), fluorinated 1,4-dimethoxylbutane (FDMB), 3-fluoropyridine (3FP), 1,1,2,2-tetrafluoroethyl 2,2,3,3-tetrafluororopyl ether (TTE), bis(2,2,3,3-tetrafluoropropyl) ether) (BTFPE), 2,2,2-trifluoroethyl 1,1,2,2-tetrafluoroethyl ether (TFTFE), tris(2,2,2-trifluoroethyl)phosphate, bis(2,2,2-trifluoroethyl)methylphosphonate, isosorbide dinitrate (ISDN), bis(2-fluoroethyl) ether (BFE), and combinations thereof.

8. The electrolyte system as recited in claim 1, wherein the at least one electron withdrawing compound is cumulatively present in an amount ranging from greater than 0 vol % of the electrolyte system to about 75 vol % of the electrolyte system.

9. The electrolyte system of claim 1, wherein the at least one electron withdrawing compound comprises at least one alpha-hydrogenated, selectively beta-modified motif.

10. The electrolyte system of claim 9,
    wherein the at least one alpha-hydrogenated, selectively beta-modified motif excludes fluorine.

11. An electrolyte system, comprising:
    a solvent system;
    at least one electron withdrawing compound;
    at least one lithium ion-transporting compound; and at least one chalcogenide, wherein the at least one chalcogenide is cumulatively present in an amount ranging from about 0.5 wt % to 3.0 wt %, wherein the at least one chalcogenide is selected from the group consisting of: dimethyl diselenide (DMDSe), diphenyl diselenide (DPDSe), and combination(s) thereof.

12. An electrochemical cell comprising the electrolyte system as recited in claim 1.

13. The electrochemical cell as recited in claim 12, wherein the electrochemical cell is characterized by a coin configuration.

14. The electrochemical cell as recited in claim 12, wherein the electrochemical cell is characterized by a cylindrical configuration.

15. The electrochemical cell as recited in claim 12, wherein the electrochemical cell is characterized by a prismatic configuration.

16. The electrochemical cell as recited in claim 12, wherein the electrochemical cell is characterized by a pouch configuration.

17. The electrochemical cell as recited in claim 12, wherein the electrochemical cell neither includes nor is coupled to any distinct structure serving as a current collector.

18. The electrochemical cell as recited in claim 12, wherein the solvent system participates in converting redox states of polysulfides.

19. The electrochemical cell as recited in claim 12, wherein the at least one chalcogenide is cumulatively present in an amount ranging from about 0.5 wt % up to 2.0 wt %.

20. The electrochemical cell as recited in claim 19, wherein the at least one chalcogenide is selected from the group consisting of: dimethyl diselenide (DMDSe), diphenyl diselenide (DPDSe), and combination(s) thereof.

* * * * *